(12) United States Patent
Raleigh et al.

(10) Patent No.: US 10,356,199 B2
(45) Date of Patent: Jul. 16, 2019

(54) CONTENT DISTRIBUTION WITH A QUALITY BASED ON CURRENT NETWORK CONNECTION TYPE

(71) Applicant: Headwater Partners II LLC, Tyler, TX (US)

(72) Inventors: Gregory G. Raleigh, Woodside, CA (US); Jose Tellado, Mountain View, CA (US)

(73) Assignee: Headwater Partners II LLC, Tyler, TX (US)

( * ) Notice: Subject to any disclaimer, the term of this patent is extended or adjusted under 35 U.S.C. 154(b) by 0 days.

(21) Appl. No.: 15/287,612

(22) Filed: Oct. 6, 2016

(65) Prior Publication Data

US 2017/0223131 A1    Aug. 3, 2017

Related U.S. Application Data

(63) Continuation of application No. 13/789,220, filed on Mar. 7, 2013, now Pat. No. 9,503,510.

(60) Provisional application No. 61/609,271, filed on Mar. 10, 2012.

(51) Int. Cl.
*H04L 29/08* (2006.01)
*G06Q 30/02* (2012.01)
*H04W 84/12* (2009.01)

(52) U.S. Cl.
CPC ..... *H04L 67/2847* (2013.01); *G06Q 30/0276* (2013.01); *H04L 67/10* (2013.01); *H04L 67/20* (2013.01); *H04L 67/26* (2013.01); *H04L 67/2809* (2013.01); *H04L 67/306* (2013.01); *H04W 84/12* (2013.01)

(58) Field of Classification Search
CPC ......... H04L 67/10; H04L 67/20; H04L 67/26; H04L 67/2809; H04L 67/306
USPC ....... 709/202, 207, 217, 228, 229, 238, 239, 709/241, 244; 705/14.53
See application file for complete search history.

(56) References Cited

U.S. PATENT DOCUMENTS

| | | | |
|---|---|---|---|
| 6,732,117 B1 * | 5/2004 | Chilton | G06F 17/3048 |
| 7,013,285 B1 | 3/2006 | Rebane | |
| 7,254,608 B2 | 8/2007 | Yeager et al. | |

(Continued)

FOREIGN PATENT DOCUMENTS

WO    2011073586 A1    6/2011

OTHER PUBLICATIONS

Elina Vartiainen et al., "Auto-update", Proceedings of the 4th International Conference on Mobile Technology Applications, and Systems and the 1st International Symposium on Computer Human Interaction in Mobile Technology, Mobility '07, Jan. 1, 2007, p. 683, XP055022065, New York, New York, USA.

(Continued)

*Primary Examiner* — Madhu Woolcock
(74) *Attorney, Agent, or Firm* — James E. Harris

(57) ABSTRACT

A content distribution system generates a queue of content for a user account, including content available from a network content server and content that has been preloaded from the network content server to a home content reservoir. A wireless end-user device can request streaming of queue content from either location. At least for content streamed to the wireless end-user device directly from the network content server, the media quality of the streamed content is dependent on a current network type to which the wireless end-user device is connected.

11 Claims, 34 Drawing Sheets

(56) References Cited

U.S. PATENT DOCUMENTS

| | | | |
|---|---|---|---|
| 7,420,956 B2 | 9/2008 | Karaoguz et al. | |
| 7,571,167 B1* | 8/2009 | Campana | G06F 17/30902 |
| 7,587,323 B2 | 9/2009 | Matz et al. | |
| 7,630,986 B1 | 12/2009 | Herz et al. | |
| 7,661,116 B2 | 2/2010 | Slaney et al. | |
| 7,797,722 B2 | 9/2010 | Lin et al. | |
| 7,933,802 B2 | 4/2011 | Plow et al. | |
| 7,941,516 B2 | 5/2011 | Wong et al. | |
| 7,991,883 B1* | 8/2011 | Streeter | H04L 67/06 |
| | | | 709/203 |
| 8,027,865 B2 | 9/2011 | Gilbert | |
| 8,027,879 B2 | 9/2011 | Ramer et al. | |
| 8,036,690 B1 | 10/2011 | Delker et al. | |
| 8,051,420 B2 | 11/2011 | Rolia et al. | |
| 8,051,444 B2 | 11/2011 | Shkedi | |
| 8,132,202 B2 | 3/2012 | Swix et al. | |
| 8,250,600 B2 | 8/2012 | Kodialam et al. | |
| 8,260,665 B2 | 9/2012 | Foladare et al. | |
| 8,429,702 B2 | 4/2013 | Yasrebi et al. | |
| 9,137,329 B2 | 9/2015 | Xu | |
| 9,826,197 B2* | 11/2017 | Dahlby | H04N 7/17318 |
| 2002/0021809 A1 | 2/2002 | Salo et al. | |
| 2002/0116258 A1 | 8/2002 | Stamatelatos et al. | |
| 2003/0028889 A1* | 2/2003 | McCoskey | H04N 7/17318 |
| | | | 725/91 |
| 2003/0041050 A1 | 2/2003 | Smith et al. | |
| 2003/0079027 A1* | 4/2003 | Slocombe | H04L 29/06 |
| | | | 709/229 |
| 2003/0154128 A1 | 8/2003 | Liga et al. | |
| 2004/0003101 A1* | 1/2004 | Roth | H04L 29/06027 |
| | | | 709/231 |
| 2004/0073596 A1* | 4/2004 | Kloninger | H04L 29/06 |
| | | | 709/200 |
| 2004/0117426 A1* | 6/2004 | Rudkin | H04L 65/605 |
| | | | 709/200 |
| 2004/0255008 A1 | 12/2004 | Olsen et al. | |
| 2005/0182727 A1 | 8/2005 | Robert et al. | |
| 2005/0188055 A1* | 8/2005 | Saletore | H04L 67/1097 |
| | | | 709/218 |
| 2005/0193096 A1 | 9/2005 | Yu et al. | |
| 2005/0235047 A1* | 10/2005 | Li | H04L 29/06027 |
| | | | 709/219 |
| 2006/0020960 A1 | 1/2006 | Relan et al. | |
| 2006/0037037 A1 | 2/2006 | Miranz | |
| 2006/0041480 A1 | 2/2006 | Briggs | |
| 2006/0129766 A1 | 6/2006 | Cassia et al. | |
| 2006/0159109 A1 | 7/2006 | Lamkin et al. | |
| 2006/0242267 A1 | 10/2006 | Grossman | |
| 2006/0277271 A1 | 12/2006 | Morse et al. | |
| 2006/0294223 A1 | 12/2006 | Glasgow et al. | |
| 2007/0061243 A1 | 3/2007 | Ramer et al. | |
| 2007/0061265 A1 | 3/2007 | Hovnanian et al. | |
| 2007/0130589 A1 | 6/2007 | Davis et al. | |
| 2007/0179854 A1 | 8/2007 | Ziv et al. | |
| 2007/0206247 A1 | 9/2007 | Kaplan | |
| 2007/0249387 A1 | 10/2007 | Doradla et al. | |
| 2007/0250512 A1* | 10/2007 | Friedlander | G06F 17/30023 |
| 2007/0260673 A1 | 11/2007 | Shenfield et al. | |
| 2007/0266113 A1* | 11/2007 | Koopmans | G06F 17/3048 |
| | | | 709/217 |
| 2007/0294422 A1 | 12/2007 | Zuckerman et al. | |
| 2008/0086750 A1* | 4/2008 | Yasrebi | H04L 29/06027 |
| | | | 725/86 |
| 2008/0108342 A1 | 5/2008 | Pomerantz et al. | |
| 2008/0109842 A1 | 5/2008 | Wachtfogel et al. | |
| 2008/0167943 A1 | 7/2008 | O'Neil et al. | |
| 2008/0170622 A1* | 7/2008 | Gordon | H04N 21/23412 |
| | | | 375/240.18 |
| 2008/0215437 A1 | 9/2008 | Levy et al. | |
| 2008/0215475 A1 | 9/2008 | Ramer et al. | |
| 2008/0244040 A1* | 10/2008 | Bhatia | H04L 47/14 |
| | | | 709/219 |
| 2008/0288328 A1 | 11/2008 | Minor et al. | |
| 2008/0288458 A1* | 11/2008 | Sun | H04L 67/1097 |
| 2008/0313029 A1 | 12/2008 | Evans | |
| 2009/0006583 A1 | 1/2009 | Kindle et al. | |
| 2009/0012847 A1 | 1/2009 | Brooks et al. | |
| 2009/0048914 A1 | 2/2009 | Shenfield et al. | |
| 2009/0055256 A1 | 2/2009 | Donahue et al. | |
| 2009/0055461 A1 | 2/2009 | Georgis et al. | |
| 2009/0100182 A1 | 4/2009 | Chaudhry | |
| 2009/0125321 A1 | 5/2009 | Charlebois et al. | |
| 2009/0172217 A1 | 7/2009 | Nochimowski et al. | |
| 2009/0183215 A1 | 7/2009 | McCartie et al. | |
| 2009/0198580 A1 | 8/2009 | Broberg et al. | |
| 2009/0210290 A1 | 8/2009 | Elliott et al. | |
| 2009/0210477 A1 | 8/2009 | White et al. | |
| 2009/0222117 A1 | 9/2009 | Kaplan et al. | |
| 2009/0240569 A1 | 9/2009 | Ramer et al. | |
| 2009/0307055 A1 | 12/2009 | Karty | |
| 2010/0017600 A1 | 1/2010 | Lepeska et al. | |
| 2010/0049603 A1 | 2/2010 | Peterson et al. | |
| 2010/0049608 A1 | 2/2010 | Grossman | |
| 2010/0114668 A1 | 5/2010 | Klein et al. | |
| 2010/0154011 A1* | 6/2010 | Soo | H04N 7/1675 |
| | | | 725/101 |
| 2010/0169502 A1 | 7/2010 | Knowlson et al. | |
| 2010/0198982 A1* | 8/2010 | Fernandez | G06Q 30/02 |
| | | | 709/231 |
| 2010/0205628 A1 | 8/2010 | Davis et al. | |
| 2010/0235891 A1 | 9/2010 | Oglesbee et al. | |
| 2010/0293049 A1 | 11/2010 | Maher et al. | |
| 2010/0325666 A1 | 12/2010 | Wiser et al. | |
| 2011/0029670 A1 | 2/2011 | Klein et al. | |
| 2011/0041153 A1 | 2/2011 | Simon et al. | |
| 2011/0065424 A1 | 3/2011 | Estevez et al. | |
| 2011/0072110 A1 | 3/2011 | Sivasubramanian et al. | |
| 2011/0119201 A1 | 5/2011 | Zimmerman et al. | |
| 2011/0131297 A1* | 6/2011 | O'Reilly | G06F 17/30864 |
| | | | 709/219 |
| 2011/0191141 A1 | 8/2011 | Thompson et al. | |
| 2011/0197056 A1 | 8/2011 | Chen | |
| 2011/0225312 A1 | 9/2011 | Liu et al. | |
| 2011/0258294 A1* | 10/2011 | Dui | H04L 12/6418 |
| | | | 709/219 |
| 2012/0047201 A1* | 2/2012 | Jain | H04N 21/26225 |
| | | | 709/203 |
| 2012/0079096 A1 | 3/2012 | Cowan et al. | |
| 2012/0289147 A1 | 11/2012 | Raleigh et al. | |
| 2013/0091545 A1 | 4/2013 | MacDonald et al. | |
| 2013/0138508 A1 | 5/2013 | Gee | |
| 2013/0173556 A1* | 7/2013 | Grigg | H04L 67/1095 |
| | | | 707/667 |
| 2013/0340006 A1* | 12/2013 | Kwan | H04N 5/445 |
| | | | 725/39 |
| 2015/0074244 A1 | 3/2015 | Lewis et al. | |

OTHER PUBLICATIONS

PCT, Notification of Transmitatal of the International Search Report and the Written Opinion of the International Searching Authority, of the Declaration, International Application No. PCT/US2013/030046, International Filing Date Mar. 8, 2103, dated Jul. 1, 2013

* cited by examiner

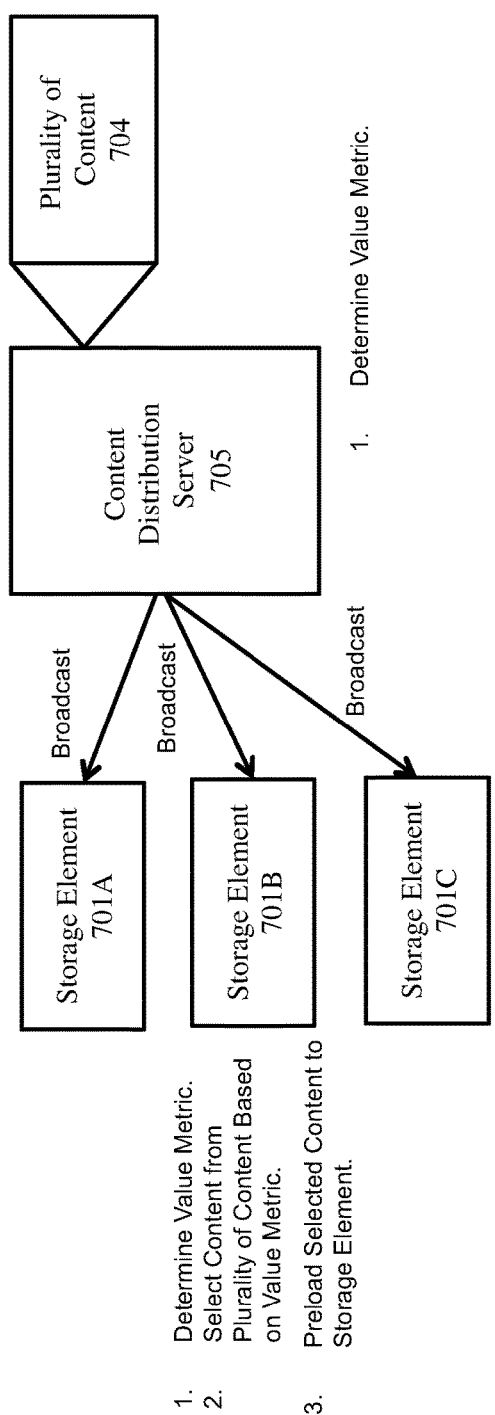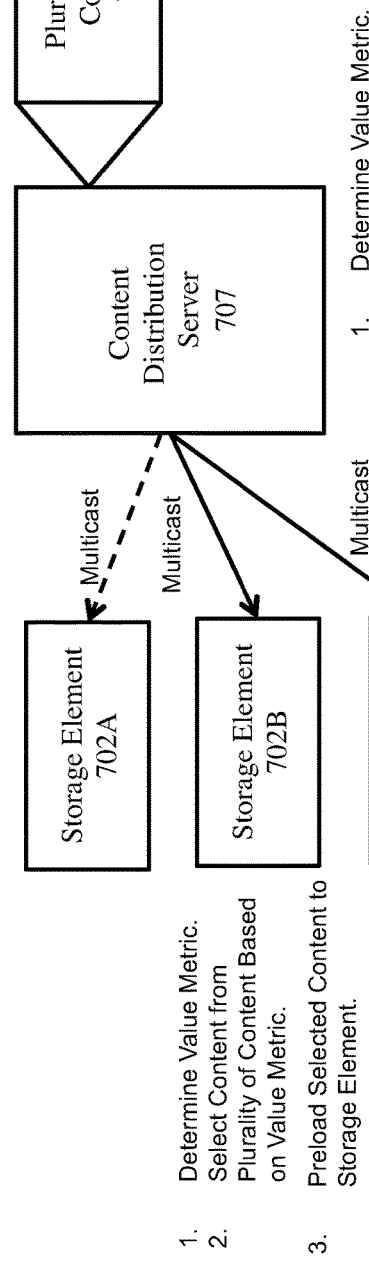

| | User device parameters | | | | |
|---|---|---|---|---|---|
| | Total Storage Size (GB) | Display size (in) | Display Resolution | Single-user Multi-user | Access Modems |
| Smartphone | 32 | 3.5 | 960 x 640 | SU | 2G,2G,4G, WiFi, USB |
| Tablet | 16 | 10 | 1024 x 768 | MU | WiFi, 3G |
| Notebook | 256 | 15 | 1920 x 1200 | SU | WiFi, Dial-Up Ethernet, USB |
| PC | 1000 | 20 | 1920 x 1200 | MU | WiFi, Dial-up Ethernet, USB |
| TV-STB-DVR | 2000 | 50 | 1920 x 1080 | MU | Ethernet, VDSL |
| Home Gateway or Network attached storage | 2000 | N/A | N/A | MU | WiFi, Ethernet ADSL, VDSL |

FIG. 9

| | | Communication networks parameters associated to a user device (1010) | | | | | |
|---|---|---|---|---|---|---|---|
| | ID # | Speed (statistics, min, typ, max) in Mbps | Monthly rate | Max usage per month (Cap in GB) | Cost of Usage above Cap (per GB) | Single-user Multi-user | Connectivity details |
| Home Wireless (WiFi) | 1000 | 50 | 0 | None | N/A | MU | At Home |
| Home Wired (Ethernet) | 1001 | 1000 | 0 | None | N/A | MU | At Home |
| Access Wired (DSL) | 1002 | 2 | 20 | None | N/A | MU | At Home |
| Cellular 3G | 1003 | 0.1 | 20 | 2 | 10 | SU | Home, Work |
| Cellular 4G roaming | 1004 | 0.5 | 5 | 0 | 50 | SU | Work |
| POI WLAN #1 | 1005 | 25 | 0 | None | N/A | MU | Coffee Shop |
| POI WLAN #2 | 1006 | 50 | 10 | None | N/A | | Airport |

FIG. 10

| | | | | | Storage element parameters available to a user | | | | |
|---|---|---|---|---|---|---|---|---|---|
| Name | ID # | Total storage Size (GB) | Available storage | Storage reserved for content | Tier # (relative to a user device) | Number of hops relative to | | Communication Networks (could change with time) | Connected to (could change with time) |
| | | | | | | Smartphone A | Home Gateway A ... | | |
| Flash in Smartphone A | 1011 | 32 | 50% | 25% | 1 | 0 | 1 | Cellular, Multiple WiFi, USB | 1014, 1015, 1016 |
| Flash in Tablet A | 1012 | 16 | 50% | 25% | 1 | N/C | N/C | WiFi | none |
| HDD in Notebook A | 1013 | 256 | 50% | 25% | 2 | 2 | 1 | Home WiFi, Work WiFi, Ethernet, USB | 1015, 1016 |
| HDD in PC A | 1014 | 1000 | 75% | 50% | 3 | 1 | 1 | Home WiFi, Ethernet, USB | 1015, 1016 |
| HDD in Home Gateway or STB A | 1015 | 256 | 75% | 50% | 1 | 1 | 0 | Home WiFi, xDSL | 1011, 1012, 1013, 1014, 1015, 1016 |
| HDD in Network Attached Storage A | 1016 | 2000 | 75% | 50% | 1 | 2 | 1 | Ethernet, USB | 1015, 1016 |

FIG. 11

| | | User input preferences for associated user devices | | | | | |
|---|---|---|---|---|---|---|---|
| | ID # | Preferred type | Preferred format | Memory reserved by User for content | Single-user Multi-user | Use locations | Preferred Communication Network (ranked) |
| Smartphone | 1021 | Videos, Music, Movies | SD | 25% | SU | Everywhere | Home WiFi, Work WiFi |
| Tablet | 1022 | Movies, Games | HD 720p | All available | MU | Home, Park | Home WiFi, Coffee POI WiFi |
| Notebook | 1023 | Movies, Games | SD | 25% | SU | Home, work | Home WiFi, Work WiFi |
| PC | 1024 | None | SD | 50% | MU | Home | Home Ethernet |
| TV | 1025 | Movies, Games | HD 1080p | 50% | MU | Home | Home Ethernet |

Additional menus for movie, video, music, game, etc preference types

FIG. 12

| Home Reservoir (plurality of content) | | | | | | |
|---|---|---|---|---|---|---|
| Name | ID # | Type | Format | Size (GB) | Duration | List Price |
| Movie A | 1031 | Video | TV HD | 4 | 1:52:16 | 2.99 |
| Movie A | 1032 | Video | Handset SD | 0.250 | 1:52:16 | 1.99 |
| Movie A | 1032b | Video | Tablet 720p | 2 | 1:52:16 | 1.99 |
| Game A | 1033 | Game | TV HD | 30 | 20 | 19.99 |
| Game A | 1034 | Game | Tablet SD | 10 | 10 | 10.99 |

FIG. 15

| POI Reservoir (plurality of content) | | | | | | | |
|---|---|---|---|---|---|---|---|
| Name | ID # | Type | Format | Size | Duration | List Price | Licensing cost |
| Movie B | 1041 | Video | TV HD | 4GB | 1:52:16 | 2.99 | 1.00 |
| Movie B | 1042 | Video | Handset SD | 250MB | 1:52:16 | 1.99 | 0.50 |
| Game B | 1043 | Game | TV HD | 50GB | N/A | 19.99 | 40.00 |
| Game B | 1044 | Game | Tablet SD | 30GB | N/A | 10.99 | 15.00 |
| Music Video B | 1045 | Music Video | MP3 | 0.01 | 0:3:42 | 0.25 | 0.25 |
| ... | | | | | | | |

FIG. 16

Content Provider Reservoir

| Name | ID # | Type | Format | Size (GB) | Duration (hr:min:sec) | Licensing cost | List Price |
|---|---|---|---|---|---|---|---|
| Movie C | 1051 | Video | TV HD | 4 | 1:52:16 | 1.00 | 2.99 |
| Movie C | 1052 | Video | Handset SD | 0.25 | 1:52:16 | 0.50 | 1.99 |
| Game C | 1053 | Game | TV HD | 30 | 20 | 40.00 | 49.99 |
| Game C | 1054 | Game | Tablet SD | 10 | 10 | 15.00 | 19.99 |
| Music C | 1055 | Music Video | MP3 | 0.01 | 0:3:42 | 0.25 | Free with ads |
| ... | | | | | | | ... |

FIG. 17

| 1100 | 1101 | 1102 | 1103 | 1104 | 1105 | 1106 | 1107 | 1108 | 1109 | 1110 | 1111 | 1112 |
|---|---|---|---|---|---|---|---|---|---|---|---|---|
| \multicolumn{13}{c}{Value metric parameter information associated to a user device (tablet)} | | | | | | | | | | | | |
| Name | ID # | Type | Format | Size (GB) | Duration (consumption hrs) | Price to user | Specials or Promotions | Sponsored service Ad revenue | Communication Network Cost | User Storage Cost ($/GB/day) | User Likelihood to consume (over time interval) | Value Metric (price/hr) |
| Movie A | 1032b | Video | Tablet 720p | 2 | 1.8 | 1.99 | 0 | 0 | 0 | 0.1 | 10% | 1.11 |
| Game A | 1034 | Game | Tablet SD | 10 | 20 | 10.99 | 0 | 0 | 0 | 0.1 | 8% | 0.55 |
| Game C | 1054 | Game | Tablet SD | 10 | 50 | 19.99 | 0 | 0 | 100 | 0.1 | 5% | 0.40 |

FIG. 18

| 1200 | 1201 | 1202 | 1203 | 1204 | 1205 | 1206 | 1207 | 1208 | 1209 | 1210 | 1211 | 1212 |
|---|---|---|---|---|---|---|---|---|---|---|---|---|
| Value metric information for preloading, Content Provider perspective. Target user with user device 100A | | | | | | | | | | | | |
| Name | ID # | Type | Format | Size (GB) | Duration | Licensing cost | List Price | Ad revenue | Communication Network Cost | User Storage Cost | User Likelihood to consume | Value metric |
| Movie D | 1001 | Video | Tablet HD | 4 | 1:52:16 | 1.00 | 2.99 | 0.20 | 0.2 | 0.1 | 25% | 0.25 |
| Movie D | 1002 | Video | Handset SD | 0.250 | 1:52:16 | 0.50 | 1.99 | N/A | N/A | N/A | N/A | 0 |
| Game D | 1003 | Game | TV HD | 50 | 20 | 15.00 | 19.99 | N/A | N/A | N/A | N/A | 0 |
| Game D | 1004 | Game | Tablet SD | 30 | 30 | 5.00 | 10.99 | 0.50 | 1.5 | 0.75 | 15% | -1.28 |

FIG. 19

| 1200 | 1201 | 1202 | 1203 | 1204 | 1205 | 1206 | 1207 | 1208 | 1209 | 1210 | 1211 | 1212 |
|---|---|---|---|---|---|---|---|---|---|---|---|---|
| Value metric information for preloading, Content Provider perspective. Target user with user device 100B | | | | | | | | | | | | |
| Name | ID # | Type | Format | Size (GB) | Duration | Licensing cost | List Price | Ad revenue | Communication Network Cost | User Storage Cost | User Likelihood to consume | Value metric |
| Movie D | 1001 | Video | Tablet HD | 4 | 1:52:16 | 1.00 | 2.99 | 0.20 | 0 | 0.01 | 25% | 0.54 |
| Movie D | 1002 | Video | Handset SD | 0.250 | 1:52:16 | 0.50 | 1.99 | N/A | N/A | N/A | N/A | 0 |
| Game D | 1003 | Game | TV HD | 50 | 20 | 15.00 | 19.99 | N/A | N/A | N/A | N/A | 0 |
| Game D | 1004 | Game | Tablet SD | 30 | 30 | 5.00 | 10.99 | 0.50 | 0 | 0.075 | 15% | 0.90 |

FIG. 20

| 1200 | 1201 | 1202 | 1203 | 1204 | 1205 | 1206 | 1207 | 1208 | 1209 | 1210 | 1211 | 1212 |
|---|---|---|---|---|---|---|---|---|---|---|---|---|
| \multicolumn{13}{|c|}{Value metric information for deleting. Content Provider perspective. Target user with user device 100A} ||||||||||||
| Name | ID # | Type | Format | Size (GB) | Duration | Licensing cost | List Price | Ad revenue | Communication Network Cost | User Storage Cost | User Likelihood to consume | Value metric |
| Movie D | 1001 | Video | Tablet HD | 4 | 1:52:16 | 1.00 | 2.99 | 0.20 | N/A | 0.1 | 3% | -0.03 |
| Game D | 1004 | Game | Tablet SD | 30 | 30 | 5.00 | 10.99 | 0.50 | N/A | 0.75 | 10% | 0.22 |

FIG. 21

Value metric information for moving, Content Provider perspective.
Target user with user device 100B

| 1200 | 1201 | 1202 | 1203 | 1204 | 1205 | 1206 | 1207 | 1208 | 1209 | 1210 | 1211 | 1212 |
|---|---|---|---|---|---|---|---|---|---|---|---|---|
| Name | ID # | Type | Format | Size (GB) | Duration | Licensing cost | List Price | Ad revenue | Communication Network Cost | User Storage Cost | User Likelihood to consume | Value metric |
| Movie D | 1001 | Video | Tablet HD | 4 | 1:52:16 | 1.00 | 2.99 | 0.20 | 0 | 0.001 | 15% | 0.33 |
| Game D | 1004 | Game | Tablet SD | 30 | 30 | 5.00 | 10.99 | 0.50 | 0 | 0.0075 | 15% | 0.97 |

FIG. 22

| Variable pricing of content available to a user device (for example user view from Smartphone) ||||||| 
|---|---|---|---|---|---|---|
| Storage Location | Type/ Name | Format | View Now | View Now with Sponsored ADs | View at Home within 2hrs | View Tomorrow |
| Smartphone | Movie P | HD | 5.99 | 4.99 | 1.99 | 0.99 |
| Smartphone | Movie P | SD | 2.99 | 0 | 0.99 | 0.99 |
| Home Gateway | Movie Q | HD | N/A | N/A | 1.99 | 1.99 |
| Home Set Top Box | Movie R | HD1080p | N/A | N/A | N/A | 1.99 |

FIG. 27

CONTENT DISTRIBUTION WITH A QUALITY BASED ON CURRENT NETWORK CONNECTION TYPE

FIELD OF THE DESCRIBED EMBODIMENTS

The described embodiments relate generally to distribution of content. More specifically, the described embodiments relate to methods, systems and apparatuses for distributing content over a communication network based on a value metric.

BACKGROUND

Digital user devices, communication networks and content choices are proliferating. These devices (for example smartphones, tablet, notebooks, PCs, etc.) come in many different forms, most significantly in terms of the mobility, UI/display and storage capability. Communication network (for example WiFi, cellular, Ethernet, etc.) parameters change by orders of magnitude in performance and cost. The content available (for example movies, music, games, apps) is also very heterogeneous in size, formats, cost, etc. The user of a specific user device often is interested in access to a specific content over a specific communications network at a specific time/location. Often the size of the content or the speed/cost of the communication network make it impractical to access the content, resulting in lost revenue for a content provider or a content broker, and results is a dissatisfied user.

It is desirable to have methods, systems and apparatuses for preloading desired and valued content at an appropriate storage element of an appropriate user device for an appropriate user over an appropriate communication network.

SUMMARY

An embodiment includes a method of distributing content over a communication network. The method includes managing, by at least one content distribution server, a plurality of content. The method further includes assisting preloading of at least a portion of a content to a storage element as directed by a service provider, wherein the content is selected from the plurality of content based on a value metric, wherein the value metric includes a cost parameter, and wherein the storage element is coupled to the at least one content distribution server over the communication network.

Another embodiment includes a method of a user device receiving content over a communication network. The method includes receiving over the communication network a plurality of content from a service provider server. Further, the method includes preloading, as directed by software operable on the user device associated with a storage element, a content selected from the plurality of content, including selecting the content from the plurality of content based on a value metric, wherein the value metric comprises a cost parameter, and assisting the user device to preload at least a portion of the content to the storage element over the communication network.

Another embodiment includes content distribution system. The content distribution system includes at least one content distribution server coupled over a communication network to a storage element. Further, the at least one content distribution server includes at least one processor configured to manage a plurality of content, and assist preloading of at least a portion of a content to the storage element, wherein the content is selectable from the plurality of content, wherein the selection is based on a value metric, and wherein the value metric comprises a cost parameter.

Another embodiment includes a program storage device readable by a machine, tangibly embodying a program of instructions executable by the machine to perform a method of distributing content over a communication network. The method includes managing a plurality of content, and assisting preloading of at least a portion of a content to a storage element, wherein the content is selected from the plurality of content based on a value metric, wherein the value metric comprises a cost parameter, and wherein the storage element is connected to the service provider server over the communication network.

Other aspects and advantages of the described embodiments will become apparent from the following detailed description, taken in conjunction with the accompanying drawings, illustrating by way of example the principles of the described embodiments.

BRIEF DESCRIPTION OF THE DRAWINGS

FIG. 7A shows a content distribution server and a plurality of storage elements according to an embodiment.

FIG. 7B shows a content distribution server and a plurality of storage elements according to an embodiment.

FIG. 9 is a table that includes an example list of relevant user device parameters according to an embodiment.

FIG. 10 is a table that includes an example list of communication networks available to the user devices associated with a user according to an embodiment.

FIG. 11 is a table that includes an example of relevant parameters for a number of storage elements available to a user across multiple devices associated with a user according to an embodiment.

FIG. 12 is a table that includes an example of a user input table according to an embodiment.

FIG. 15 is a table that includes a sample list of content at home reservoir according to an embodiment.

FIG. 16 is a table that includes a sample list of content and parameters at POI reservoir according to an embodiment.

FIG. 17 is a table that includes a sample list of content and parameters at content provider reservoir according to an embodiment.

FIG. 18 is a table that includes value metric information associated to a user to obtain value metric for selecting content to be preloaded onto user device according to an embodiment.

FIG. 19 is a table that includes examples of additional parameters that may be used to enhance value metric analysis from a content provider perspective for selecting content to preload for a user with user device according to an embodiment.

FIG. 20 is a table that includes another example for value metrics from a content provider perspective for a second user device according to an embodiment.

FIG. 21 is a table that includes an example of an update to parameters and value metrics of FIG. 19 at a later time, where content are currently preloaded onto user device according to an embodiment.

FIG. 22 is a table that includes an example of an update to parameters and value metrics of FIG. 20 where the content currently preloaded onto user device is considered for moving to a second storage element according to an embodiment.

FIG. 27 is a table that includes a variable price of content preloaded and offered to a user according to an embodiment.

DETAILED DESCRIPTION

Figure 1:
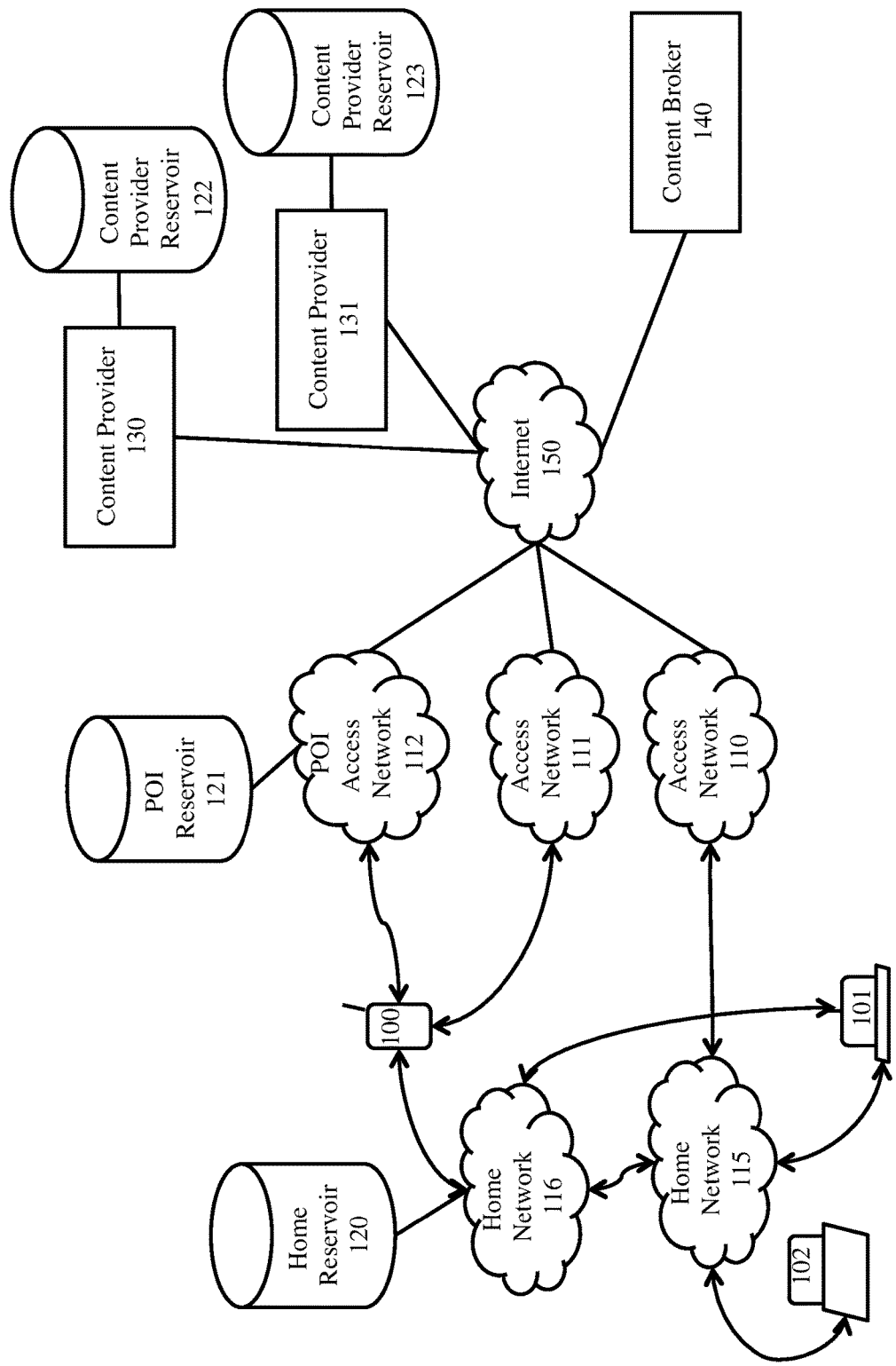
FIG. 1 shows multiple user devices for accessing content reservoirs over several communication networks, which may be improved according to embodiments.

FIG. 1 shows multiple user devices 100, 101, 102 for accessing content reservoirs 120, 121, 122, 123 over several communication networks 110, 111, 112, 115, 116, which may be improved according to embodiments. User devices could have very different properties and be utilized in different ways by users. For example user device 100, could be a phone, smartphone, PDA, tablet, etc. Examples of relevant parameters of these devices are more mobility, long battery life, connectivity to wireless access networks, smaller size, smaller display and smaller storage, etc. For example user device 101, could be a tablet, notebook, netbook, laptop, etc. Examples of relevant parameters of these devices are medium mobility, medium battery life, connectivity to both wireless and wired networks, medium size, medium storage and medium display size, etc. For example user device 102, could be a PC, home gateway, TV attached to DVR, set top box (STB), etc. Examples of relevant parameters for these devices are limited or no mobility, plugged to electrical outlets, connectivity to wired or home wireless networks, bigger size, large storage, larger displays, etc. Communication Networks also have very different properties and can be utilized in different ways by users. Examples of communication networks include a home network 116 which could be wireless home networks, such as personal wireless area network (for example WPAN—Bluetooth, IR, etc.), local wireless area networks (for example WLAN-WiFi, 0.11a, 11b, 11n, 11ac, etc.), etc. Typical parameters are local mobility, medium bandwidth, medium reach or coverage, medium reliability, very low cost per bit (for example could be free), etc. For example home network 115 could be a wired home network, such as Ethernet network, multimedia over cable alliance (MOCA) network, HomePlug (communication over powerline) network, etc. typical parameters are no mobility, high bandwidth, high reliability and low cost per bit. Communication networks could also be Access networks. For example Access network 110 could be a wired copper or cable broadband connection, such as ADSL, VDSL, DOCSIS or a fiber connection. Typical parameters are no mobility, medium to high bandwidth, medium to high reliability, flat fee per month of usage. For example access network 110 could also be a fixed wireless broadband connection, such as WiMAX. Typical parameters could be limited or no mobility, medium bandwidth, medium reliability, etc. For example access network 111 could a wireless mobile network, such as 2G/3G/4G, GPRS, edge, HSPA, EVDO, LTE, etc. Typical parameters are high mobility, large coverage, low to medium bandwidth, low to medium reliability, flat monthly fee with or without limits or relatively high cost per bit, etc. For example a communication network could be a POI Access network 112. A POI could be a work office, coffee shop, restaurant, grocery store, department store, airport, school, government building, etc. each of these POI could have a access network to provide valuable content to user devices. Typically these POI access networks are WLAN such as WiFi networks, but could be WPAN, Ethernet, etc. examples of typical parameters comprise medium bandwidth, medium reliability, local mobility, free access, one time or limited subscription, etc. User devices communicate over these communication networks to access content provided by one or more content providers, for example content providers 130 and 131, which store their content at one or more content providers, for example content provider reservoir 122 and 123. Content stored at these content provider reservoirs could include movies, sport events, shows, videos, photos, music, music videos, news, books, audio books, ring tones, games, software programs, software updates, apps, etc. the user devices may obtain content from one content provider or multiple content providers. Each content provider may have one type of content of multiple types of content. Additionally content may be stored at POI reservoir 121 associated with POI access network 112 to help the user device access content. For the embodiments described here, a POI reservoir 121 can be a storage element (or intermediate storage element) associated with one or more user devices. Furthermore content may be stored at home reservoir 120 to help the user device access content. For the embodiments described here, a home reservoir 120 can be a storage element (or intermediate storage element) associated with one or more user devices. To help the user devices to access content, a content broker 140 manager may be advantageous. The content broker 140 could have access to relevant information from multiple users, multiple user devices, multiple storage elements, multiple communications networks, multiple content providers and multiple content for a more efficient, profitable and improved user satisfaction content consumption.

Problems with Consuming Content

A user of a user device may want to access content at any time and at any location. At some locations the user device may only have access to content over an expensive or low performance communication network relative to the desired content parameters. For example the user may want to view a 500 MB movie that requires a sustained 1 Mb/sec connection on a mobile user device (for example a tablet) over a cellular wireless communication network with a 200 MB/month data plan or over a wireless communication network with a peak rate of 10 Mb/sec per channel that is shared over multiple users in a cell. The movie may start showing while it is downloading (for example streaming), but then the movie will likely pause as other user devices share the wireless communication network, thus providing an unsatisfactory viewing experience. The problem of delayed and paused viewing is compounded when the movie is longer in length.

A user could proactively download content onto storage (for embodiments the storage is a storage element of the described embodiment) of the user device ahead of time, but then the user would have to plan ahead or search for content that may be desirable. Also, downloading the clips over and expensive communication network can take a lot of precious bandwidth, which can be costly.

In an embodiment these problems are avoided by allowing content to be preloaded to the storage on a user device.

In an embodiment a tradeoff is made between one or more of a communication network resources or one or more storage resources so that content can be preloaded in to the appropriate storage element for an improved user content service offering. In an embodiment the communication network is utilized when resources are available, lower cost, not busy (off peak hour). In an embodiment the storage manager or a content manager can preload the user device storage or associated storage (for example a nearby gateway storage or intermediate storage element) with the most likely (or most valuable, etc.) content that user will end up consuming.

In an embodiment a user will have a much better content consuming experience if the content is available immediate or near-to-immediate.

User Devices

Figure 2:
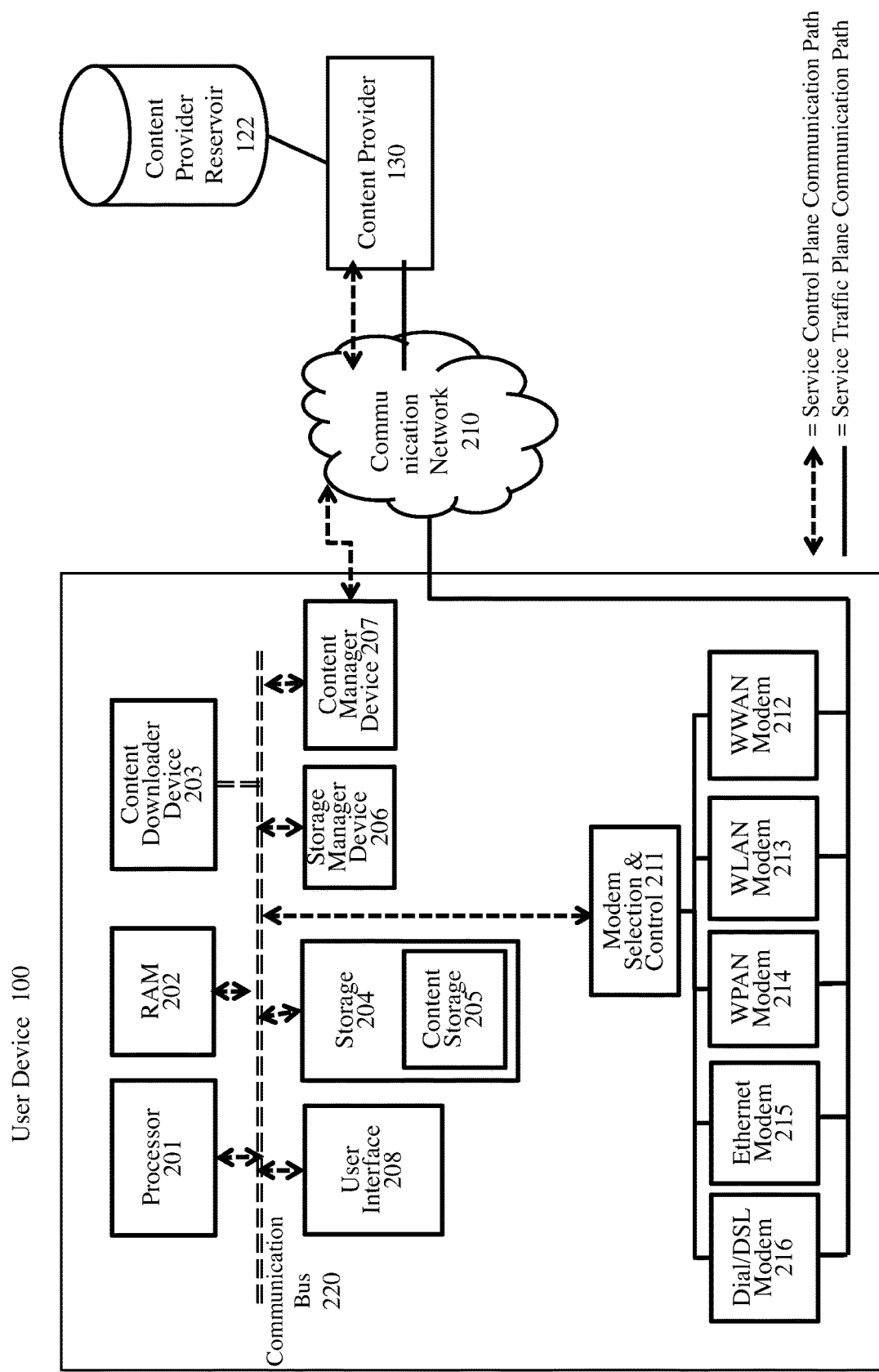
FIG. 2 shows a typical configuration for a user device according to an embodiment.

FIG. 2 shows a typical configuration for a user device 100 for an embodiment. It includes a communication bus 220 (it is to be understood in at least one embodiment that communication bus 220 is at least one of the communication networks of the described embodiments), connected to multiple hardware or software modules. Many other configurations are possible, with additional modules or without some of the modules. The modules included in FIG. 2 are a processor 201, a RAM 202, a user interface 208 to exchange information and/or content with the user, a storage 204 which includes software programs, content from the user, etc. and content storage 205, which includes the content originating from the content provider reservoir 122, a storage manager device 206 for managing the storage elements of the content storage 205, a content manager device 207 for managing the content elements of the content storage 205, a content downloader 203, for downloading the content from the reservoir onto the content storage 205. Mover the user device 100 includes one or more modems to exchange content over one or more communications networks. The one or more modems comprises one or more of a dial-up/DSL modem 216, an Ethernet modem 215, an WPAN modem 214, a WLAN modem 213 and a WWAM modem 212. The user device communicates with the content provider over a service control plane to the content manager device 207 and a traffic plane over the appropriate modem for the associated communication network.

Figure 3:
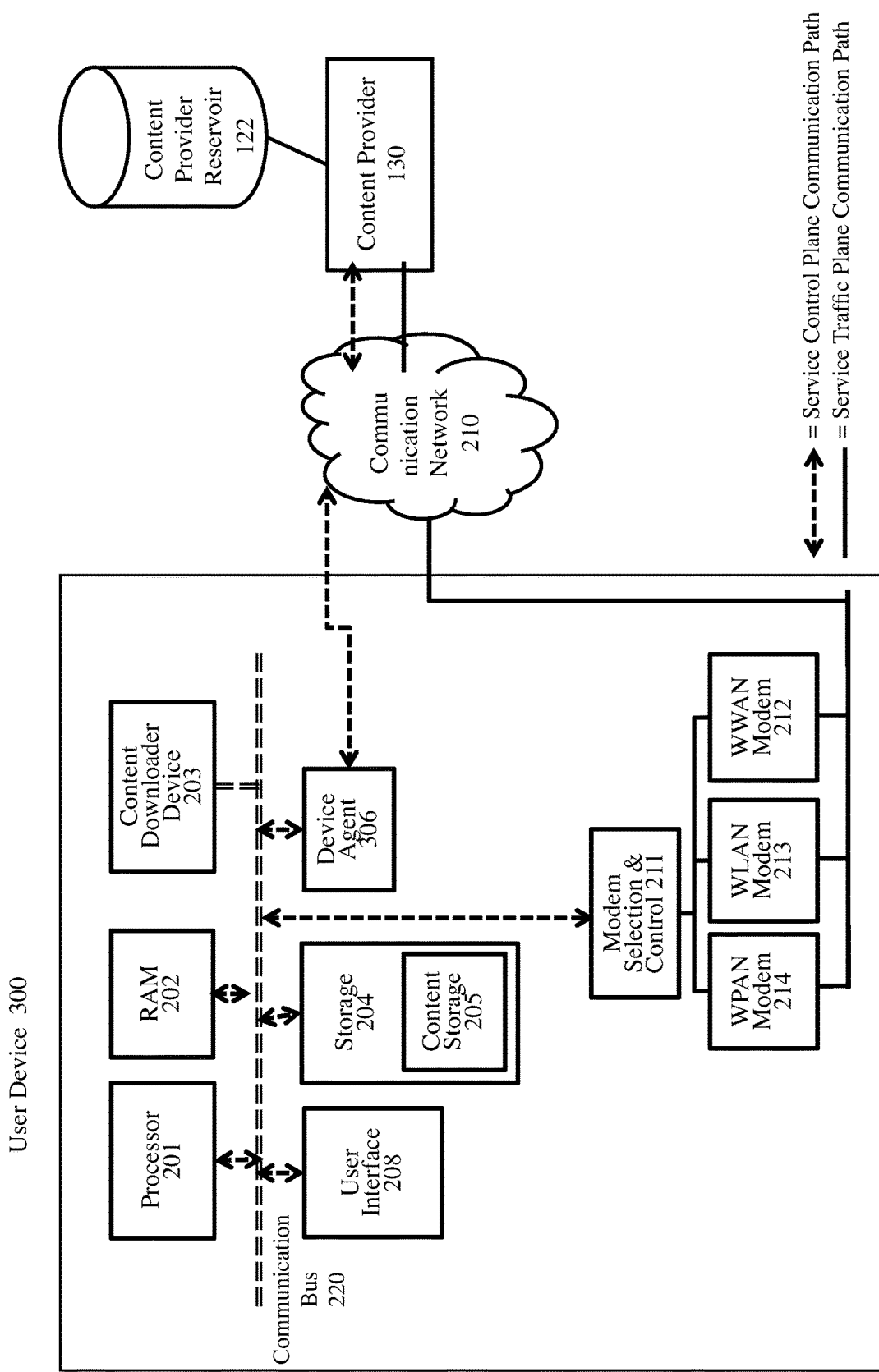
FIG. 3 shows a typical configuration for a user device 300 with less functionality than user device 100, for an embodiment.

FIG. 3 shows a typical configuration for a user device 300 with less functionality than user device 100, for an embodiment. FIG. 3 includes a communication bus 220 (it is to be understood in at least one embodiment that communication bus 220 is at least one of the communication networks of the described embodiments), connected to multiple hardware or software modules. The modules included in FIG. 3 are a processor 201, a RAM 202, a user interface 208 to exchange information and/or content with the user, a storage 204 which includes software programs, content from the user, etc. and content storage 205, which includes the content originating from the content provider reservoir 122, a device agent 306 (which may include a subset of the functionality included in content manager device 207 or storage manager device 206), a content downloader 203, for assisting preloading the content from the reservoir onto the content storage 205. The user device 300 includes one or more modems to exchange content over one or more communications networks. The one or more modems comprise one or more of an WPAN modem 214, a WLAN modem 213 and a WWAM modem 212. The user device communicates with the content provider over a service control plane to the content manager device 207 and a traffic plane over the appropriate modem for the associated communication network.

Distribution Server

Figure 4:
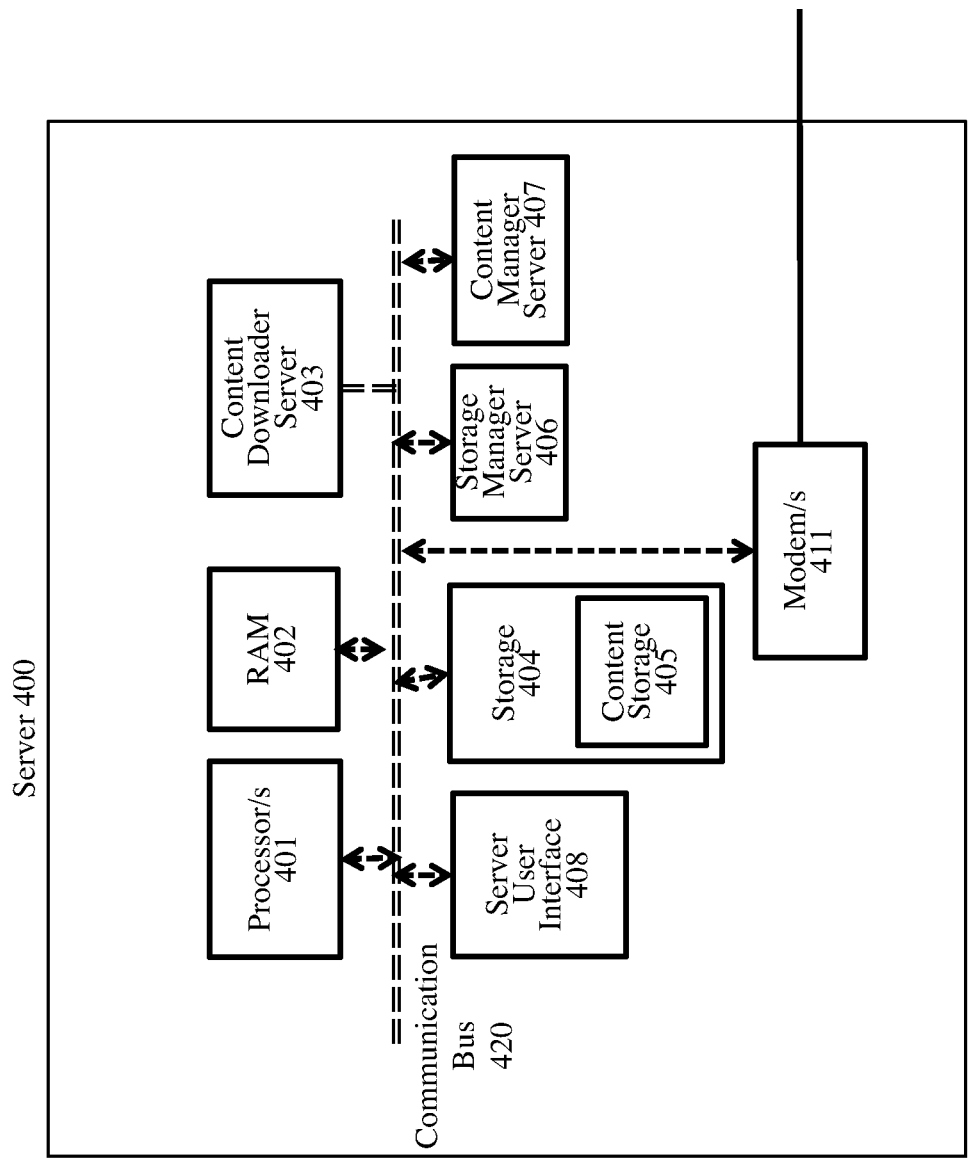
FIG. 4 shows a typical configuration for a distribution server according to an embodiment.

FIG. 4 shows a typical configuration for a distribution server 400 according to an embodiment. For the description here, the terms content distribution server and network content server may be used interchangeably to represent the distribution server 400. The distribution server 400 includes a communication bus 420 (it is to be understood in at least one embodiment that communication bus 420 is at least one of the communication networks of the described embodiments), connected to multiple hardware and/or software modules. Many other configurations are possible, with additional modules or without some of the modules. The modules included in FIG. 4 are a processor 401, a RAM 402, a server user interface 408 to exchange information and/or content with a server administrator, manager, etc., a storage 404 which may include software programs, content, value metric information, etc. and content storage 405, which may include content originating from the content provider, ad provider, a storage manager server 406 for managing the storage elements of the content storage 405, a content manager server 407 for managing the content elements of the content storage 405, a content downloader 403, for downloading the content from a reservoir or content storage 405 or one or more storages associated with user devices. Moreover the distribution server may include one or more modems to assist in preloading content over one or more communications networks. The distribution server 400 may be part of a server provider or content provider or content broker, etc. platform. The distribution server 400 may be part of a service provider or content broker platform and communicate with the content provider over a service control and the content manager device 407 over the appropriate modem for the associated communication network.

Embodiments of Content Distribution

Figure 5:
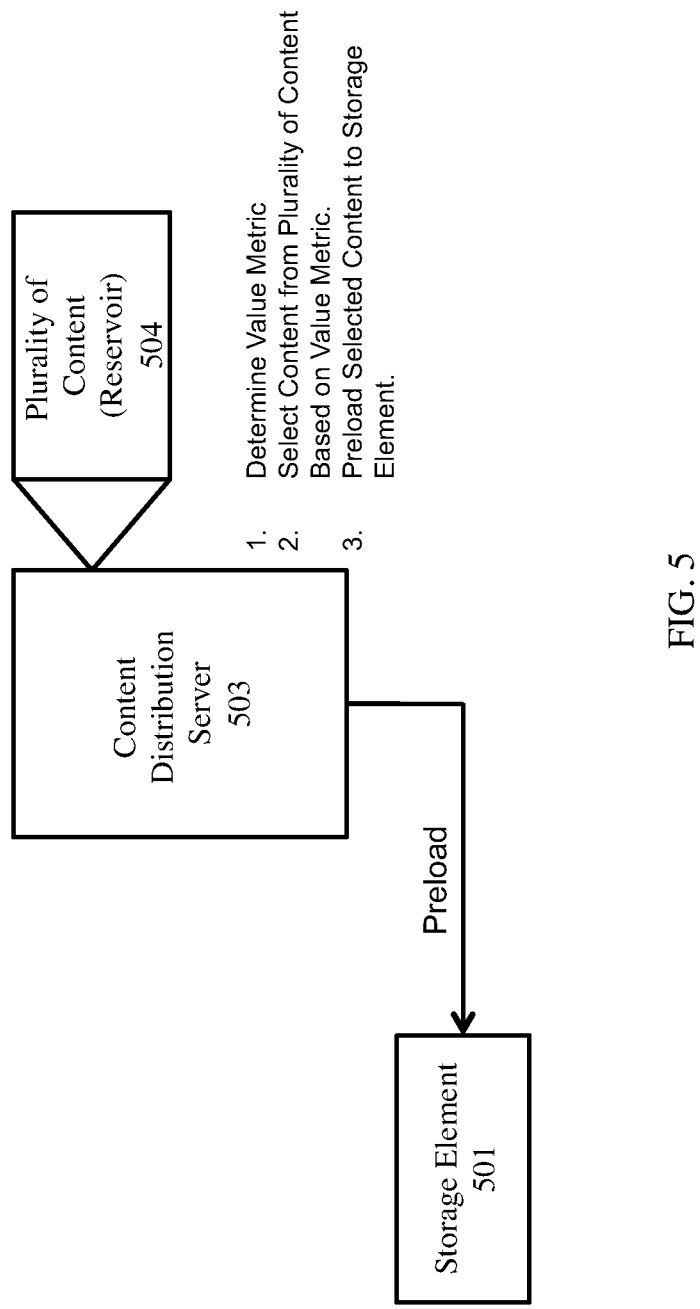
FIG. 5 shows a content distribution server and a storage element according to an embodiment.

FIG. 5 shows a content distribution server 503 and a storage element 501 according to an embodiment. For this embodiment, the content distribution server 503 manages a plurality of content 504. The content distribution server 503 determines a value metric based on a function or model of one or more value metric parameters or cost parameters. The value metrics parameters are based on, for example, parameters of the plurality of content, parameters associated with the storage element 501, and/or parameters associated with a communications network between the content distribution server 503, the storage element 501 and a user device associated with the storage element 501.

This embodiment further includes the content distribution server 503 selecting a content from the plurality of content 504 based on the value metric. Once selected, the content distribution server 503 preloads at least a portion of the content to the storage element 501 as directed by a service provider over the communications network.

For an embodiment, the service provider is a content broker that provides distribution of content for a content provider. For another embodiment, the service provider is the content provider as well as the content distributor. The service provider selects the content, and assists preload of the at least the portion of the content by directly pushing the at least a portion of the content to the storage element 501 over the communication network.

Once the content is preloaded to the storage element 501, any number of user devices can assess and consume the preloaded content. For an embodiment, the storage element 501 is included within a user device.

Figure 6A:
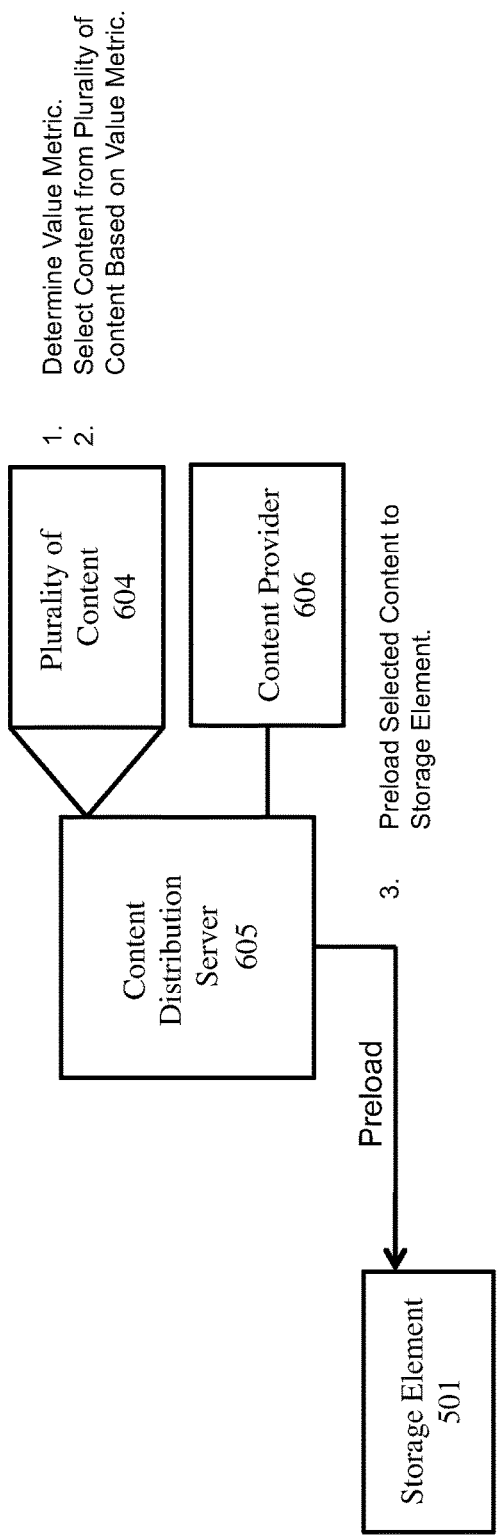
FIG. 6A shows a content distribution server and a storage element according to another embodiment.

FIG. 6A shows a content distribution server 605 and a storage element 501 according to another embodiment. For this embodiment, the content distribution server 605 manages a plurality of content 604. The content distribution server 605 determines a value metric based on a function or model of one or more value metric parameters or cost parameters.

For this embodiment, the service provider is a content broker that provides distribution of content for a content provider 606. For this embodiment, the service provider selects the content, and assists preload of the at least the portion of the content by assisting the content provider 606 to push the at least a portion of the content to the storage element 501 over the communication network.

Figure 6B:
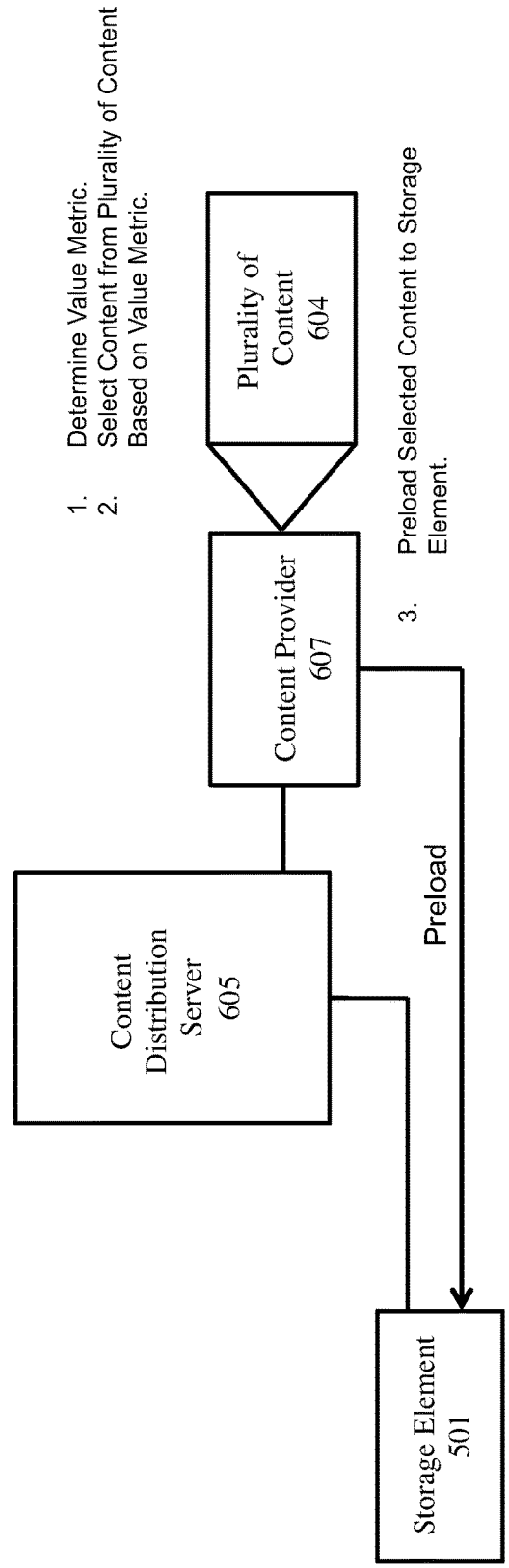
FIG. 6B shows a content distribution server and a storage element according to another embodiment.

FIG. 6B shows a content distribution server 605 and a storage element 501 according to another embodiment. For this embodiment, the content provider 605 manages a plurality of content 604. The content distribution server 605 determines a value metric based on a function or model of one or more value metric parameters or cost parameters.

For this embodiment, the service provider is a content broker that provides value metric information or content selection services (lists, queues, pointers, etc.) to a content provider 607. For this embodiment, the service provider assists preload of content and the content provider 606 pushes the at least a portion of the content to the storage element 501 over the communication network.

FIG. 7A shows a content distribution server 705 and a plurality of storage elements 701A, 701B, 701C according to an embodiment. For this embodiment, the content distribution server 705 broadcasts at least a subset of the plurality of content. The storage elements 701A, 701B, 701C receive the broadcast content over the communications network.

Each of the storage elements 701A, 701B, 701C has one or more associated processors (either directly, or indirectly through an associated user device). At least one of the associated processors includes software (in at least some embodiments, the software is provided by the service provider) that is operative to select a content from the plurality of broadcast content based on the value metric. For an embodiment the value metric is determined at the storage elements, for other embodiment the value metric is or could it be provided to the storage elements and for other embodiments the value metric is determined jointly by the storage elements and a processor associated to a distribution server. Once the content has been selected, one or more of the storage elements 701A, 701B, 701C, preloads at least a portion of the selected content as received from the content distribution server 705 broadcasts. The content distribution server 705 may also determine a value metric to select a subset of the plurality of content 704 to be broadcast. The value metric may be based on one or more of the storage elements 701A, 701B, 701C, the content, user devices associated to the storage elements, users associated to the user devices associated to the storage elements, the communication network, etc.

FIG. 7B shows a content distribution server 707 and a plurality of storage elements 702A, 702B, 702C according to an embodiment. For this embodiment, the content distribution server 707 multicasts at least a subset of the plurality of content. The storage elements 702A, 702B, 702C can receive the multicast content over the communications network. For one embodiment, the multicasts are only received by storage elements 702A, 702B that have been approved to receive the multicasts. For another embodiment, the storage elements 701A, 701B, 701C each receive the multicasts, but only storage elements 701A, 701B that have an encryption key are able to load the content of the multicasts. The content distribution server 707 may also determine a value metric to select a subset of the plurality of content 704 to be multicast. The content distribution server 707 may also determine a value metric to select a subset of the storage elements 702B, 702C to target to receive a multicast. The value metric may be based on one or more of the storage elements 701A, 701B, 701C, the content, user devices associated to the storage elements, users associated to the user devices associated to the storage elements, the communication network, etc.

Each of the storage elements 701A, 701B, 701C (or 702A, 702B, 702C) has one or more associated processors (either directly, or indirectly through an associated user device). At least one of the associated processors includes software (in at least some embodiments, the software is provided by the service provider) that is operative to select a content from the plurality of broadcast content based on the value metric. For an embodiment the value metric is determined at the storage elements, for other embodiment the value metric is or could it be provided to the storage elements and for other embodiments the value metric is determined jointly by the storage elements and a processor associated to a distribution server. Once the content has been selected, one or more of the storage elements 701A, 701B, 701C, preloads at least a portion of the selected content as received from the content distribution server 705 multicasts.

Figure 8:
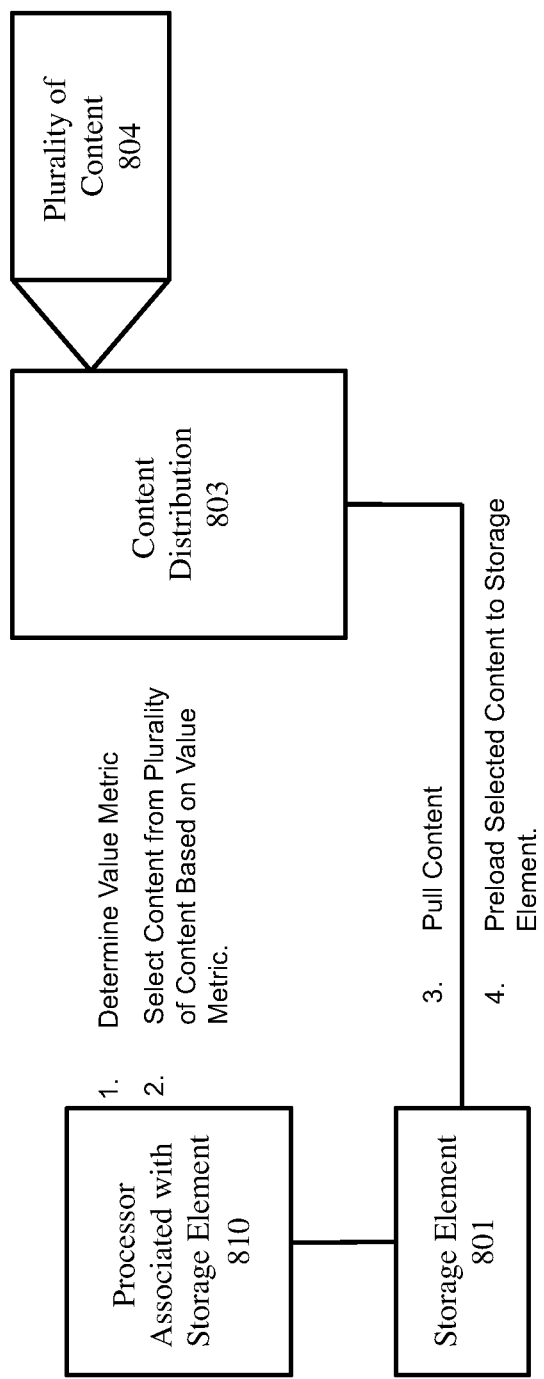
FIG. 8 shows a content distribution server, a storage element and a processor associated with the storage element according to an embodiment.

FIG. 8 shows a content distribution server 803, a storage element 801 and a processor 810 associated with the storage element 801 according to an embodiment. For this embodiment, the processor includes software that is operative when executed to select a content from the plurality of content based on the value metric. Once selected, at least a portion of the selected content is pulled by the storage element 801 from the content distribution server 803 over the communication network, and loaded onto the storage element 801. For at least one embodiment the user device receives over the communication network information associated with the plurality of content. For at least one embodiment the user device receives over the communication network information associated with the plurality of content from the content distribution server 803.

Distribution of Queues of Content

An embodiment includes a content distribution system. The content distribution system includes at least one network content server coupled over one or more communication networks to a plurality of user devices, and a one or more storage elements associated with the plurality of user devices, wherein each of the plurality of user devices is associated with at least one of the one or more storage elements. The at least one network content server includes at least one processor configured to generate a queue of content for each of the plurality of user devices based on parameters of a plurality of available content, and based on storage capabilities of the at least one of the one or more storage elements associated with each of the plurality of user devices, and assist preloading at of least a portion of the queue of content of each of the plurality of user devices to the at least one of the one or more storage elements associated with the user device.

An embodiment further includes the network content server receiving selections of the queue of content from at least one of the plurality of user devices, and the network content server completing a transaction with a user of the at least one of the plurality of user devices.

An embodiment further includes the network content server operative to compile analytics of at least one user of at least one of the plurality of user devices, and wherein generating the queue of content for the at least one of the plurality of user devices is additionally based on the compiled analytics.

For an embodiment, generating the queue of content for each of the plurality of user devices is further based on information associated with other content available on the at least one of the one or more storage elements associated the user device. For an embodiment, generating the queue of content for each of the plurality of user devices is further based on information associated with at least one communication network assisting in the preloading the at least the portion of the queue of content, or the information of at least one of the one or more storage elements associated with the user device. For a specific embodiment, the information associated with the at least one communication network comprises a communication network cost of preloading the at least the portion of the queue of content. For another specific embodiment, the information of at least one of the one or more storage elements comprises a storage element cost of storing the preloaded queue of content.

For an embodiment, generating the queue of content for each of the plurality of user devices is further based on information associated with at least one of the one or more communication networks assisting in presenting at least a portion of the queue of content at one or more of the plurality of user devices. For a specific embodiment, the information associated with at least one of the one or more communication networks comprises a communication network cost of presenting at least a portion of the queue of content.

An embodiment further includes the at least one network content server determining an association of the one of the one or more storage elements with a second plurality of user devices, and wherein generating the queue of content for each of the plurality of user devices is further based on the plurality of user devices or a plurality of users associated with the second plurality of user devices. An embodiment further includes the at least one network content server determining an association of one of the one or more storage elements with two or more of the plurality of user devices, and wherein generating the queue of content for each of the two or more user devices is further based on the two or more user devices or a plurality of users associated with the two or more user devices.

An embodiment further includes the at least one network content server or a processor associated with at least one of the one or more storage elements assisting in deleting of at least a portion of a second content available on the at least one storage element. An embodiment further includes the at least one network content server or a processor associated with a first or a second storage element of the one or more storage elements associated with the user device, assisting in moving at least a portion of a second content available on the first of the one or more storage elements associated the user device to the second or the one or more storage elements associated with the user device.

An embodiment further includes the at least one network content server or a processor associated with at least one of the one or more storage elements preloading the at least the portion of the content to the at least one of the one or more storage elements. The preloading the at least the portion of the content to the at least one of the one or more storage elements includes classifying each of the one or more storage elements based on parameters of the plurality of available content, based on the storage capabilities, and based on a plurality of user parameters, and generating the queue based on the classifications.

An embodiment further includes the at least one network content server or a processor associated with at least one of the one or more storage elements assisting in presentation of information related to the queue of content to a user device of the plurality of user devices associated with the at least one of the one or more storage elements.

An embodiment further includes the at least one network content server or a processor associated with at least one of the one or more storage elements obtaining information associated with a value metric for at least one of the plurality of available content based on prior preloading of the content, and evaluating interaction with the preloaded content, wherein generating the queue of content for each of the plurality of user devices is further based on the value metric.

An embodiment further includes the at least one network content server or a processor associated with at least one of the one or more storage elements operative select a first plurality of storage elements, preload at least a portion of the queue of content onto the first plurality of storage elements, wherein the first plurality of storage elements are associated with a first plurality of user devices, and obtain information associated with a value metric from the at least a portion of the queue of content preloaded onto the first plurality of storage elements, wherein generating the queue of content for each of the plurality of user devices is further based on the value metric.

For an embodiment, the queue of content includes an advertisement. Further, the at least one network content server or a processor associated with at least one of the one or more storage elements is operative to select the advertisement, and assist in presentation of the advertisement to at least one of the plurality of user devices.

For an embodiment, a cost for consuming at least a portion of the queue of content is based on a cost parameter associated with at least one of the one or more storage elements or a communication network.

An embodiment includes allowing a user to access an additional portion of the content, wherein the additional portion of the content in conjunction with the at least a portion of the content allows the user to consume the content. For a specific embodiment, the additional portion comprises a security element, wherein the security element allows the user to consume the content.

An embodiment includes associating business rules to the content, wherein the business rules of the content influence the content consumption.

User Device Parameters

FIG. 9 is a table that includes an example list of relevant user device parameters with example values of total storage size in gigabytes, display size in inches, display resolution, available modems and weather the device is use by a single user or shared by several members of a group (for example family, work, etc.) according to an embodiment. For this example, the total amount of storage available is about 100× higher for the home gateway or network attached storage than for the smartphone. For this example the display of the TV has about 100× more area and about 4× more pixels than the smartphone. The smartphone network access speed could vary between peak rates of 100 s of Kbps when connected to a 2G access network to 10 s of Mbps when connected to a low end WLAN modems and 100 s of Mbps when connected to high end (for example MIMO and/or channel bonding) WLAN modems. The cost of the communication access could vary between $20/GB and completely free. Clearly this is a very heterogeneous set of devices that a user may consume valuable content with.

Communication Networks Available to User Devices

User devices may access content over a plurality of communication networks based on the available modems in the user device, the available networks at a given time and the parameters (wherein parameters may be information) of the communication network (for example speed, cost, QoE, etc.). FIG. 10 is a table that includes an example list of communication networks available to the user devices associated with a user according to an embodiment. FIG. 10 also includes an example list of relevant parameters associated with the communication networks. A list of relevant parameters may include: an ID number, speed or bandwidth of the communication network (for example minimum speed, typical speed, maximum speed, statistics of the speed, QoS, QoE, etc.), monthly rate for access to the communication network service, a maximum usage per month, a cost of usage above the maximum usage, if the network is associated to a single user or a multiuser, and connectivity or coverage details, etc. For example user 1010 has access to a communication network such as home wireless 1000 within nominal speed of 50 Mbps, no monthly rate, no limit on maximum usage, no cost above the maximum usage, it is multiuser, its coverage area is the home, etc. For example user 1010 also has access to a communication network such as cellular 4G roaming network 1004, with nominal speed of 0.5 Mbps, a monthly rate of $5 which does not include any free usage per month, a cost of $50 per gigabyte, associated to a single user typically used at work, etc. For example user 1010 also have access to a communication network such as a POI WLAN #1, with ID 1005, with a nominal speed of 25 Mbps, no monthly rate, no max usage per month, 0 cost per byte, intended for multiple users, is located at a coffee shop, etc. Other examples can be derived from the FIG. 10, and many other combinations are possible.

Based on this example table, for example home wireless network (for example WiFi) provides a fast and low cost method to obtain content while at home. This may be the preferred method for delivering moderately large content to portable devices at home. For example cellular 4G roaming provides a moderately slow and very expensive method to obtain content while on the road, for example traveling abroad. This may be the preferred method to obtain time critical, small content while travelling.

In addition, a user device may have no communication network available at a given time. For example, a mobile user device with WiFi-only connectivity away from a home network or a WiFi hotspot, or a mobile user device in an airplane without WiFi may have no communication network available.

Moreover the communication network available may not have the bandwidth or reliability to support content desired by the user. In an embodiment, content may be preloaded that cannot reliably be consumed over the communication network. For example, HD video content for a large screen TV may require 4 Mbps for a reliable streaming (for example real-time). The communication network such as home broadband access network 110 may not be able to sustain 4 Mbps over the duration of the video. For example, HD video content for smart phone may require 0.5 Mbps for a reliable streaming (for example real-time). The 4G access network 111 may not be able to sustain 0.5 Mbps over the duration of the video.

Clearly this is a very heterogeneous set of communication networks that a user may access content with and active management of the content over the communication networks could results in greatly improved value.

Storage Elements Associated to User Devices

FIG. 11 is a table that includes a list of example relevant parameters (wherein parameters provide a representation of the capabilities of the storage elements) for a number of storage elements available to a user across multiple devices associated with a user according to an embodiment. A user may own one or more storage elements included in devices, such as of a smartphone, a tablet, a notebook, a PC, a Home Gateway, etc. An example user in FIG. 11 may include flash in smart phone A, flash in tablet A, HDD in notebook A, HDD in PC A, HDD in home gateway or set top box (STB) A, HDD in network attached storage (NAS) A, which are listed under the column "Name" in FIG. 11. An example of typical relevant information or value parameters for storage elements are total storage size, available storage, storage reserved for content (for example the latter could be a parameter set by a user) and available storage reserved for content. In addition, list of modems available to each storage element, lists of what storage elements are connected to each other and the communication network could be very valuable to share the storage across user devices for users consumption. In addition statistical parameters of each connection, such as number of hops, end to end bandwidth, QoS, QoE, reliability vs. time may be valuable. In an embodiment, based on a subset of these parameters or other parameters, the storage elements could be classified (for example into tiers or levels) to better manage the storage element and the flow of content between the storage element and the user. In at least one embodiment classification comprises one or more of placing into tiers, ranking, identifying, clustering, characterizing, categorizing.

For example, the Home Gateway may include several modems and networking capabilities (communication network parameters), such as a xDSL broadband access network connection, a WLAN modem to connect to mobile/portable devices (for example smartphone, tablet, notebook) and a SOHO Ethernet switch with several ports to connect to wired devices (for example Network-Attached Storage, PC, STB, notebook).

For example, the HDD in the home Gateway currently has an ID number 1015, 256 GB of total storage, of which 75% is available, 50% of the storage has been reserved for content, has been assigned tier #1 relative to a user device, is one communication network hop from smart phone A, is zero communication network hops from home Gateway A, is currently connected to a home WiFi and a broadband xDSL connection. The HDD in the home Gateway is currently associated with device IDs 1011, 1012, 1013, 1014, 1015, 1016 over one or more communication networks. Many of these value parameters may change over time.

Content and Plurality of Content

A content (it is to be understood that reference to 'content' may represent a selectable element of a plurality of content) includes any data a user may want to consume (for example install or play a video game content, watch a movie or video content, view a photo content, read a book content, listen to a song content, install or execute a software program, app or update, open a file content, browse or read a web page content, read an email content, etc.) or share with other users. Examples are movies, sport events, shows, videos, photos, music, music videos, news, web pages, books, audio books, ring tones, games, software programs, software updates, apps, etc. Available content is very heterogeneous in many different parameters. For an embodiment, it could be visual (for example photos), audio (for example music) or visual and audio (for example movies, sporting event, musical videos, games). For an embodiment, it could be streamed during consumption (for example, live TV) or it may need to be fully or partially preloaded prior to use (for example games, photos, software). It may be short or long, it may come in different formats (for example an audio stream is compressed using an audio codec such as MP3, Vorbis or AAC or a video stream is compressed using a video codec such as H.264 or VP8) for different user devices (for example HD TV vs. smartphone) and or in different formats for the same device (for example SD vs. HD). It may have very different sizes relative to the communication network bandwidth (for example large, medium or small). It may require different QoS parameters for a satisfied user QoE consumption. Relative to the content provider, it may be free, or have a per use licensing fee or a content group licensing fee or a per time period fee. Relative to the user, it may be free, free with sponsoring ads, or have a per use fee or a per time period fee. FIG. 17 is a table that shows some examples of tabulated content available at a content provider with some example content parameters listed.

Many of this large heterogeneous set of content elements (or plurality of content) available could be preloaded onto the storage associated with a user device and consumed at a convenient time for the user at the appropriate user device.

Storage Manager

For an embodiment, storage elements associated with user devices is a precious resource just like bandwidth, computing and battery power and may be managed to provide enhanced value to the user/s. The table in FIG. 11 includes an example of storage elements and an example of parameters that may be helpful to a storage manager (or a content manager, etc.).

The storage manager may include several functionalities to help manage the storage resources (for example, storage elements) associated with user devices from a user or a group of users.

Figure 13:
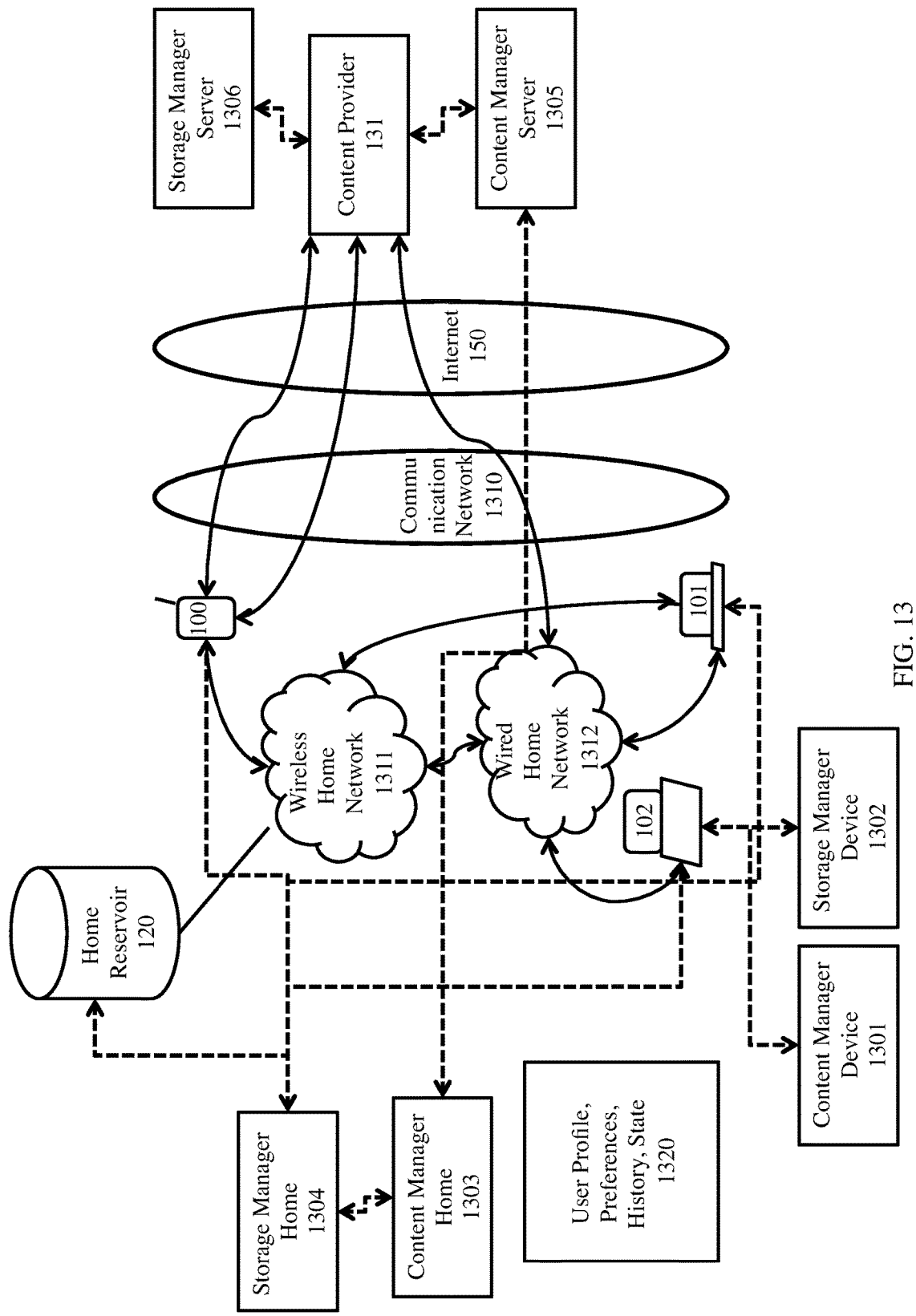
FIG. 13 includes an example of a home network with storage manager and content manager functionality according to an embodiment.

The storage manager may reside at one or more locations. FIG. 13 includes an example of a home network with storage manager and content manager functionality according to an embodiment. For an embodiment, the storage manager could be included at the user device 102 as a storage manager device 1302 (in an embodiment a storage manager is included within a device agent and operable on a processor in a user device), or reside at a centralized location associated with the user and manage several user devices, such as a home gateway as a storage manager home 1304, or may reside at the content provider 131 as a storage manager server 1306. Alternatively or in addition, the storage manager server may also reside at a content broker that manages content of a plurality of content providers for a plurality of users. In an embodiment the storage manager resides at a content distribution server. The storage manager may have a master/slave, server/client, centralized or distributed configurations to manage storage of the plurality of user devices. For an embodiment, a storage manager could be a software program or an app. The storage manager could be implemented in hardware or software or both hardware and software. Storage Managers 1302, 1304, 1306, may have access to information 1320, comprising one or more of user profile, user preferences, user history, user state (location, leisure mode, time, etc.). The content manager may have a master/slave, server/client, centralized or distributed configurations to manage content of the plurality of user devices.

Storage Manager Discovery Function

A storage manager server, storage manager home or storage manager client, etc. may be installed at one or more of the user devices. During power-up or first time initialization the storage manager discovery function may identify available storage elements associated to the user devices that the user may access for content. For an embodiment the storage manager discovery function includes initializing a table such as FIG. 11. For an embodiment, the storage manager discovery function includes one or more of searching for a list of storage elements, assigning them a name or an ID, fetching the storage location, storage size, storage type (for example HDD, Flash, etc.), storage access time, storage available or free storage, and how this storage is connected to a user device. A storage element may be located inside a user device, for example through a communication network such as a data communication bus, or may be connected through one or more modems over one or more communications network to other user devices. A storage element may require multiple communication network hops to be connected to a user device. Communication network connectivity parameters of interest to the storage manager between the one or more storage elements and the one or more user devices could include one or more of: modem type (for example WiFi, Ethernet, etc.), statistical parameters of the connection (for example max, min, typical bandwidth, etc.), QoS parameters, other applications using the connection, users sharing the connection, reliability of the connection, latency, number of hops, etc. For the embodiment in FIG. 11, the storage manager discovery function could identify a flash of Smartphone A has an ID of 1011, a total storage capacity of 32, of which 50% is currently available. The flash storage element is coupled to modems that enable connectivity to cellular and WiFi networks. For this embodiment, at the time of discovery the flash storage element could communicate with storage elements 1014 (for example the smartphone is connected to the PC through a fast and low cost USB port) and 1015 (for example connected to home gateway through the WiFi) and 1016 (for example connected to home gateway through the WiFi and the home gateway is connected to Network-Attached Storage through Ethernet).

For this embodiment, the storage manager discovery function determines that the user device Smartphone A is 0 communication hops away from the relatively small Flash in Smartphone A, one communication hops from the larger storage in PC A, and two communication (link) hops away the largest storage in Network-Attached Storage. For this embodiment, the smartphone A is connected to the Network-Attached Storage over two sequential communication network hops. For this embodiment, the communication network connectivity performance will be determined by the aggregate of these two sequential, serial or cascaded links. For an embodiment with two sequential communication network hops, the overall latency will be larger than or equal to the sum of each link latency and the overall bandwidth will be less than or equal to the lower bandwidth communication network link bandwidth and the QoS, QoE, will be limited by the worse of the two links.

In an embodiment, there may be two or more communication networks or one or more communication networks with more than one path between a user device and a storage element. For an embodiment, each of the communication paths could be managed (for example monitored, logged, etc.) independently with associated parameters for each of the communication network paths. For an embodiment each of the communication network paths could be used to transfer content more efficiently based on content parameters, user parameters, etc. and could be used effectively as one or more of the communication paths becomes unreliable or is disconnected or disabled or powered down.

Storage Manager Update Function

For an embodiment, storage element parameters (including connectivity parameters) change over time. For an embodiment, a user device may be carried outside the home WiFi coverage area (for example carried to work), or a storage element (for example a the Network-Attached Storage) attached to a home gateway may be powered down, or a mobile device (for example a smartphone) connected to a portable device (for example a notebook) through a PAN (for example a USB cable) for a big content transfer may be disconnected later. In an embodiment, the user may purchase additional user devices.

For an embodiment, it is advantageous to update (for example periodically or dynamically) the storage manager status information. The storage manager update function could be located at a subset of the user devices (for example as a storage manager update function device), or at a central location for a plurality of user devices associated with a user (for example as a storage manager update function home or work) or at the content provider (for example distribution server) or reservoir (for example as a storage manager update function server). The storage manager information could be distributed or centralized across one or more storage manager update function sites. The storage manager update functions could use keep alive signals to maintain storage manager status, or polling signals or interrupt signals from devices or some other method. This information would be used to maintain a current status of the storage network (for embodiments a storage network includes a plurality of storage elements) available to the user or a user device. This function could monitor status/changes in storage on/off status, connectivity on/off, list of active modems, modem link performance, connectivity bandwidth, QoS, QoE, available storage, available content, location, number of hops, etc. This function could determine if new storage is added to the network, problems with the storage (for example reliability, corruption, etc.). The storage manager update function could also delete storage elements from the storage network if necessary.

The storage manager update function could also monitor storage element parameters and compute statistics vs. time or vs. location or vs. user. The storage manager update function could be useful for preloading content or providing content to the end user. For an embodiment, if a storage element is usually powered down at night, it may not be helpful for storing off peak broadband data downloaded at night. If a user device is carried to work during the day, it could be helpful to preload a coupled or attached storage element with content at night. If the user of a user device takes the user device to the park without cellular data coverage for lunch break to read financial news, it may be helpful to preload relevant content during the morning over the users work communication network.

User Parameters for Storage Manager

To enhance the storage manager operation, it may be advantageous to provide it with storage parameter information relative to the user/s. For an embodiment, during enrolment the user may input a list of preferences (for example partially and/or updating over time). FIG. 12 is a table that includes an example of a user input table according to an embodiment. For an embodiment, the user/s may input for each storage element preferences related to the content type (for example ranked or graded/scaled, could include blocked content, parental control), content format, how much storage to reserve for content, if the storage element is used by a single or a list or a group of users. Also preferred locations where the storage element will be used and preferred communication network (for example could be ranked list, could have a exclusive list, preferred list, blocked list, etc.). The user may input information related to the various communication network data plans available. The user/s may update the information over time.

In an embodiment a user entity may be a user device, storage element, etc. In addition to the direct input from the user, the user entity may collect user and/or user device and/or storage history instead of user input or in addition to user input to further assist the storage manager. This information could include user utilization of user entities (for example times or locations), content type/format/etc. vs. time/location consumed at the user devices, content type/format/etc. purchased vs. time/location at the user devices. This information could further include updated usage or predicted usage of communication network data plans relative to cost/limits/etc. This information could further include responses from the user to storage manager notifications. For an embodiment, the storage manager may notice that a specific storage element has not been used for an amount of time larger than a threshold and notify the user and request a yes/no answer to whether this storage element is no longer available (for example damaged or deleted from home network).

Storage Manager Allocation Function

In addition the storage manager may include a storage manager allocation function that provides storage for an improved user's content value. Storage manager can run its own allocation function based on several attributes including content size, user's preferences, user's historical content consumption (for example type, quality), user's need of content based on its location, the likelihood of the content being consumed by the user, the content life expectancy (for example amount of days/hours it will be stored), etc.

Storage elements could inform the one or more storage managers of storage availability while being cognizant to storage needs of the application that are in place in the user device. Storage resources being managed across a communication network over various user entities in order to provide a better user experience as far as content consumption (storage consumers). This means that by aggregating all the available storage elements in a common pool, the storage manager is able to provide a larger and more valuable storage per user for immediate and/or near-to-immediate consuming.

Based on a storage request from a content distribution server (for example a content manager operable on the content distribution server), a storage manager can allocate a fixed storage size to a given user (not necessary cognizant to content itself) or variable size storage. The storage can be based on min and peak value as identified to the content manager.

Some embodiments can also strive to provide content that is closer to the user device, if not necessarily on the device. In this manner, the user can then download the content faster, and will more likely download content, than if had to go through a congested or expensive communication network from a content source.

Storage Manager: Classifying Storage

An embodiment includes preloading content to at least one of a plurality of storage elements, wherein the plurality of storage elements includes the storage element. For this embodiment, preloading includes classifying each of the plurality of storage elements based on a plurality of content parameters, and preloading based on the classifications. For one embodiment, the multiple storage elements are associated with a single user device. For other embodiments, the multiple storage elements are associated with more than a single user device.

For an embodiment, classifying each of the plurality of storage elements influences the value metric, wherein the value metric influences which of the plurality of content is selected. For an embodiment, the classifying of each of the plurality of storage elements includes evaluating a communication network between at least one associated user device and one or more of the plurality of storage elements.

In an embodiment, given the plurality of storage elements with differences in storage size, connectivity, mobility, etc. associated with a plurality of user devices located at {physical, time, connectivity, etc.} locations relative to the user it may be advantageous to classify the storage elements to help simplify the storage management and content management. In at least one embodiment classifying comprises one or more of organizing, sorting, ranking, classifying into tiers. For an embodiment, the classifying is based on one or more of the following storage element or communication network parameters: access time/latency, access bandwidth, QoS, QoE, storage (available) size, number of communication hops to the user device or consuming user. Furthermore the classifying could be based on the storage locations: for example home storage, work storage, POI storage, cloud storage, content provider storage or content broker storage network. Furthermore the classifying could be based on location, connectivity or speed relative to a particular user device or a particular user. The classification could be static, quasi-static or dynamic. An example of static storage classification could be a fully wired network that does not add or delete any elements. A quasi-static storage classification could be a fully wired network that does allow to adding or deleting elements or power up/down some elements (for example to save power dynamically when less storage is necessary). An example of dynamic storage classification could be a mix of wired and wireless user devices, where a subset of user devices enter and exit a WLAN coverage area.

An example of a storage classification into tiers is as follows:

Tier zero storage element: Storage within the communication bus of the user device. This is the most valuable storage element for this user device, but may not have sufficient available (allocated or free) capacity for additional content storage.

Tier one storage element: Storage element within a local network (faster access time) such as home gateway/server. The content resides in a short and fast communication network distance away from the user device.

Tier two storage element: Storage element not attached directly to the local network but it is in close proximity, for example two communication network hops away from the device. For example a Network-Attached Storage connected by Ethernet to a Home Gateway with WLAN capability communicating to mobile/portable user devices.

Tier three storage element: Storage having a limited access time scattered within network (for example auxiliary PCs, disconnected auxiliary/backup HDD). Storage element used when tier one and tier two storage elements are either being consumed and/or dedicated for contents used for high paying users.

Storage Management: Subscription Plans

Given the set of heterogeneous users, user devices, storage elements, communications networks, content, content providers, and content brokers, it may be advantageous to have a service provided offering at least one of a plurality of storage management subscription plans offers. The storage management subscription plans could offer free, sponsored, entry level, consumer, business, premium or preferential content services based on one or more of obtained user, user entity, communication network parameters. The storage manager could manage storage for one or more users, one or more storage elements, one or more user devices, one or more home networks, one or more content provider and/or optionally one or more content brokers, one or more POI locations, one or more work locations, etc. The plan could be prepay or postpay or both prepay and postpay. It could be partially/fully subsidized, sponsored, ads sponsored, content provider sponsored or could include a free trial, etc.

Storage Allocation to Content Providers

At least some embodiments monetize storage elements associated to user devices as a commodity, which content providers can bid for or buy. A content provider may offer to pay (or provide discounts/coupons/subsidies/etc.) the user/s to have access to a partition of the storage elements managed by the storage manager. This way the content provider has a channel to preload content onto the storage elements that is likely to be purchased or consumed. This way the content provider storage manager or content manager decides what to market to the user/s onto one or more storage elements associated with one or more user devices over one or more communication networks.

In an embodiment, there are multiple content providers offering to pay the user/s to have access to partitions of the user distributed storage elements. In some embodiments having a content broker may be advantageous, to avoid the user/s the hassle of managing multiple storage managers associated with multiple content providers, multiple bills, multiple service plans/offers, from the content providers. In this embodiment, the storage manager dynamically supports one or more content providers. In an embodiment, the storage manager allocation can be managed and marketed to the content provider as a service. Storage manager can allocate storage element partitions of fixed size (for content managers to manage the storage element partition) or be based on request grant mechanism in which content manager can request for a given storage space depending on its needs.

Content Manager: Preloading Selected Content on to Storage Associated with User Devices In an embodiment the content manager is operable on a processor of a user device. In an embodiment the content manager functionality may comprise improving the value of content available to a user so that desirable content is readily accessible when the user is ready to consume it on a user device likely to be chosen for consuming (for example viewing, using, displaying, listening, playing, etc.) the content. Storage elements associated to one or more user devices may be accessible through a storage manager. Once the preloaded content is accessible to a user device, the content manager takes one or more parameters related to the user, the user devices, the storage element, the communication networks, the content providers and/or the content brokers. In an embodiment the content manager maintains the content, for example decides what content (for example by deleting, moving, preloading content) should reside at storage elements near (for example one or more of accessed over a communication network with bandwidth greater than the content requirements, latency lower than content requirements, cost below a user preference, and/or availability above a user parameter requested by a user) the user device to improve the value for one or more of the user, the communication network, the one or more content providers or one or more service providers.

Content available on storage elements associated with user devices is a precious resource just like storage, bandwidth, computing power and battery power and may be managed to provide enhanced value to the user/s, etc.

The content manager may include several functionalities. The content manager may reside at one or more locations. FIG. 13 includes an example of a home network with storage manager and content manager functionality according to an embodiment. The content manager could be included at the user device 102 as a content manager device 1301, or reside at a centralized location associated with the user and manage content on several user devices, such as a home gateway as a content manager home 1303, or may reside at the content provider as a content manager server 1305. Alternatively or in addition, the content manager server may also reside at a content broker that manages content of a plurality of content providers for a plurality of users. One or more of the Content Managers 1301, 1303, 1305 may have access to information 1320, comprising one or more of user parameters (for example user profile, user preferences, user history, user state—location, leisure mode, time, etc.). The content manager may have a master/slave, server/client, centralized or distributed configurations to manage content of the plurality of user devices.

Preloading or Assisting Preloading a Content

Preloading a content comprises delivering (or loading or downloading or uploading, etc.) a portion of the content item onto a storage element unsolicited by a potential user or consumer or prior to a potential user or consumer selecting the content item. Preloading may comprise an additional step of selecting a content from a plurality of content without the potential user or consumer requesting the content.

In at least one embodiment, preloading a content comprises pushing the content from a content source (network entity, content distribution server, cloud, service provider, content provider, content broker, etc.) to a content destination (user entity, storage element, user device with storage, etc.). In this embodiment, the content source typically selects the content and the target storage element and initiates the preloading.

In at least one embodiment, preloading a content comprises pushing the content from a source (network entity, cloud, service provider, content provider, content broker, etc.) to a plurality of destinations (user entity, storage element, user device with storage, etc.) through multicasting. In this embodiment, the source element typically selects the content and the plurality of target storage element and initiates the preloading.

In at least one embodiment, preloading a content comprises pulling the content from a content source (network entity, cloud, service provider, content provider, content broker, etc.) to a content destination (user entity, storage element, user device with storage, etc.). In this embodiment, the content destination element typically selects the content and the target storage element and initiates the request for preloading.

In another embodiment the source may be a user entity (for example user generated content located at a user device, storage element, etc.) and the destination may be a network entity (service provider, storage provider, content broker, content provider, cloud, etc.). In another embodiment the source may be a first user entity (user device, storage element, etc.) and the destination may be a second entity (user device, storage element, etc.). In another embodiment, the destination storage entity of a first preload (for example POI storage) may be a source for a second preload to a second destination storage element. In another embodiment preloading a content may comprise an intermediate storage element. For example a content targeted to a mobile user device may be preloaded to the users' home set top box or gateway over a wide area broadband communication network, and subsequently preloaded from the set top box to the mobile user device local storage over a home WiFi network.

In at least one embodiment the preloaded content destination may be a storage element of a first user device and a user may select the content to be presented at a second user device. For an embodiment, the first user device may not have the appropriate presentation HW (for example display resolution) for the preloaded content or may not have the appropriate SW (for example an image decoder) for the preloaded content. In this embodiment the preloaded content may not be preloaded onto storage element of the second user device. For an embodiment, a video or movie may be preloaded onto a smart phone flash storage and presented or displayed on a TV over WiFi. The choice between presenting the content from the first user device included storage element over a communication network to a second user device UI, or preloading onto the second user device storage prior to presentation may be based on a value metric. The value metric may be a function of one or more of communication network parameters (performance, cost, etc.), storage element parameters (performance, availability, cost, etc.), etc.

In at least one embodiment, a content preloading may be initiated based on a value metric, but may be paused, interrupted, stopped, etc. based on changes in value parameters over time. For example, a movie content may initiate preloading when a mobile user device is in the home WiFi network, but pause as the mobile user device is no longer in the coverage area of the home WiFi in switching to a 3G data network. In another embodiment, a content preloading may be restarted based on changes in value metric parameters over time.

In at least one embodiment, a preloaded content may comprise preloaded business rules, content rules, policies, etc. (collectively denoted business rules) associated with the preloaded content. These business rules may include information associated with the consumption of the content. In an embodiment business rules comprise one or more of a single use or multiuse or unlimited use, single-user or multiuser, a cost, a restriction on the time or dates of content consumption, a restriction on subsequent preloading onto other user devices, a security element, a protection feature, an authorization restriction, authentication rules, etc.

In at least one embodiment, several storage elements share a communication network. In this embodiment list of content for preloading associated to each storage element (for example several users sharing a DOCSIS channel or a satellite channel) are aggregated and content that is targeted to more than one storage element is multicast or broadcast over the communication network. This embodiment has the benefit of sharing communication network cost over more than one storage element. This may improve a value metric resulting in greater preloads or more profit. This embodiment is especially valuable for lossless communication networks. If the communication network is lossy, one or more storage elements preloading the multicast (or broadcast) content may be missing some of the information necessary for presenting the content. For the majority of communication networks the packet error rate (loss) is typically a small percentage of the packets transmitted (the largest values are typically for NLOS wireless, where targets are typically 1%). The packet error rate could be reduced by a second multicast (or broadcast) of the content. In an embodiment a content is multicast a second time based on a packet error rate of the communication network. If the first and second transmissions are independent, the aggregate packet error rate after two multicasts would reduce the packet error rate by the second power of the packet error rate (for example 1% would become 0.01%). In another embodiment, if the packet error rate is low, the erroneous packets are downloaded during content consumption. In another embodiment one of more a storage element could pull or request the missing or erroneous packets. For example if a content is preloaded by multicast onto 10 storage elements with a packet error rate of 1%, typically a second multicast would double the communication network resources and result in a packet error rate of 0.01%. If each of the storage elements requests the missing or erroneous 1% of packets, this would add 10% of packets being retransmitted (plus some overhead). If the probability of consumption is 20%, on the average only 2% of the packets would be retransmitted/downloaded (plus overhead). The relative benefits of each embodiment depend on one or more of the packet error rate, the number of storage elements being multicast, the packet error rate, likelihood of consumption, etc.

Preloading Assisted by Content Broker

For an embodiment, the service provider includes a content broker, wherein the content broker assists in the distribution of content. For an embodiment, the broker assisting in the distribution of the content includes obtaining, by the at least one content distribution server, storage element value metric information of a plurality of storage elements, associated with a plurality of user devices, and assisting, by the one or more content distribution servers, a content provider in preloading at least a portion of a content onto one or more of the plurality of storage elements associated with the plurality of user devices based on the storage element value metric information.

For an embodiment, the service provider includes a content broker, wherein the content broker assists in the distribution of content. For an embodiment, the content broker assisting in the distribution of the content includes obtaining, by the at least one content distribution server, user device value metric information of a plurality of user devices, associated with a plurality of user devices, and assisting, by the one or more content distribution servers, a content provider in preloading at least a portion of a content onto one or more of the plurality of storage elements associated with the plurality of user devices based on the user device value metric information.

For an embodiment, the service provider includes a content broker, wherein the content broker assists in the distribution of content. For an embodiment, the broker assisting in the distribution of the content includes obtaining, by the at least one content distribution server, a communication network value metric information used for preloading the content onto a plurality of storage elements, associated with a plurality of user devices, and assisting, by the one or more content distribution servers, a content provider in preloading at least a portion of a content onto one or more of the plurality of storage elements associated with the plurality of user devices based on the communication network value metric information.

For an embodiment, the service provider includes a content broker, wherein the content broker assists in the distribution of content. For an embodiment, the broker assisting in the distribution of the content includes obtaining, by the at least one content distribution server, a communication network value metric information used for presenting the preloaded content from a plurality of storage elements, onto an associated plurality of user devices, and assisting, by the one or more content distribution servers, a content provider in preloading at least a portion of a content onto one or more of the plurality of storage elements associated with the plurality of user devices based on the communication network value metric information.

An embodiment includes a content broker system. The content broker system includes at least one content distribution server coupled through one or more communications networks to a plurality of user devices and one or more content providers. The at least one content distribution server is operative to obtain at least one of a user device parameter or a user parameter, wherein the user parameter is associated with at least one user associated with one or more of the plurality of user devices, classify a plurality of storage elements associated with the plurality of user devices based on the at least one of the user device parameter or the user parameter, offer preloading opportunities to at least one of the one or more content providers, select a content from a plurality of content available from the one or more content providers based on the classified plurality of storage elements and responses to the offered preloading opportunities, and assist preloading of at least a portion of the selected content to at least one of the plurality of storage elements.

For an embodiment, the offered preloading opportunities are based at least in part on the classified plurality of storage elements. For an embodiment, the classification of the plurality of storage elements is based at least in part on responses of the one or more content providers to the offered preloading opportunities. For an embodiment, the at least one content distribution server is further operative to allow the one or more content providers to assist in defining the preloading opportunities offers.

For an embodiment, the at least one content distribution server is further operative to provide the one of more content providers with the at least one of user device parameters or user parameters, and allow the one of more content providers to assist in defining the preloading opportunities offers. For an embodiment, the at least one content distribution server is further operative to provide the one of more content providers with the at least one of user device parameter or the user parameter, and allow the one of more content providers to assist in selecting the content from the plurality of content.

For an embodiment, obtaining at least one of a user device parameter or a user parameter is updated over time. For a specific embodiments, the user device parameter or user parameter are updated based on one or more time events, wherein the one or more time event includes at least one of periodic updates, polling based updates or event interrupt based updates.

An embodiment further includes classifying the plurality of storage elements based on a storage element parameter.

For an embodiment, the user device parameter comprises a storage element availability of one or more of the plurality of storage elements. For a specific embodiment, the storage element parameter includes a communication network parameter associated with one or more of the plurality of the storage elements. For an embodiment, the user parameter includes one or more of a user preference, user history, user location, or user state.

For an embodiment, the classification of the plurality of storage elements based on the user parameter includes a user population parametrized by one or more of a user preference or user demographic or a user history or a user state.

For an embodiment, at least one user device includes a device agent, wherein the device agent at least assists the obtaining user parameters. For an embodiment, at least one user device includes a device agent, wherein the device agent at least assists the selecting of the content. For an embodiment, at least one user device includes a device agent, wherein the device agent assists consumption of the selected content.

For an embodiment, the at least the portion of the content is encrypted, and further comprising providing a selected user device with an ability to decrypt the preloaded at least the portion of the selected content.

For an embodiment, the at least one content distribution server is further operative to receive bids from at least one of the one or more content providers based on the preloading opportunity offers, select at least one bid, and further select the content based on the at least one selected bid. For an embodiment, the at least one content distribution server is further operative to receive bids from at least one of the one or more content providers based on the preloading opportunity offers, select at least one bid, and further classify the plurality of storage elements based on the at least one selected bid. For an embodiment, the at least one content distribution server is further operative to facilitate billing of the selected content.

For an embodiment, the at least one content distribution server is further operative to provide the one of more content providers with a user interface. For a specific embodiment, the user interface allows the one or more content providers to manage preloading opportunities offers. For at least some embodiments, the user interface allows the one or more content providers to manage preloading opportunities offers includes allowing at least one content provider to at least one of pay, bid, modify, specify, design, define preloading opportunities. For at least some embodiments, the user interface allows the one or more content providers assist in selecting the content from the plurality of content. For at least some embodiments, the user interface allows the one or more content providers to manage the preloaded at least the portion of the selected content. At least some embodiments further include allowing one or more content provider to manage the preloaded at least the portion of the selected content includes allowing at least one content provider to at least one of monitor, generate statistics, track or post-process information associated with the preloaded at least the portion of the selected content.

For an embodiment, classifying the plurality of storage elements or selecting the content is additionally based on at least information associated with other content available on the plurality of storage elements. For an embodiment, classifying the plurality of storage elements or selecting the content is additionally based on at least information associated with one or more communications networks that couple the at least one content distribution server to one or more of the plurality of storage elements. For an embodiment, the plurality of storage elements or selecting the content is additionally based on at least information associated with the one or more communication network that couples the one or more of the plurality of user devices to one or more of the plurality of storage elements.

An embodiment further includes the at least one content distribution server or a processor associated with one or more of the storage elements determining an association of the one or more of the plurality of storage elements storage elements with one or more of the plurality of user devices, and wherein classifying the one or more of the plurality of storage elements or selecting the content is additionally based on at least the one or more of the plurality of user devices or a plurality of users associated with the one or more the plurality of storage elements.

An embodiment includes the at least one content distribution server or a processor associated with one or more of the plurality of storage elements assisting in deleting of at least a portion of a second content available on one or more of the plurality of storage elements. An embodiment includes the at least one content distribution server or a processor associated with one or more of the plurality of storage elements assisting in moving at least a portion of a second content available on one or more of the plurality of storage elements to a second storage element associated with a user or user device.

An embodiment further includes the at least one content distribution server or a processor associated with one or more of the plurality of storage elements operative to classifying each of the plurality of storage elements based on a plurality of content parameters, and select the content based on the classifications. An embodiment further includes the at least one content distribution server or a processor associated with one or more of the plurality of storage elements assisting in presentation of information related to the selected content to at least one of the plurality of user devices associated with the one or more of the plurality of storage elements.

An embodiment further includes the at least one content distribution server or a processor associated with one or more of the plurality of storage elements obtaining information associated with the preloaded at least the portion of selected content based on prior preloading, and evaluating interaction with the preloaded at least the portion of selected content. An embodiment further includes the at least one content distribution server or a processor associated with one or more of the plurality of storage elements, operative to select a first plurality of storage elements, preload at least a portion of a first content onto the first plurality of storage elements, wherein the first plurality of storage elements are associated with a first plurality of user devices, and obtain information associated with user interaction of the at least one user with the first content preloaded onto the first plurality of storage elements.

For an embodiment, the selected content comprises an advertisement, and further including the at least one content distribution server or a processor associated with one or more of the plurality of storage elements, operative to select the advertisement, assist in presentation of the advertisement at one or more of the plurality of user devices.

For an embodiment, a cost for consuming the selected content is based on a cost parameter associated with one or more of the plurality of storage elements or at least one of the one or more communication networks.

An embodiment includes a method of a content broker assisting distribution of content. The method includes obtaining, by one or more content distribution servers, at least one of user device parameter information or storage element parameter information of a plurality of user devices and a plurality of storage elements associated with the plurality of user devices, and assisting, by the one or more content distribution servers, at least one content provider in preloading a content onto one or more of the plurality of storage elements associated with the plurality of user devices based on the at least one of the user device parameters information or the storage element parameter information. For an embodiment, the storage element parameter information includes communication network parameter information associated with the storage element.

An embodiment further includes obtaining, by the one or more content distribution servers, user parameter information of the plurality of user devices, wherein the assisting the at least one content provider in preloading the content onto the one or more of the plurality of storage elements associated with the plurality of user devices is further based on the user parameter information.

For an embodiment, a value metric includes at least one of the user device parameters information or storage element parameter information, and wherein the method further comprises the one or more content distribution servers selecting at least a portion of the content of a plurality of available content based upon the value metric. For an embodiment, the value metric comprises information associated with other content available on one or more of the plurality of storage elements. For an embodiment, the value metric is based on at least information associated with a communication network that couples the one or more content distribution servers to one or more of the plurality of storage elements. For an embodiment, the value metric is based on at least information associated with a communication network that couples the one or more of the plurality of user devices to one or more of the plurality of storage elements. For an embodiment, the at least one content distribution server or a processor associated with one or more of the plurality of storage elements determining an association of the one or more of the plurality of storage elements storage elements with a plurality of user devices, and wherein the value metric is based on at least the plurality of user devices or a plurality of users associated with the plurality of user devices. For an embodiment, the value metric is based on at least a parameter associated with one or more of the plurality of storage elements. For an embodiment, the value metric is based on at least a parameter associated with a communication network that couples the one or more content distribution servers with the plurality of storage elements.

For an embodiment, the at least one content distribution server or a processor associated with one or more of the plurality of storage elements assisting in deleting of at least a portion of a second content available on one or more of the plurality of storage elements. For an embodiment, the at least one content distribution server or a processor associated with one or more of the plurality of storage elements assisting in moving at least a portion of a second content available on one or more of the plurality of storage elements to a second storage element associated with a user or user device.

An embodiment further includes the at least one content distribution server or a processor associated with one or more of the plurality of storage elements preloading content to at least one of the plurality of storage elements, classifying each of the plurality of storage elements based on a plurality of content parameters, and preloading based on the classifications. An embodiment further includes the at least one content distribution server or a processor associated with one or more of the plurality of storage elements assisting in presentation of information related to the content to a user device associated with the one or more of the plurality of storage elements.

An embodiment further includes the at least one content distribution server or a processor associated with one or more of the plurality of storage elements obtaining information associated with the content based on prior preloading of the content, and evaluating interaction with the preloaded content.

An embodiment further includes the at least one content distribution server or a processor associated with one or more of the plurality of storage elements, operative to select a first plurality of storage elements, preload at least a portion of the content onto the first plurality of storage elements, wherein the first plurality of storage elements are associated with a first plurality of user devices, and obtain information associated with the value metric from the content preloaded onto the first plurality of storage elements.

For an embodiment, the content includes an advertisement, and further includes the at least one content distribution server or a processor associated with one or more of the plurality of storage elements, operative to select the advertisement, and assist in presentation of the advertisement at one or more of the plurality of user devices.

For an embodiment, a cost for consuming the content is based on a value metric cost parameter associated with one or more of the plurality of storage elements or a communication network.

Figure 23A:
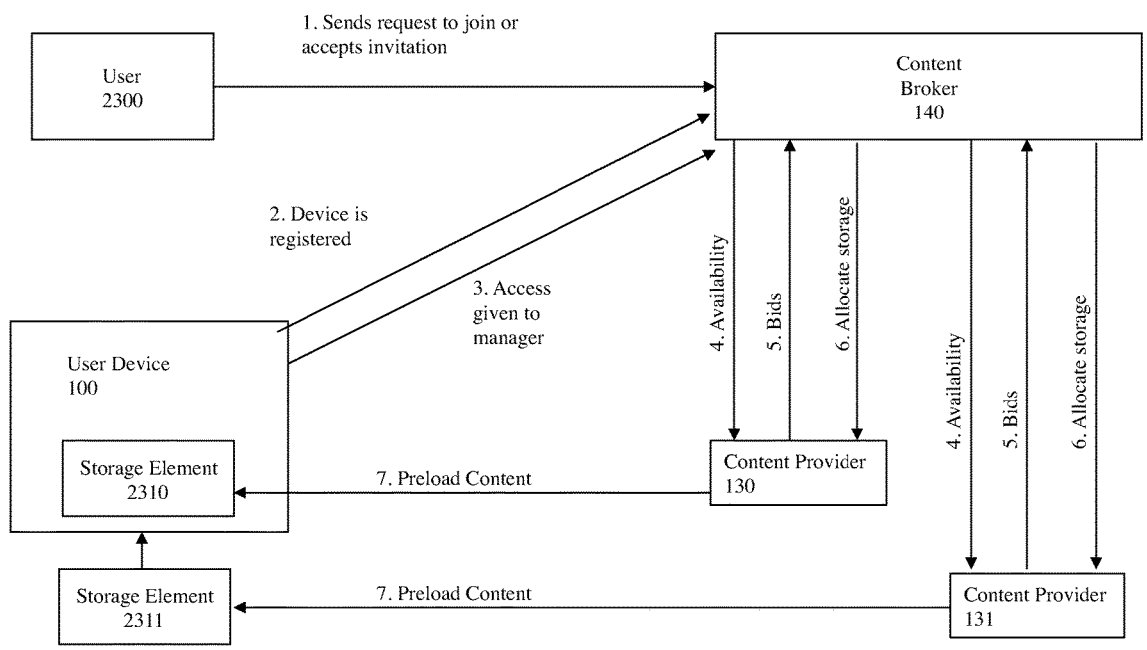
FIG. 23A includes a list of steps for assisting preloading of content according to an embodiment.

FIG. 23A includes a list of steps for assisting preloading of content according to an embodiment. A first step may include sending a request to join the content distribution system from a user 2300 to a content broker 140. A prior step may include the content broker 140 inviting the user 2300 to join the content distribution system. A second step may include registering one or more user devices 100 or one or more storage elements 2310 and 2311 associated with user 2300 with the content broker 140. A 3rd step may include giving access to the content broker 140 to the user devices and storage elements (devices) 100, 2310, 2311. An additional optional step may include installing software or apps on one or more of devices 100, 2310, 2311. A content broker 140 may be in communication with one or more content providers 130 and 131. A 4th step may include the content broker 140 providing availability of user 2300, user device 100, storage element 2310, storage element 2311 to the content provider 130 or 131. The availability information may include one or more parameters that may be relevant for value metric preloading decisions. A 5th step may include the one or more content providers 130, 131 bidding for storage element allocation to content broker 140. A 6th step may include content broker 140 allocating storage within storage elements 2310 and 2311 to content provider 130 and content provider 131. For an embodiment, content provider 130 may have bid a larger amount or offer more valuable content to the user, resulting on allocation to preload content ($7^{th}$ step) onto the storage element 2310 internal to the device (for example and content provider 131 being allocated external storage element 2311 associated with user device 100). Many other valuable embodiments related to FIG. 23A may be derived. For an embodiment, some steps may be eliminated, some steps may be combined, some steps may be performed in a different order, or additional steps may be added. For an embodiment, some or all of content broker 140 functionality may be included within the content provider 130. There may be a single content provider 130. The 5th step may be eliminated if the content broker 140 functionality is included within content provider 130. External storage element 2311 may be internal to a second user device associated with the user 2300 (for example a home gateway or home PC). In addition a content provider or content broker may give instructions to storage element to delete or move previously preloaded content.

Figure 23B:
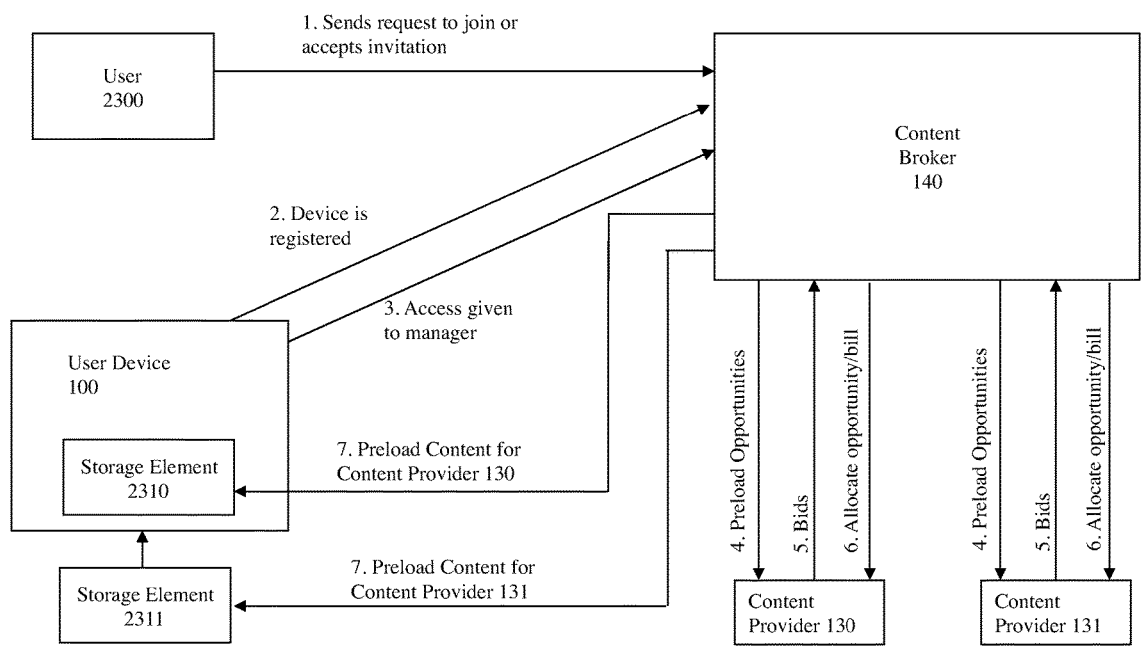
FIG. 23B includes a list of steps for assisting preloading of content according to an embodiment.

FIG. 23B includes a list of steps for assisting preloading of content according to an embodiment. A first step may include sending a request to join the content distribution system from a user 2300 to a content broker 140. A prior step may include the content broker 140 inviting the user 2300 to join the content distribution system. A second step may include registering one or more user devices 100 associated with user 2300 or one or more storage elements 2310 and 2311 associated with user 2300 with the content broker 140. A 3rd step may include giving access to the content broker 140 to the devices user device 100, storage element 2310, storage element 2311. An additional optional step may include installing software or apps on one or more of user devices and storage elements 100, 2310, 2311. In an embodiment a content broker 140 may classify a plurality of users 2300, or a plurality of user devices 100, or a plurality storage elements 2310, 2311, etc., based on information or parameters associated to the population of users, user devices, storage elements, communication networks, etc., into preloading opportunities. In an embodiment a content broker 140 may classify, wherein classifying comprises characterizing a plurality of users 2300, or a plurality of user devices 100, or a plurality storage elements 2310, 2311, etc., based on information or parameters associated to the population of users, user devices, storage elements, communication networks, etc., into preloading opportunities. In an embodiment a content broker 140 may classify, wherein classifying comprises identifying a plurality of users 2300, or a plurality of user devices 100, or a plurality storage elements 2310, 2311, etc., based on information or parameters associated to the population of users, user devices, storage elements, communication networks, etc., into preloading opportunities. In an embodiment a content broker 140 may classify, wherein classifying comprises ranking a plurality of users 2300, or a plurality of user devices 100, or a plurality storage elements 2310, 2311, etc., based on information or parameters associated to the population of users, user devices, storage elements, communication networks, etc., into preloading opportunities. In an embodiment a content broker 140 may classify, wherein classifying comprises prioritizing a plurality of users 2300, or a plurality of user devices 100, or a plurality storage elements 2310, 2311, etc., based on information or parameters associated to the population of users, user devices, storage elements, communication networks, etc., into preloading opportunities. In an embodiment a content broker 140 may classify, wherein classifying comprises organizing a plurality of users 2300, or a plurality of user devices 100, or a plurality storage elements 2310, 2311, etc., based on information or parameters associated to the population of users, user devices, storage elements, communication networks, etc., into preloading opportunities. In an embodiment a content broker 140 may classify, wherein classifying comprises clustering a plurality of users 2300, or a plurality of user devices 100, or a plurality storage elements 2310, 2311, etc., based on information or parameters associated to the population of users, user devices, storage elements, communication networks, etc., into preloading opportunities.

The preloading opportunities may be one or more of subset of users, a subset of user devices, a subset of storage elements, a subset of communication networks, or a subset of a combination. For example the preloading opportunity could be a subset of smartphones with a specific set of SW, or a subset of storage elements with more than X GB of available flash, or a subset of users with a specific demographic or state, or the preloading opportunity could be a combination subset, such as females in a specific age group in a specific location with a specific phone model with a specific app installed, etc. An item in this system (for example a specific user or a specific user device or a specific storage element, etch) could be part of one of more storage preloading opportunities. When an item could be part of one or more storage preloading opportunities it could be offered at a variable price (wherein the term price may be used interchangeably with cost, for example a cost to a buyer may be a price from a seller) to one or more content providers (or ad providers, etc.) depending on the preloading opportunity. For example a particular user could be a male, age group 25-45, is a soccer enthusiast, annual income 50,000-100,000, has a smartphone and a STB/DVR. If the target user is walking down an auto-mall street with his smartphone, a preloading opportunity could be: the smartphone storage, 3G cellular network, the user is near car dealers, a user that could afford a car >20,000, etc. A second preloading opportunity could be the STB/DVR, broadband network to his home, an EPL soccer match and some soccer gear ads, etc. These two storage preloading opportunities associated with the target user could be offered to one or more content providers (or ad providers, etc.) for bidding or at a set price. It may be beneficial to the content broker 140 to classify a plurality of users 2300, or a plurality of user devices 100, or a plurality storage elements 2310, 2311, etc., into storage preloading opportunities that are more valuable to content providers 130, 131.

The content broker could be in communication with one or more content providers 130 and 131. A 4th step may include the content broker 140 providing preload opportunities for a subset of users 2300, user devices 100, storage elements 2310, 2311 to content provider 130 or 131. The preload opportunity information may include one or more parameters that may be relevant for preloading decisions. A 5th step may include the one or more content providers 130, 131 bidding for storage element preloading opportunities to content broker 140. A 6th step may include content broker 140 initiating preloading storage within storage elements

2310 and 2311 on behalf of content provider 130 or content provider 131. For an embodiment, content provider 130 may have bid a larger amount or offer more valuable content to the user, resulting on allocation to preload content onto the storage 2310 internal to the device (for example and content provider 131 being allocated external storage element 2311 associated with user device 100). Many other valuable embodiments related to FIG. 23B may be derived. For an embodiment, some steps may be eliminated, some steps may be combined, some steps may be performed in a different order, and/or steps may be added. For an embodiment, some or all of content broker 140 functionality may be included within the content provider 130. There may be a single content provider 130. The 5th step may be eliminated if the content broker 140 functionality is included within content provider 130. External storage element 2311 may be internal to a second user device associated with the user 2300 (for example a home gateway or home PC). In addition a content provider or content broker may give instructions to storage element to delete or move previously preloaded content.

The content may be split during preloading into portions. For security, a large portion may be preloaded (for example scrambled/distorted/encrypted) onto a storage element to increase value metric, but a small portion may be streamed or downloaded only after purchase. The second portion may be downloaded real time (for example streamed) as the content is consumed or the second portion may be a key to authorize content consumption, maybe after a payment or after authentication from the user or user device.

The content preloading may be split and stored into more than one storage element (for example multi-resolution content with lower resolution on mobile device and higher resolution on gateway and combine).

The content preloading may be split over more than one communication network. For an embodiment, over time and location as storage element moves over Communication Network or cost of Communication Network changes. For an embodiment, larger portion preloaded over low cost Communication Network and smaller portion preloaded over higher cost mobile Communication Network.

Content distribution system (for example could be part of storage manager) could obtain Communication Network parameters (for example speed/performance/QoS) and Communication Network service plans (for example unlimited/capped/free/changes in rate vs. time/day) and Communication Network usage vs. service plan (for example to date communication network data plan usage vs. caps vs. days remaining in billing cycle) and Communication Network usage prediction information (for example likely to go over data cap or not).

Preloading could be aware of other Communication Network usage by other applications to avoid slowing down other tasks.

Content Broker Embodiments at User Entity

In at least one embodiment, user entities comprises devices local to a user or controlled or owned by a user, such as user devices (for example PC, TV, smartphone, tables, etc.) or storage elements (for example set top boxes, home gateways, network or direct attached storage, or user devices with storage, etc.

In at least one embodiment the user entity classifies available storage. In at least one embodiment the user entity obtains user input for preferences relative to allocating storage to dedicate for preloading content service. In at least one embodiment a user may connect to a network entity to specify user preferences relative to allocating storage (or alternatively content preferences, communication network preferences, service plans, etc.). In at least one embodiment a user entity obtains user content preloading preferences and uses this information to allocate available storage on device to content types and/or content providers. In at least one embodiment a user entity receives one or more of user preferences, user selections relative to a plurality of content providers or a plurality of content types, or a plurality of content offers for one or more content type or source, a percentage of content offers for one or more content type or for one or more content source. In at least one embodiment a user entity presents information associated with one or more of the percentage for one or more of content types, with the percentage for one or more content providers, with the percentage of one or more content offers. In at least one embodiment a user entity offers a user at least partial control over the allocation and percentages of content type or content source preloaded. In at least one embodiment a network entity has at least partial control over the allocation and percentages of content type or content source preloaded. In at least one embodiment a user entity received users preferences for initial content preloading and are further refined or modified based on analyzing user actions, states, location, purchase patterns or behavior, other behaviors. In at least one embodiment user interactions with the content at the user entity are also used, such as rental vs. purchase, selecting vs. previewing vs. consuming, etc. In at least one embodiment, a user entity receives preferences from a user about methods to present (for example display) preloaded content information (for example preloaded content offers, or availability, or priority, or type of content, or content provider to display in highest content offer discovery locations in UI, or type of content or content provider to display in a multitude of content offer areas, or type of content or content provider to display in a percentage of content offer positions). In at least one embodiment, a user entity classifies (for example partitions, identifies, clusters, categorizes, ranks, sorts) content memory into a classified preloading opportunity based on one or more of candidate storage types (for example based on content type or content provider), an amount of storage for each candidate storage element type (may be based on a number of items that can be stored), a user preference or demographic indication for each storage element type, a user likelihood to purchase indication or a user likelihood to view or act indication. In at least one embodiment a user entity gathers additional information about a user (for example location, app preferences, time of day vs. activity, etc.). In at least one embodiment, a user entity sends classified preloading opportunity information to a network entity. In at least one embodiment, a user entity sends classified content opportunity information to a network entity. In at least one embodiment, a user entity stores preloaded content. In at least one embodiment, a user entity receives content indexed by location in content discovery UI (wherein content discovery enables or facilitates a user finding or locating preloaded content) that content preloading information or advertisements are to be placed in content discovery UI. In at least one embodiment, a user entity places advertisements in content discovery UI according to UI content partitions. In at least one embodiment, a user entity comprises one or more of: accepts user purchase inputs, conducts purchase transactions, gets unlock keys from network entity, unlocks content or makes available for consumption.

In at least one embodiment, a user entity classifies discovery or maintenance information, for example user preference attribute discovery or changes based on ongoing activities.

In at least one embodiment, a user entity shares classification information to a content discovery function that classifies content display discovery priority (for example placement of preloaded content information on UI, advertising for preloaded content) based on one or more of: how long content has been on device, how many times the content has been viewed, user preference, user preference changes, user activity characterization, changes in promotional value or promotional priority of content items. For at least embodiments, classify includes one or more of identify, rank, prioritize, select.

In at least one embodiment, a user entity assists on a content discovery classification that occurs on device, or assist on process updates to discovery information presentation priority to optimize presentation of discovery priority for preloaded content inventory on device.

Content Broker Embodiments at Network Entity

In at least one embodiment, network entities comprises HW or SW in the network (or cloud) which are typically not local to a user and are controlled or owned by content providers, content brokers, Server Providers, Storage Providers, ad providers, etc., such as servers, switches, routers, storage reservoirs, etc.

In at least one embodiment, a network entity obtains classified preloading opportunities. In at least one embodiment, a network entity transforms classified preloading opportunities into one or more preloading content inventory entries that characterize an aspect of a user or user entity for a content provider preloading opportunity value for one or more target preloaded content types or content items. In at least one embodiment, a network entity places preloading content inventory entries into an aggregate preloading content inventory. In at least one embodiment, a network entity classifies the aggregate preloading content inventory into content inventory partitions (wherein partition may comprise one or more of classification, clusters, subsets) that characterize a multitude of preloading content inventory entries associated with a preloading opportunity value metric. In at least one embodiment, a value metric may include one or more of demographic characterization for users, device type characterization, likelihood of purchasing content or content type or content item, user preference characterization, user activity characterization (for example traveling, movie watcher, lots of spare time, frequents a location or area, etc.), characterization based on pre-determined content storage opportunity categories. In at least one embodiment, characterization comprises one or more of parameterization (for example obtain parameters), clustering, partition, creating subsets, classifying, modeling, analyzing. In at least one embodiment, a value metric may comprise a bidder input (for example limits, requirements, restrictions, demographics, compensation, content rules, promotions, etc.), for example from a content provider or service provider or ad provider.

In at least one embodiment, a network entity offers content inventory partition commitments to content provider preloading opportunity commitment bidders, the commitment comprising a commitment to preload a content bundle on a certain number of user entities (for example storage elements or user devices) that satisfy the preloading opportunity value metric for the content inventory partition.

In at least one embodiment, a network entity accepts one or more bidder content bundles comprising content items for one or more content inventory partitions.

In at least one embodiment, a network entity considers constraints on user entities (for example content already stored on device that is not ready to be rolled, other content to be stored on device, storage available on device, storage available in intermediate reservoir, communication network parameters to device, communication network parameters to intermediate reservoir) and aggregate of one or more content bundles that have been committed to distribute, determines a device population to match up to satisfy agreement to fulfill content inventory partition commitment In at least one embodiment, a content distribution system selects one or more of multiple classified preloading opportunities, preloading content inventory entries, aggregate preloading content inventories, discovery or presentation or advertisement of preloaded content, preloading content bundles commitments, device storage constraints is based on a value metric.

In at least one embodiment, a network entity assists in preloading the content bundle to device population.

In at least one embodiment, a network entity assists in one or more of discovery of preloaded content, presentation of information associated with preloaded content, process updates for preloaded content discovery optimization information to optimize display discovery priority for inventory on device, passes optimized discovery information to a user device so the user device can implement.

In at least one embodiment, a network entity collects updates from users or user entities on one or more of user parameters, preloaded content interactions (for example views, purchases, etc.), user or user entity parameters (for example a user can change storage allocations or required synchronization between user entity stored parameters and network entity stored parameters).

In at least one embodiment, a network entity may assist in processing purchase transactions or distribution of keys.

In at least one embodiment, in addition to bidding or alternatively to bidding, a content broker assists a content provider on selecting content and preloading content based on a revenue sharing between the content broker and content provider.

In an embodiment inventory partition commitments are sorted, ranked, classified based on a value metric evaluated to benefit one or more of a user, a content provider, a content broker.

In an embodiment inventory partition commitments are sorted, ranked, classified based on bid responses or offer responses. In an embodiment the device population is optimized, grouped, classified, clustered, etc., based on available storage and user demographics to determine most lucrative content inventory partition commitments. In an embodiment, organizing (for example optimizing or ranking or displaying) content discovery placement in a device population is based on both user priorities or preferences or restrictions and bidder value of placement.

In an embodiment content advertising on a user device is organized according to both user priorities and bidder value of placement. In an embodiment, the content advertisements are organized (for example optimizing) to satisfy advertising commitments (or simply charge for ads). In an embodiment a future activity of user is determined and information of the future activity is used to classify the preloading opportunity for the user (for example knowledge of the user going on vacation, going on trip, holiday coming up, weekend coming up, characterizing a time user typically views/purchases, etc.). In an embodiment the user specifies a future location of the user and the user device. In an embodiment the future location is based on location trace or side information. In an embodiment user analytics are used to predict or estimate a future state/location of the user.

Preloaded Content

If content is preloaded onto a storage element associated with a user device, a number of processing operations could be performed that could benefit the storage element, or a processor associated with the storage element or a user device.

Preloaded content may be de-compressed for faster access (for example a game or a SW program/app) or to assist real time play back (for example reduce processor workload or save battery power). Preloaded content may be transcoded to a different format. Preloaded content may be compressed if storage resources are at a premium. For an embodiment, a reservoir (home gateway, home set top box, POI storage, etc.) could receive a high quality version of a movie (for example HD 1080p) and generate lower quality versions in multiple formats (for example tablets, notebooks, smartphones, etc.). Preloaded content may be deleted or moved. Preloaded content may be deleted or moved based on value metrics or value metric information associated to one or more entities.

Content Parameters

In an embodiment, a content may include a number of content parameters that could help select content to increase the value of the content preloaded onto storage elements associated to user devices. Content includes movies, sport events, shows, videos, photos, music, music videos, news, books, audio books, ring tones, games, software programs, software upgrade, software updates, apps, etc. For an embodiment, for movies, important content parameters are format, which could include multiple resolutions targeting multiple user devices of different size and quality, size of file, which determines how much communication network bandwidth will be consumed and time elapsed to download, playback duration, which determines how long the user may take to consume the movie, maximum downloading rate, which is related to size of file and duration, which could determine the communication network parameters for viewing in real time over an communication network, licensing cost, or cost to the content provider to an original source of the content, list price to end user, or any other parameters. For example, for a game content, important content parameters are format, which could include multiple resolutions targeting multiple user devices of different size and quality, size of file, which determines how much communication network bandwidth will be consumed and time elapsed to download, play-time statistics, which could help determine how much time the user may consume in the game, licensing cost, or cost to the content provider to an original source of the game, list price to end user, or any other parameters. For example, for a software program (or upgrade), important content parameters could be format, which could include multiple user device hardware and software systems (for example such as different versions of Windows or Mac IOS, processor type/speed, minimum RAM requirements, etc.) and resolutions targeting multiple user devices of different size and quality, size of file, which determines how much communication network bandwidth will be consumed and time elapsed to download, use-time statistics, which could help determine how much time the user may utilize the software, licensing cost, or cost to the content provider to an original source of the game, list price to end user, or any other parameters. For an embodiment, the content manager may have to trade off a tablet, 1 GB, 2 hr, HD movie for $2.99 (25% margin) vs. a smartphone, 10 MB, SD game for $0.99 (50% margin) vs. a notebook, 100 MB, $50 (10%) software feature upgrade. Depending on these parameters and parameters described below the content manager could preload one or more of these content items.

Content Provider Information and Content Broker Information

The content distribution system may include one or more content providers and one or more content brokers. In an embodiment, one or more content provider may include one or more of means to access content (for example websites, servers, etc.), software and hardware recommended for service, user devices supported (for example mobile, portable, fixed, etc.), users supported (for example business, consumer, etc.), communication networks supported (for example mobile, broadband, etc.), information about service plans or subscription plans (for example flat fees, pay per use, pre pay, post pay, specials, promotions, sponsored content), library of content, search engines for content, information about content, history of content, statistics of content, methods of distribution of content (for example broadcast, multicast, unicast, on demand, PPV, etc.), content manager business rules, for example priority service offering or any other content provider information. In an embodiment the content distribution system includes two or more content providers, and the user devices and POI devices may require replication of one or more storage manager or content manager functionality. In an embodiment, the content providers may agree to provide content with the help of a content broker. In an embodiment the content providers agreeing to provide content with the help of a content broker results in a simplification for one or more users or the content providers as the one or more storage manager, content managers, user devices, POI devices and content could be shared and avoid cumbersome or expensive or inefficient replications.

User Parameters

Some examples of relevant user parameters for selection of preloaded content include user demographics, user preferences, user inputs, user history, etc.

To enhance the content manager operation, it may be advantageous to provide it with information relative to the user/s. In an embodiment, during service enrolment a user may input a portion of a list of preferences. In an embodiment, the user may input a portion of the list of preferences and update additional preferences at a later time. In an embodiment one or more of the user preferences are updated (for example refreshed) over time. In an embodiment more than one user has access to the user device more than one input list of preferences may be helpful. FIG. 12 has an example of a user input table according to an embodiment. For an embodiment, the user/s may input for each user device preferences related to the content type (for example ranked or graded/scaled, could include blocked content, parental control), content format, how much storage to reserve for content, if the device is used by a single or a list or a group of users. Also preferred locations where the device will be used and preferred communication network (for example could be ranked list, user device could have a exclusive list, preferred list, blocked list, etc.). The user may input information related to the various communication network data plans available. The user/s may select to disable/enable storage manager or content manager features based on events or thresholds. For an embodiment, the user may choose to disable content preload if the battery power is below a threshold or not connected to AC charging source or when the user is streaming movies. The user/s may update the information over time.

A content manager may collect user content consumption history user parameters (for example vs. time, location, device, Communication Network, etc.) in exchange of user input or in addition to user input to further assist the content manager. If more than one user, the content manager may collect consumption history separately for each user or classify the one or more users into groups for consumption history input collection. This may be more valuable at a POI access network (for example coffee shop, grocery, etc.) where the target content consumer population is usually larger. This information could include user content consumption/purchase vs. type/format/etc. vs. time/location consumed at the user devices. This information could further include updated usage or predicted usage of communication network data plans relative to cost/limits/etc. This information could further include responses from the user to content manager notifications. For an embodiment, the content manager may notice that a specific content has not been used for an amount of time larger than a threshold and notify the user and request a yes/no answer to whether this content may be deleted.

In addition the content manager may obtain user current location user parameter or collect/estimate/predict future location (for example work, home, business travel, airport, coffee shop) to determine what content to preload on the storage elements available to the user currently or in the future. User may consume or purchase different content at different locations. The content could be preloaded on storage associated with the user device (for example at the POI storage) associated with the location. If storage is limited at a user device internal storage, the storage and content managers may require to swap the content available as the user changes location.

The user parameters may include information about the past (for example user content consumption history or location history/trace) or may include information about the present (for example a user current location, a current list of preloaded content, a current list of storage elements available to a user device, etc.) or may include information about the future (for example predicting future location based on location trace or location history, for example predicting future location based on a calendar/schedule, etc.).

In addition to increasing value of content to the content distribution system, the content manager may preload content a user may require at the location (for example pre-stored maps, traffic profiles or directions from the airport, POI information (for example hotels, restaurants, taxis) in case there is no access network available. In addition preloaded (rich) targeted advertisements could be preloaded.

In addition the content manager may collect user parameters such as current or collect/estimate/predict future leisure mode (for example working, walking, eating, business or pleasure traveling, business meeting, etc.) to determine what content to preload on the storage elements available to the user.

User/s parameters may be collected without or independently of any user input or preferences. A content manager may preload the content without any user individual selection of the content elements.

In addition the content manager may collect user parameters such as content consumption or purchase behavior vs. time of day, day of week (for example could be coupled with location or leisure mode). A user may prefer to install software weekdays during the morning or watch movies at night or install apps on Sundays.

User Device Parameters

FIG. 2 shows an example of a user device and FIG. 9 is a table that includes some information that could help the content manager in selecting valuable preloaded content according to an embodiment. For an embodiment, information associated with processor 201 parameters could be helpful deciding the format or version of a game to preload, the operating system installed on the storage 204 and/or RAM 202 may determine the software or software upgrade or software patch to preload, the one or more available modems (216, 215, 214, 113, 212) could help determine how or when or where to preload the content. The parameters of the user interface (for example display resolution and size) could help determine what formats of content to preload. For an embodiment, the processor performance or video decoder software installed may determine the compression format to preload for a movie. In addition, the list of users associated with the user device vs. time or location could help improve the value of the preloaded content.

Examples of user device parameters relevant to the content manager are device type (for example mobile, portable, fixed), device usage location (for example work, home, POI, etc.), shared or single user.

In addition the user device state may also be used as a user device parameter. Examples of device state include: current user/s or future predicted user/s associated with the device, device powered-up state, device connected to AC or battery powered, remaining battery power, current and predicted communication networks, congestion of the available networks, distributed storage status (for example tiered storage currently associated with the user device), location of the device, etc. In an embodiment the user device parameters are updated over time, wherein parameters could be updated periodically, or based on interrupts, or based on event, etc.

POI Devices

POI devices include storage elements and access devices that reside at POI to help provide content to users of user devices or storage elements associated to user devices. These include WLAN access points, gateways, reservoirs, etc. that could preload or download selected valuable content to be preloaded or downloaded to intended storage associated to user devices or directly to user devices. Example of POI are coffee shops, restaurants, airports, grocery stores, department stores, libraries, public buildings, parks, sporting venues, etc., where a plurality of users could congregate or associate with. POI devices typically serve multiple users or multiple user devices. The users could have some group parameter (or characteristic) that could help predict what content to preload at the POI reservoir to avoid straining the shared access network connection from the POI devices to the content providers. For an embodiment, if an access point of a coffee shop has a single T1 backhaul (1.5 Mbps) it may not be able to support more than a couple of users streaming mobile device (for example smartphone or tablet) quality video. The streaming content may be frequently stalling and buffering for all if more users join the POI access network. To help a POI content manager, relevant information could include POI access network parameters to user devices (for example WiFi modem air interface supported—11a/b/g/n/ac), coverage area, statistics of data rates with user devices, current user parameters in coverage area, historical users parameters (for example profile, history) in coverage area vs. time of day (for example a coffee shop may have more business customers during the day, but more students at night), historical content consumed and purchased from the POI reservoir. Moreover communication network parameters from the POI device to the content provider could also be relevant (for example bandwidth, cost structure, QoS, QoE, wired vs. wireless vs. mesh backhaul, etc.). In an embodiment the POI device parameters are updated over time, wherein parameters could be updated periodically, or based on interrupts, or based on event, etc.

Based on POI parameters above, a POI content manager, at a POI device (maybe vs. time) can preload targeted/selected valuable content, as the plurality of users changes at the POI coverage area. A POI content manager could jointly control several POI devices and select content accordingly as users may consume and purchase different content when at different POI device.

Communication Network Parameters

A user device or storage element could have access to many types of communication networks (home networks, access networks, broadband networks, cellular networks, POI networks, device bus, etc.), and each may include a number of communication network parameters or other information (for example weights, functions, models, relationship between one of the previously described parameters, etc.) that could help increase the value of the content preloaded onto the storage elements. Communication network parameters could include customer satisfaction or QoE, value metric information could include content consumed or purchased relative to content cost or any content sponsoring/ads revenue and/or relative to connectivity or storage cost. The plurality of communication networks could have significantly different performance (for example bandwidth, latency, jitter) and significantly different cost structure. Therefore knowledge of communication network parameters could be a key element of a content or storage manager/s content preloading algorithm/s. FIG. 10 lists some example communication/connectivity network parameters a user device or storage may have access to. Parameters may include speed or bandwidth or latency or jitter statistics (for example typical/max/min/histograms/cdfs). Communication network parameters may include cost structure. Cost structure could include set-up costs, cost per time period, unlimited usage or max usage or cap per time period, cost of usage above a threshold or cap. Cost structure could include whom pays for the usage, a user/s, a user device, one or more content providers, one or more sponsor, one or more ad provider, a content broker, ad broker, etc. A cost structure could include a storage manager from a content or ad provider sponsoring the communication network cost in exchange for storage allocation of content or ads. The user may pay for usage not related to content preloading or the content provider or content broker may pay for communication network usage related to the content preloaded. In an embodiment the communication network information is updated over time, wherein parameters could be updated periodically, or based on interrupts, or based on event, etc.

The content manager could notify the user device if the desired content could not be delivered with adequate QoE given the communication network parameters or notify about related preloaded content available or other content that could be delivered with adequate QoE over the network. The content manager could notify the user device if the desired content is not allowed by the communication network or if the user preferences indicate that the user has selected not to allowed the target communication network (for example the user may be invited to overwrite the profile or make an exception). The content manager may also monitor the communication network data plan usage and alert of usage overruns or predicted overruns.

The content manager could notify the user device if the desired content could not be delivered with adequate QoE given the communication network parameters or status and notify the user can also purchase the desired content for pick up at a particular location or a future time (for example home, or at the office).

Test Group Information

An embodiment includes obtaining information associated with the value metric for the content based on prior preloading of the content, and evaluating interaction with the preloaded content. For at least some embodiments, the evaluated interaction includes at least one of a purchase, a consumption, a selection, a clicking, a browsing, a searching, a placing in a cart.

An embodiment includes selecting a first plurality of storage elements, preloading at least a portion of the content onto the first plurality of storage elements, wherein the first plurality of storage elements are associated with a first plurality of user devices, and obtaining information associated with the value metric from the content preloaded onto the first plurality of storage elements. For at least one embodiment, the information associated with the value metric includes one or more of likelihood of consumption of the content preloaded onto the first plurality of storage elements, a cost associated with the of the content, a cost associated with the communication network. Further, an embodiment includes selecting a second plurality of storage elements based on the information associated with the value metrics obtained from the content preloaded onto the first plurality of storage elements and the second plurality of storage elements, and preloading the content onto the second plurality of storage elements.

Communication networks, storage elements, user devices, user time/attention/money, etc. are valuable resources. Prior to preloading one or more content onto a large number of storage elements it may be useful to obtain value information (parameters, metrics, functions, models, relationships) over a smaller population of storage elements or POI devices or users, etc. to avoid wasting system resources.

To improve the value of the content distribution system, value metrics may be derived for selecting preloaded content based on information about the users, information about the user devices, information about the storage elements, information about the communication networks, information about the content, information about the content providers, etc. The value of the content distribution system may improve if the appropriate content is preloaded onto storage elements near the appropriate users, associated with the appropriate user devices, utilizing the appropriate communication network, at the appropriate time, at the appropriate location, etc., so that the user could consume it. The value metric could be a function (could be a model/table/etc.) of one or more parameters. Each of the variables or parameters could be tested independently, as a subset, or jointly, or any other combination, etc. In at least one embodiment, a test group is selected, and value metrics derived from the test group are obtained. In at least one embodiment, the test group could be a content, a storage element type, a user device type and a set of users. The content could have multiple parameters, such as price, format, size, QoS parameters, etc. the content could be preloaded onto a subset of storage elements associated with user devices associated to a user. In addition, the content could have content rules associated with the content that may enable or prevent the content from being preloaded to some users, etc. The content selection, viewing, purchasing, interaction, etc., by the target users may be monitored, processed, etc., to obtain or measure or estimate, etc., the value of the preloaded content. If the value of the content is desirable it could be used to further preload the content onto other users with similar storage type or similar device type.

The set of users could be selected randomly, the set of users could be selected based on demographic parameters, the set of users could be selected based on location, the set of users could be selected based on prior content consumption, etc. In another embodiment, the test group could be a type of content, a storage type, a user device type and a set of users. Several content elements of the same type could be preloaded targeting several user devices of the same type or a set of multiple users. The multiple users could be selected randomly, or targeted based on special parameters, etc. The viewing, purchasing, consumption of the several content elements of the same type could be jointly statistically processed to evaluate the value of multiple content elements of the same type when preloaded as a group. In another embodiment, the test group could be several content elements, of different types (for example movies, games, videos, etc.,) jointly preloaded onto multiple storage elements associated to multiple user devices associated to multiple users. The multiple users could be the same users from a prior embodiment or a different set of users. The viewing, purchasing, consumption of the several content elements of different types could be jointly statistically processed to evaluate the value of multiple diverse content elements. In another embodiment, the test group is a content, several storage elements classified by type, associated to user devices of a single type, associated to multiple users. The several storage elements classified by type could be flash, SSD, HDD, etc., or could be fixed (for example PC, STB, etc.) versus mobile (for example tablet, smart phone, etc.), etc. The viewing, purchasing, consumption of content preloaded onto the several storage types could be evaluated. For an embodiment, the relative value metrics of fixed versus mobile storage could be quantified. In another embodiment, the sensitivity to price is evaluated. The test group is a content or a family of content, a storage element type associated to user devices of a single type, and a subset of users. The subset of users be further divided into smaller subsets and content preloaded onto their associated storage at a different price for each subset of users. The viewing, purchasing, consumption of the same content at different prices is collected. Based on the profit, revenue, user uptake, etc. of each subset of users, value metric information for each different price could be compared. The price may be tested at the few discrete points, so the value may be obtained only at these discrete points. In another embodiment the value of the content could be extrapolated or interpolated at other price points based on the data collected from the tested price points. The preferred price point may be in between tested price points (for example interpolation) or outside the set of tested price points (for example extrapolation, etc.). In another embodiment, the value is evaluated over demographic categories (for example age group, sex, occupation, education level, location, political affiliation, single/married, with/without children, participants of a specific social network, etc.). For an embodiment, a content or group of content, could be preloaded onto a storage type associated to a user device type to a demographic category price of married women with children between 30 and 40. The value of the content could be evaluated over a time span, which could assist on the decision whether to preload to a larger population of this demographic. In another embodiment, the value metric information is evaluated over time. For an embodiment, a test group may include a set of content, storage elements, user devices, target users, etc. and The value metric information generated by the test group is monitored at specific time intervals (for example every hour, every day, every week, or any other time interval, etc.). In this manner, the value metric information generated by each time interval could be evaluated or estimated, and the time the content is exposed to a set of users could be selected. If the value metric information of a content after a time period drops below a threshold, it may be beneficial to delete the content, or exchange it for a different content with value metric above the threshold. Alternatively, instead of deleting the content it could be placed on a lower priority menu, or a less visible ranking, display menu, etc. In another embodiment, the value metric information is evaluated over time of day. For an embodiment, a test group may include one or more of a set of content, storage, devices, target users, etc. The value metric information could be evaluated over time intervals related to target user activities. For an embodiment, 6 AM to 8 AM for morning commute, 8 AM to 12 PM for morning work, 12 PM to 1 PM for lunch break, 1 PM to 6 PM for afternoon work and 6 PM to 11 PM for home/evening activities. The value metric information of the target content on the target storage on the target devices associated to the target users could be evaluated for each of these time intervals. Based on the value metric information of the target content relative to other available content for each of these time intervals a decision to store, display, rank, delete, swap, the target content relative to other content could be made to improve the value metric.

In another embodiment, value metric information of joint relationships between content are evaluated/obtained/estimated/etc. The joint relationships could be correlations between content, sequences of content consumption, relative value between content, cannibalization between content, etc. For an embodiment, consumption of a specific content may increase the likelihood of consumption of a second content, and therefore the value metric of the joint set of content may be higher than the value metric of each separately. For an embodiment, consuming a music video from a specific singer may increase the likelihood of consuming a second music video from the same singer. For an embodiment, consumption of a specific content may delay the likelihood of consumption of a second content. The value of the first content stand alone may be high, but its effects on subsequent consumption of content may reduce the value metric of the combined content. For an embodiment, consuming an addictive videogame may delay the consumption of other videogames, or any other content.

In another embodiment, the information of the value metric of the presentation/display of information related to a content to a set of users is evaluated. The presentation could be a pop-up, a banner, a bubble, a relative ranking, a special font, a special background, a preview, a sample, etc. or any other method to highlight the target content relative to other content.

In another embodiment, information about the value metric is estimated relative to repeat consumption. In another embodiment, information about the value metric of several subscription plans is evaluated. In another embodiment, information about the value metric is estimated based on user intent, viewing, zooming, selection, previewing, In another embodiment, the value metric information measured from the test group is refined (for example normalized, reduced, increased, scaled, etc.) to correct for test group/market errors or biases. The refinement may be based on prior test experiments.

In another embodiment, value metric information of content business rules are tested/obtained/etc. The content business rules may include coupons, specials, temporary promotions, discounts, free trials, free with ads, etc.

In another embodiment, the content business rules of modified or refined based on the value metric information from the original business rules.

In another embodiment, the value metric information is evaluated relative to a location. The location could be a POI. The location could be a POI type. The location could be a home network. The location could be a work network.

In another embodiment, the value metric information is measured relative to content format (for example mobile, HD, SD, 1080p, 720p, etc.).

In another embodiment, the value metric information is evaluated by testing several previously described parameters simultaneously. The information collected from testing several parameters simultaneously could be used to generate a multidimensional model of the value relative to the several parameters. The multidimensional model of the value could reveal combinations of parameters that result in increased value that may not be apparent by evaluating each parameter independently. For an embodiment, the model could be a Bayesian belief network model, Bayesian statistics, Bayesian analysis, hidden Markov models, etc.

In another embodiment, obtaining the value metric information associated with a test group, includes one or more of the following steps: designing the test, executing the test to generate data, preparing the data, importing the data, preparing the data for modeling, specifying factors manually or discovering factors automatically, creating factors, interpreting the model, applying the model for prediction, etc.

In another embodiment, the measured/estimated/modeled/etc. value metric information is shared with the storage manager, content manager, content provider, content broker, etc. to further evaluating the value metric for future content preload selection or content business rules or storage element or user device, users, etc. to be targeted.

In another embodiment, a subset of the value metric information relative to the user consumption of the content is shared. A subset may result in less chatter over the communication network, improved privacy to the user, etc. the subset of the information may be different depending on the destination. For an embodiment, a content manager located at the user device may have more information than a content manager at a content broker server, which may have more information than a content manager at a content provider server, etc.

In another embodiment, the value metric information is estimated based on monitoring user interaction with content, for example browsing, search, viewing, zooming, selecting, choosing, purchasing, ordering, cart insert, experiencing, repetitions over time, etc.

In another embodiment, the value metric information is obtained for content preloaded may be (rich) ads or include ads.

In another embodiment, the test group is user centric (where centric could be based on, focused on, biased towards or from the perspective of, etc.), or user device centric, or storage element centric, or home network centric, or POI centric, or product/content centric, or content provider, or content broker centric, or service provider centric, etc.

In another embodiment, the test group is changed adaptively or iteratively.

In another embodiment, alarms or notifications are generated based on the value metric information observed during the test group evaluation.

The efficiency of a content distribution system could be improved by selecting one or more subsets of users or user devices or POI locations, etc., and provide associated storage elements with preloaded content. The content manager/s could monitor the statistical consumption and purchase behavior (for example uptake rate) of the one or more subsets and decide what content to preload to larger populations of users or user devices or POI locations, etc. This reduces preloading content that may consume/waste storage space or communication network bandwidth with content that is not valuable. For an embodiment, from a population of 10,000 coffee shops in a system, the POI of the reservoir of 100 (or 1%) of these could be preloaded with a specific content at a specific price. Based on the user consumption or purchase a decision to preload to the remaining 99% coffee shops could be determined. In a second embodiment, price elasticity could be determined. For an embodiment, 3% of the POI reservoirs could be preloaded with a specific content with each of three subgroups of 1% priced at low, medium, high levels. The statistical value metric of these 3 subgroups (for example "uptake times (price–cost)") could be used to price the remaining 97% of the POI. In a different embodiment, user devices are classified by type (for example smartphone, tablet, notebook) and a target content is preloaded onto 100 instances of each type. Consumption or purchase statistics or other value metric information are collected per group and used by the content manager for future content preloading. In a different embodiment, users are classified by income (for example <$30K, >=$30K) and a target content is preloaded onto 100 users of each type. Consumption or purchase statistics are collected per group and used by the content manager for future content preloading. Test market/group value metric information could be further collected per user demographics (for example age group, sex, occupation, leisure status), per time of day, per day of week, per communication network, per POI, per content provider, per content type, per content format or any other parameter of the user, user device, storage element, location, time, content, communication network, etc. and folded back into content manager value metric or profitability analysis for future content preloading.

The statistical information could be managed by a content broker. The statistical information from the test market could be shared with the content providers. The statistical demographic, price elasticity, etc. data could be used by the content provider for improved pricing or improved uptake, or improved targeted content or targeted ads to the appropriate demographics, etc.

User Device Associated Storage

At a given location and time the user device could have one or more associated storage elements. A storage manager could discover and/or update the available associated storage automatically or with help from the user device or user, etc. The storage elements available to the user device could include local storage on the user device, or storage that could be accessed over communication networks, such as home gateways, POI reservoirs, etc. These storage elements could be classified into tiers, based on the communication distance (for example latency, bandwidth) and storage parameters (for example size, available space, access type—HDD, SSD, flash) to the user device. The content manager could assign different content amounts or types or sizes into different tiers automatically. The user may have a better content QoE by streaming from a POI reservoir from a nearby gateway with preloaded content over a faster local communication network without having to access a slower and more costly cellular mobile access network. The user may not need to pre-select content and could have instant availability without any planning needed. Content can be sent directly to each tier.

Content for gateway can be chosen based on multiple user devices that may be near gateway. Stored content at the tier that is easiest for the user to get to (for example based on location, time, user device consumption) can be designated as nearest to the gateway. Typically lower storage tiers have more storage capacity and are less portable than mobile devices.

Notifications

Notifications could be presented to the user at a user device interface by one or more storage managers or content managers or device SW or device agents or device applications at the user device, or at storage element, or home network device, or POI device, or content provider server, or content broker server, etc. Notification could include content information (for example content lists, types, format, price, availability, rules, etc.), updated content information, new content, stale content, specials, communication network status, communication network updates, associated storage, tier storage, etc. Notification can be presented based on when content file has been stored. A notification can also be presented based on location or time of day when a particular content has been preloaded. For an embodiment, a notification could be: "I noticed you are at the airport, here is some content that is available at your device". Notification messages may be informative (for example a list of content and price) or may require user responses or actions (for example: "content A has not been consumed in 7 days, do you want to delete"). Notifications may include new preloading services or features, upgrades in service, status of service plan, etc. Notifications may include information to improve the preloading service (for example update preferences, permission to share parameters associated with the user, survey responses, etc.). Notification messages may include updates on communication network state (for example available/marginal/out-of-coverage, entering new network, exiting network, etc.) that may influence content preloading services (for example preloading service availability, cost of preloading new content or consuming existing or future content, content availability, etc.). Notification requests may include inquiries for future state of a user of the service (for example future location, future activities, future leisure mode, etc.)

Value Metric

In an embodiment, a value metric can generally be defined as a value of a function or model or state machine, etc., that comprises one or more of a user parameter, a user device parameter (HW, SW, etc.), associated storage element parameters, a communication network that may be used in selecting valuable content to be preloaded. The value metric may include a cost or price parameter. For an embodiment, a value metric function for a Content A, may be:

```
(if available storage>X GB)*(user device processor
    performance>Y)*(user likelihood consumption)*
    (price of Content_A)
``` where '*' is the multiplication operation.

For an embodiment, the value metric includes information associated with other content available on the storage element. For an embodiment, the cost parameter of the value metric includes information associated with at least one of a communication network assisting in the preloading of the content, the storage element. For another embodiment, the cost parameter includes information associated with at least one of a communication network assisting in presenting the content at a user device.

An embodiment includes determining an association of the storage element with a plurality of user devices, and wherein the value metric is based on the plurality of user devices or a plurality of users associated with the plurality of user devices.

For an embodiment, the value metric comprises at least one parameter, wherein at least one of the parameters provides an estimate of a likelihood that one or more users associated with the storage element will consume the content.

For an embodiment, the value metric includes a function or model of one or more value metric parameters, wherein a selection of the function or model or selection of the one or more value metric parameters is based on the service provider's perspective, wherein the service provider comprises at least one of a content broker or a content provider. For another embodiment, the selection of the function or model or selection of the one or more value metric parameters is based on a user's perspective.

For an embodiment, the value metric further includes a parameter associated with one or more of the plurality of content. For an embodiment, the parameter can be related to projected profit associated with each of the plurality of content. For at least some embodiments, the parameter associated with one of more of a plurality of content includes at least one of a content cost, a content size, a content type, a content format, and/or content software or hardware requirements for content playback.

For an embodiment, the value metric includes a parameter associated with the storage element. For at least some embodiments, the parameter associated with the storage element comprises at least one of a storage element cost, a storage element opportunity cost, a storage element size, an available storage element size, a storage element type, a storage element access speed, a storage element latency, a storage element throughput, a communication network parameter of the storage For an embodiment, the value metric includes a parameter associated with the communication network. The value metric includes a parameter associated with the communication network and are described under value metric sections, and may include availability, performance, cost, quotas, caps, etc.

Embodiments further include actions taken based on the value metric. For example, one embodiment includes assisting in deleting of at least a portion of a second content available on the storage element. For an embodiment, selecting the at least a portion of the second content to delete based on a second value metric. Another embodiment includes assisting in moving at least a portion of a second content available on the storage element to a second storage element associated with a user or user device.

Value metric information (for example parameters, weights, etc.) may be obtained from virtual or real world sources. For an embodiment value metric information may be obtained from a users' user device activity (for browsing history, content interaction history, etc.) or information of the user available on the internet (public or private sources, etc.) or information of the virtual or real world social networks associated with a user (for example value metric information of siblings, value metrics of coworkers/classmates, or value metric information of virtual friends, etc.)

Value metric information may be gathered locally at a user device, or remotely at a POI device or network entity server, etc. The value metric information may be gathered at a single location or gathered at multiple locations. Value metrics may be obtained at a single location or obtained at multiple locations. Multiple value metrics may be combined at a single location. A content selection for preloading may involve computing more than one value metric by one or more entities. For an embodiment a network element—for example a content broker server—may compute a value metric based on value metric information from a user device and a content provider for selecting a content to be preloaded to the user device. The user device may compute a second value metric based on a user parameter. The joint or combined value metric may be utilized for a decision to preload or not a content. The first value metric may be used to preload the content, and the second value metric may be used to make decisions to delete or move the content from the user device, etc.

It may be beneficial to select content to preload based on value metrics. Value metrics may be obtained from a value metric function or model and may include one or more value metric parameters, one or more weights or one or more relationships between the value metric parameters, resulting in different interpretation/goals/priorities/etc. of the value metric. Value metric could be in one or more units of $, $/user, $/time, user satisfaction, $/GB, $/POI, (number of users)>($Threshold),$/(Communication Network), etc. where $ could be any currency or monetary or financial unit.

A value metric could be a single value or a vector (multiple values). A value metric could be associated to a single content or a group/plurality of content.

In a content distribution system that includes one or more of users, user devices, storage elements, communication networks, content, content providers, content brokers, the user devices, the storage elements, the content or the communication networks may be valuable resources that the users, content brokers and content providers may like to exploit, by preloading appropriate content on appropriate storage elements over appropriate communication networks. To improve the value of the content distribution system to one or more parties may assign value to the elements of the content distribution system with value metrics. A value metric could be based on a single parameter or could be derived as a combination of parameters.

A content manager may include improving the value metric of the content that is preloaded onto one or more storage elements associated to one or more user devices that one or more users may consume or purchase or selection of content based on value metric. The content manager may use one or more parameters associated to a user, a user devices, a storage, a communication network, a content providers, a content brokers, etc. as described above. A value metric could be one or more of the current value, future value, expected value, minimum value, maximum value, threshold value, percentile value, etc. The value metric could comprise one or more of increasing/improving/enhancing: user satisfaction, user QoE, user experience, user mobility, user attach rate, user feedback, user purchase rate, user uptake, user loyalty, number of users, user growth, user referrals, etc. The value metric could comprise one or more of reduce cost, reduce user device cost, reduce communication network cost, reduce content cost, reducing storage usage, etc. The value metric could comprise increase revenue, increase content revenue, increase user revenue, increase profit, increase profit margin, increase revenue growth, increase battery life, increase number of patrons into a POI establishment, increase number of ads consumed, increase number of ads clicked, etc. The value metric could benefit one or more users, one or more user devices, one or more communication network providers, one or more POI, one or more content providers, one or more ad content providers, one or more content brokers, etc. The value could benefit one or more elements of an entity or one or more elements of multiple entities simultaneously. The value metric target could be different for each entity or element of an entity (for example the value metric could be user satisfaction for user A, cost/month for user B, number of patrons for POI A, number of users for content provider A, total revenue for content provider B and profit/user for content broker A, etc.).

For at least one embodiment, the value metric comprises a computation based on a single content or a group of content or on all the content on one or more storage elements associated to the user device. A group of content could be a several content of a given type (for example movies or games, SD or HD, etc.), or several content of a given price, or several content on the same storage element, etc. The value metric of a group could change over time or over location. For an embodiment the value metric of a group could be HD movies on home reservoir 120 when user device is within coverage area of home network 116, but could be HD movies in POI reservoir 121 when user device 100 is within coverage area of a coffee shop with POI access network 112. Similarly all the content associated to the user device could change over time and location.

For an embodiment the value metric of a group of content 1 through N could be represented as:

$$\text{VM\_for\_Content\_1:}N=\text{VM}(\text{Content 1},\ldots,\text{Content } N, UP, UDP, SEP, CNP, \ldots );$$

Where UP, UDP, SEP, CNP represent user parameters, user device parameters, storage parameters, communication network parameters.

In this notation the value metric of a single content_N+1 would be $$\text{VM\_for\_Content } N+1=\text{VM}(\text{Content } N+1, UP, UDP, SEP, CNP, \ldots );$$

The effects of adding the content N+1 to an existing storage element with content 1 to N would be represented as:

$$\text{Incremental\_VM\_for\_adding\_Content } N+1=\text{VM\_for\_Content\_1:}N+1-\text{VM\_for\_Content\_1:}N$$

The effects of deleting the content N to an existing storage element with content 1 to N would be represented as:

$$\text{Incremental\_VM\_for\_deleting\_Content\_}N=\text{VM\_for\_Content\_1:}N-1-\text{VM\_for\_Content\_1:}N$$

These incremental value metrics for adding or deleting content could be used to increase the value of preloaded content when storage space is available or for deleting preloaded content when storage space is low or for swapping low value content for new content that may be more valuable. The expressions for adding and deleting could be used simultaneously for swapping content. These expressions could be extended for adding (or deleting or swapping) groups of content. These expressions could be used for sorting content to be preloaded (or deleted or swapped).

The value metric for additional content considered for preload could be computed relative to one or more content previously preloaded on the storage associated to the user device. An associated storage element may be full, in which case deleting/moving/swapping of previously preloaded content may be required to preload new content, or may have available storage. In both cases the new content may affect the value metrics parameters (for example likelihood to consume) of previously preloaded content. The previously preloaded content may be moved to a different storage element associated to the user device. For an embodiment user device 100 may be at within home network 116 and about to leave to go to work network 112, if a content resulting in higher valuable metric is identified to be preloaded onto the local storage for user device 100 over home network 116, a content with lower valuable metric may be moved to home reservoir 120 over home network 116 for a later consumption. This may save communication network cost.

The value metric for a additional group of content may be considered for preload could be computed relative/jointly to one or more content previously preloaded on the storage associated to the user device. An associated storage element may be full, in which case deleting/moving/swapping of previously preloaded content may be required to preload new group of content, or may have available storage. In both cases the new group of content may affect the value metrics parameters (for example likelihood to consume) of previously preloaded content. A subset of the previously preloaded content may be moved to a different storage element associated to the user device. For an embodiment user device 100 may be at within home network 116 and about to leave to go to work network 112, if a group of content resulting in higher valuable metric is identified to be preloaded onto the local storage for user device 100 over home network 116, a content with lower valuable metric may be moved to home reservoir 120 over home network 116 for a later consumption. This may save communication network cost.

Previously preloaded content may be re-distributed over storage elements associated to user device 100 to improve value metrics. For an embodiment content in the local storage of user device 100 could be moved to home reservoir 120 or content on home reservoir 120 could be moved to the local storage of user device 100 when user device 100 is within the coverage area of home network 116. For an embodiment content that may be more valuable at work may be moved to the home gateway when user device gets home in the evening in exchange for content that may be more valuable when the user device 100 is at home. The reverse operation could be performed the following morning prior to user device 100 going to work.

Previously preloaded content may be deleted to improve value metrics associated to the remaining previously preloaded content. For an embodiment low value metric content may be deleted from user device 100 to increase the likelihood of consuming more rewarding higher value metric content.

The value metric function used to compute value metrics may change over time, or location, or communication network, etc. For an embodiment the value metric function that assigns more weight to likelihood of consumption of a user associated to user device 100 prior to a long flight will encourage preloading content with higher likelihood of consumption so that the user is not disappointed without any entertainment when out of communication network connection. For an embodiment the value metric function may assign more weight to cost reduction when the user associated to user device 100 is at home during the weekend when other entertainment choices may be available.

The value metric function may be different for each user or each user device, or each storage element associated to each user device. For an embodiment a user associated to user device 100 with an unlimited content flat fee monthly plan may prefer a value metric function that assigns more weight to hours of content consumption per month. For an embodiment a storage element associated with a user device 100 with very large available storage may have a very small weight for storage cost value metric parameter, but the local storage in user device 100 may be limited and require a large weight to storage usage in the value metric function.

Improving a value metric could include one or more of optimization, maximization, minimization, maxmin (maximizing the minimum value), minmax, maximizing a percentile, maximizing or optimizing an expected value, etc.

A value metric could benefit one or more of a user, a plurality of users, a content provider, an ad provider, an ad service provider, ad broker, a content broker, an communication network provider, etc.

The value metric could be associated with storage elements, content elements, user devices, POI storage elements, etc.

Value Metrics Associated to a User Device

Value metrics associated to a user device are those that include one or more of value metric parameters, value metric parameter relationships, value metric parameter weights, value metric functions of models that are intended to benefit a user device, or from the point of view or perspective of a user device, etc.

Figure 14:
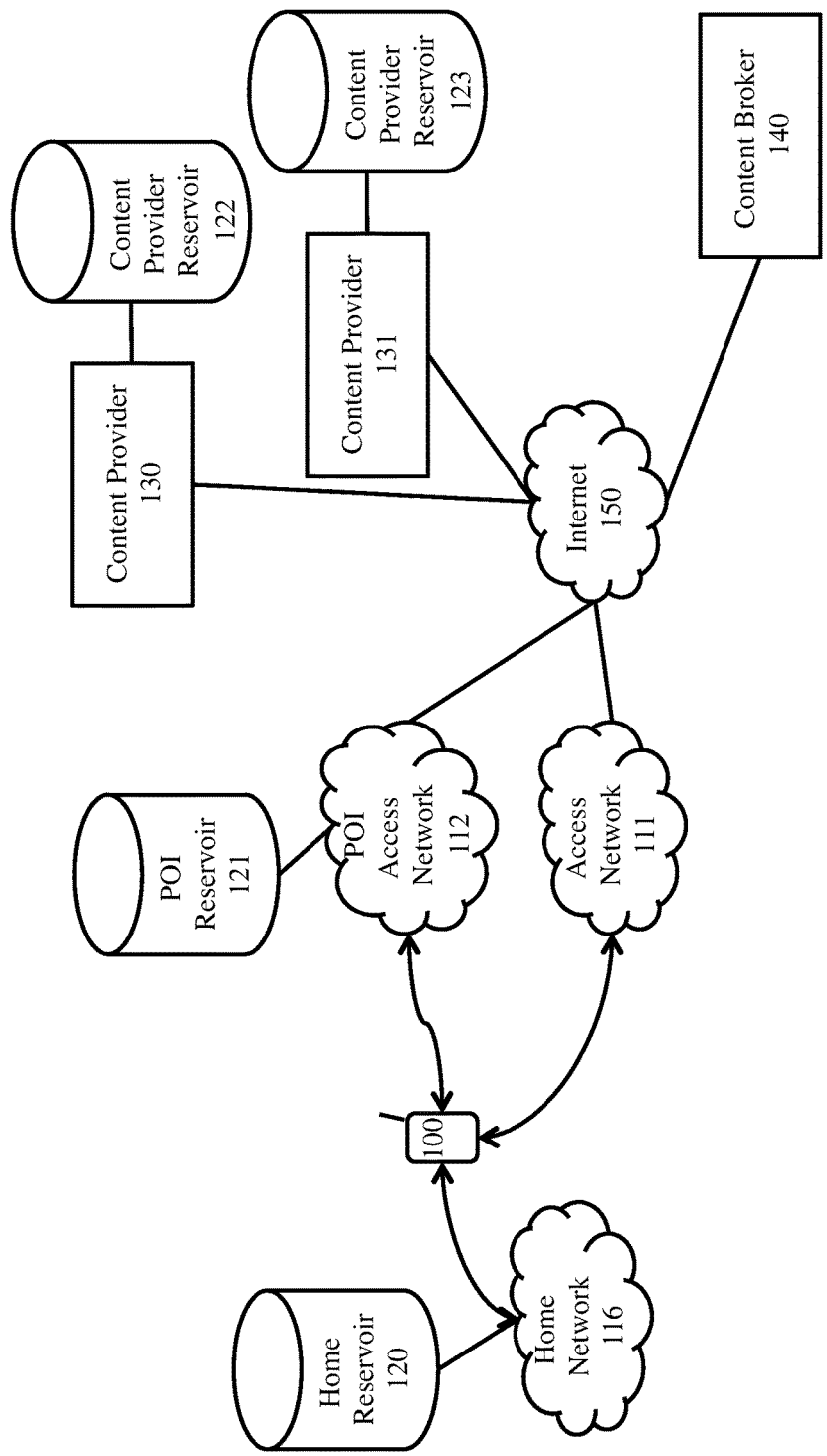
FIG. 14 shows a preloading system according to an embodiment.

FIG. 14 shows a preloading system according to an embodiment. In an embodiment, the value metric is associated with a user device 100 in FIG. 14 associated to a single user. User device 100, could be connected to home network 116 (for example a WiFi) or could be connected to network 111 (for example 2G/3G/4G) or could be connected to network 112 (for example a work WiFi or coffee shop WiFi). User device 100, when at home could access home reservoir 120 or content provider reservoirs 123 or 122, when at work could access POI reservoir 121 or content provider reservoir 122 or 123. When connected to access network 111, the user device could access content provider reservoirs 122 or 123. FIG. 15 is a table that includes a sample list of content at home reservoir 120 according to an embodiment. In an embodiment, the content includes the following parameters: name, ID number, type, format, size, duration, list price, etc. the content included in the home reservoir could have more or less content or additional parameters or less parameters. FIG. 16 is a table that includes a sample list of content and parameters at POI reservoir 120 according to an embodiment. FIG. 17 includes a sample list of content and parameters at content provider reservoir 122 according to an embodiment. FIG. 18 is a table that includes value metric information associated to a user to obtain value metric for selecting content to be preloaded onto user device 100 according to an embodiment. The value metric parameters included are: type, format, size, duration, price to user, specials or promotions, sponsor service ad revenue, communication network cost, user storage costs, user likelihood to consume, value metric. In another embodiment, a subset of the value metric parameters may be used, or additional value metric parameters may be used. The type parameter may be used to match with a user input profile selection or a user history profile or a parental control, etc. The format parameter may be used to match the content with the user device hardware or software capability (for example processor speed, video decoder software installed, etc.) or it may be used to match a user desire (for example SD versus HD, etc.). The size parameter may be used to estimate the communication network costs or to compare relative to the available storage or to compare relative to the user storage cost, etc. the duration parameter may be used to estimate a time a user may spend to consume the content or the communication network speed or bandwidth requirements (when normalized by size, etc.), etc. The price to user parameter may be used for billing, to estimate the likelihood the user will consume the content, to estimate the total cost of the content of the user, etc. The specials or promotions parameter may be used to entice the user or to reduce the cost, etc. The sponsored service or ad revenue parameter may be used to subsidize or reduce the cost of the content to the user, etc. The communication network cost includes and estimate of the cost of preloading the content to the user device over a given communication network, etc. the user storage cost parameter could be used to estimate the total cost of the content or could be used as a tax to the content provider for preloading content or could be an opportunity cost of the storage element, etc. the user likelihood to consume parameter estimates the likelihood a user will consume the content. The likelihood of consuming a content could be affected by other content present at the device, the user location, time of day, leisure status of user, aging of content, previous consumption of content, etc. A value metric can be computed from a weighted combination of one or more of the value metric parameters. Additional value metric parameters may be included.

Value metric parameters may change as the user device changes location or over time, etc. For an embodiment the communication network cost of Movie A in FIG. 18 could be 0 when the user device is in the coverage area of its home network, but could be really costly when the communication network is a roaming network. For an embodiment the user likelihood of watching a movie during business hours could be low, but could increase during lunch hour or on the way home on public transportation. Alternatively, price to user, specials, promotions, sponsored services, could vary over time as the content providers or content brokers changed the business rules of the content.

In at least one embodiment the value metric is associated with the cost of the content consumption per unit of time. This value metric could be obtained by adding the cost columns (for example 1106, 1109, 1110, etc.), and subtracting the subsidies (for example 1107, 1108) and normalizing by the amount of time the user could enjoy the content (for example: 1105). In at least one embodiment, the user is only responsible for paying the price to use if the content consumption is initiated or completed, but typically the communication network cost may be incurred if the content is preloaded whether the content is consumed or not. In this case it may be advantageous to penalize the communication network cost accordingly. For an embodiment the communication network cost may be normalized (for example divided by) by the likelihood that the user will consume the content. For an embodiment if a content has a 20% chance of being consumed, the communication network cost could be multiplied by 5 (=1/20%), since on the average a content with these parameters would require 5 preloads before being consumed. The user likelihood to consume parameter is a function of how long of a time window is computed over. For this case it may be advantageous to consider the time interval before the content will be deleted or swapped for a different content. In many instances normalizing the communication network cost by the user likelihood to consume will penalize preloading large content over expensive networks, which is not economically advantageous to the user. In at least one embodiment, the user of the user device, prepays for the storage associated to the user device as a one-time cost item and does not incur any costs per gigabyte per day. But if the user device preloads a large single item that fills up the storage the value of this content to the user may be low (for example a single 16 GB game may fill up the flash of a tablet). Therefore methods to assign a cost to storage used by content may be advantageous. In at least one embodiment, the storage required by the content is normalized (for example divided) by the available storage. In another embodiment, the storage required is normalized (for example divided) by the likelihood to consume. In another embodiment the storage required by the content is normalized by both the available storage and the likelihood to consume the content. For example, if a user device has 10 GB of available storage, a 1 GB movie preloaded into this device will occupy 10% of the available storage. If this 1 GB movie has a 5% chance of being consumed on the average it will take approximately 20 content items with this profile for the user to consume one of them. The available storage will not support 20 content items with this profile, therefore this is may not be a valuable content. Therefore normalizing the storage required for a content by the available storage and the likelihood to consume could be a valuable metric to select content to be preloaded. This value metric quantifies the effective footprint of this content relative to the available storage. Therefore content with a lower value would be preferred, and typically a value significantly lower than 1 would be advantageous. This value metric could be compared to a threshold prior to preloading, or may be used to rank a plurality of content prior to preloading, or may be used as an opportunity cost relative to the previously preloaded content currently available at the storage element before making a decision to swap content, for example if the storage is full.

In another embodiment, a content provider or a content broker or some other entity is willing to pay for access to the available storage at the user device. For an embodiment this entity may be willing to pay in units of dollar per gigabyte per day utilized or a flat fee for a predetermined number of gigabytes per month. This amount could be used as a reference or an opportunity cost when making decisions to preload alternative content.

For an embodiment user device 100 may be a tablet with WiFi and cellular capability located within the coverage of both home network 116 and access network 111. Therefore the user device 100 could access to the content listed in FIG. 15 for home reservoir 120 or the content listed in FIG. 17 for content provider reservoir 122 or 123. For an embodiment the user of user device 100 may have selected the profile in FIG. 12, indicating preference for movies and games in HD 720p format in-home WiFi network for communication network.

In at least one embodiment, a user device value metric for a content under consideration is:

(if "type" and "format" included in user preferences)*(if comm network active)*price/min.

For this example, if the content type does not match or the communication network is not active, the value of the "if" statement is zero, otherwise it is one.

After taking into account the user preferences and the content available at the reservoirs of FIG. 15 and FIG. 17 the user device (for example a tablet) is currently connected to, the three content items listed in FIG. 18, Movie A, Game A, Game C currently have value metric greater than zero. In this example, a lower value metric would be advantageous to a user of the user device, since the price per hour of content consumption is something the user will typical want to minimize (as long as the content is enjoyable). For this example the relatively large and most expensive item provides the better value. If the value metric included a restriction or a cost penalty on the available storage size on the table, the value metric could have resulted in a different value. For an embodiment, if the table only had 8 GB of available space, only the Movie A would have a value metric greater than zero for this the storage element.

Value Metrics Associated to a Content Provider

In at least one embodiment value metrics associated to a content provider include one or more of value metric parameters, value metric parameter relationships, value metric parameter weights, value metric functions of models that are intended to benefit a content provider, or from the point of view or perspective of a content provider, etc.

A content provider may have a content provider reservoir (for example FIG. 17). The content provider may have access or permission to preload content onto storage elements associated to user devices associated to a user, multiple users, groups of users (for example POI devices) or any other devices. In at least one embodiment, the content provider assists in preloading selected content from the content provider reservoir over a selected communication network on to selected storage elements associated to the selected user devices targeting the selected users based on value metrics associated to a content provider.

Example parameters associated with the content elements that may be useful to compute value metrics associated to a content provider are listed in FIG. 17. For example a name, and ID number, a type, a format, a size, a duration, a licensing cost, a list price, or any other parameters. The parameter type may be used to classify the content and to match a user or group of users or user device profile preferences or profile history. The parameter format may be used to match the content to a device capable of presenting it (for example processor power, display resolution, etc.). The size parameter may be used to compare relative to the available space at the target storage element or the cost of the storage or as an opportunity cost relative to other content or to rank content, etc. The duration parameter may be used to estimate the time a user may spend consuming the content or to normalize relative to the size to compare versus streaming, etc. The licensing cost could be the cost the content provider may need to pay the author of the content after it is consumed by a user. The list price parameter may be the price a user may pay for consuming it. In another embodiment, in addition to parameters associated to the content, the content provider may require additional parameters associated with the user, the user device, the user device associated storage, the communication network, or any other parameters. FIG. 19 is a table that includes examples of additional parameters that may be used to enhance value metric analysis from a content provider perspective or point of view for selecting content to preload for a user with user device 100A according to an embodiment. The additional parameters include ad revenue 1208 that an ad provider may be willing to pay the content provider when an ad is viewed in connection with the target content, and communication network cost 1209 that the content provider may be willing to subsidize or sponsor for preloading the content, a user storage cost 1210 the content provider may be willing to pay the user for preloading content onto the users storage, the user likelihood to consume the content 1211, etc. For example the user storage cost 1210 could be in units of $/GB/day. For an embodiment, the user likelihood to consume the content 1211 could be normalized to a time period (for example user likelihood to consume over 1 day). In at least one embodiment one or more of the parameter values could be different for a user or group of users. For an embodiment, a user or group of users or user devices or storage elements may get a discount from the list price. For an embodiment, a user or group of users may have declined inclusion of ads for a premium service. For an embodiment, the likelihood of consumption could be refined for specific target users or user devices or storage elements, etc. For an embodiment, the communication network cost 1209 or user storage cost 1210 may vary between users. For an embodiment, the ad revenue 1208 for ad may vary between users, especially if the ads are targeted to a user.

In at least one embodiment one or more of the parameters listed in FIG. 19 are used to compute a value metric prior to preloading onto a target storage element associated to a user device associated to a user). In at least one embodiment, content that is compatible with the user device is considered for preloading. In at least one embodiment, content type or format that matches user profile is considered for preloading. In at least one embodiment, the list price and the licensing cost are used to select preloaded content. The difference between list price and licensing cost could be the profit to the content provider. The previous embodiment does not take into account the likelihood a user will consume this content. In another embodiment, the difference between list price and licensing cost are further weighted (for example multiplied by) by the likelihood the user will consume it over a time interval. For an embodiment, the list price minus the licensing cost jointly multiplied by the likelihood of user consumption over a period of time could be a metric of the estimated profit for this user over this period of time. In another embodiment an ad provider pays the content provider when the user consumes the content and the associated ads. This ad revenue could be added to the value metric. This ad revenue may be weighted by the user likelihood to consume the content associated to the ad. In another embodiment, the content provider is responsible for paying, sponsoring or subsidizing, etc. the communication network cost associated with the content preload onto the storage element. In another embodiment the content provider is responsible for paying, sponsoring or subsidizing, etc. the communication network cost associated with the content transfer from the storage element to the user device. In either of the latter two cases it may be advantageous to subtract a communication network cost in the value metric. Likely the communication network cost will be incurred regardless of the content consumption and may be weighted by their user likelihood to consume the content. For an embodiment, in FIG. 19, the value metric 1212 is based on the following function:

(if correct type)*(if correct format)*((list price−licensing cost+ad_revenue)*(user likelihood to consume)−(storage cost)−(communication network cost)).

In this example content ID#1002 and content ID#1003 do not meet the value metric "type" and "format" and the corresponding value could be assigned not valid, not applicable, not available or 0, etc. Content ID#1001 has a positive value metric of 0.25 and content ID#1004 has a negative value metric of −1.28. The main reason for a negative value metric for content ID#1004 is that the user likelihood to consume is rather low and the content size is rather large, and the storage cost and communication network cost is included as a content provider preloading cost regardless if the content is consumed or not (since it's not weighted by the user likelihood to consume). Based on FIG. 19, content ID#1001 may be preloaded onto user device 100A (for example a tablet), but contentID#1004 may not be preloaded onto user device 100A.

FIG. 20 is a table that summarizes a second example for evaluating value metrics from a content provider perspective for a second user device 100B (for example a tablet) according to an embodiment. For this embodiment, user device 100B is located within the coverage area of a home gateway with a large attached storage with 10× lower cost, and WiFi communication network, which does not incur communication network cost. For this embodiment the value metric is based on the function below:

(if correct type)*(if correct format)*((list price–licensing cost+ad_revenue)*(user likelihood to consume)–(storage cost)–(communication network cost)).

For this case the value metric of content ID#1004 is positive and higher than the value metric of content ID#1001, mainly because the communication network cost and user storage cost are relatively low.

In another embodiment the value metric of a content includes a divide by a time to consume the content. For an embodiment, the value metrics in column 1212 of FIG. 19 could be further normalized by the duration column 1205 to obtain a value in units of expected profit per time period.

In another embodiment, value metrics are evaluated to make decisions regarding deleting content. FIG. 21 is a table that includes an example of an update to FIG. 19 at a later time, where content ID#1001 and 1004 are currently preloaded onto user device 100A according to an embodiment. In this example, at a later time, content ID#1001 likelihood to be consumed has dropped from 25% to 3% and content ID#1004 likelihood to be consumed has dropped from 15% to 10%. The communication cost is not applicable, because the content is already preloaded. If the value metric for deletion is based on:

(if correct type)*(if correct format)*((list price–licensing cost+ad_revenue)*(user likelihood to consume)–(storage cost)).

Based on value metric above, content ID#1001 currently has a negative value metric since the expected benefits no longer offset the storage cost based on the reduced likelihood of consumption. Content ID#1004 has a positive value metric but may still be considered for deleting in exchange for new content if the value metric of the new content is more valuable.

In another embodiment, value metrics are evaluated to make decisions regarding moving content. Moving content may incur and additional communication network cost or may change the user storage cost or user likelihood to consume. FIG. 22 is a table that includes an example of an update to FIG. 20 where the content currently preloaded onto user device 100B is considered for moving to a second storage element according to an embodiment. In this example, content ID#1001 likelihood to be consumed is estimated to drop from 25% to 15% after moving and content ID#1004 likelihood to be consumed has not changed. In this example the additional communication cost is set to zero, because the content will be moved over a free home WiFi. If the value metric for deletion in FIG. 22 is based on:

(if correct type)*(if correct format)*((list price–licensing cost+ad_revenue)*(second user likelihood to consume)–(second storage cost)–(moving cost)).

Based on value metric above, content ID#1001 value metric has dropped because the lower cost of storage does not offset the reduced likelihood or consumption. Content ID#1004 value metric has improved because of reduced storage cost while user likelihood of consumption has remained the same. Based on these value metrics content ID#1001 may remain at the current storage location and content ID#1004 may be moved to the second storage element for best value.

In another embodiment value metrics for moving are evaluated for a user perspective or a user device perspective or a storage element perspective or a content broker perspective or a service provider perspective, etc.

In another embodiment, a user likelihood to consume a content parameter is further based on one or more content currently preloaded at storage elements associated with the user device. In another embodiment, the user likelihood to consume a content parameter is based on one or more content previously consumed by the user.

In another embodiment, the user likelihood to consume a specific content parameter is based on a particular time interval. For an embodiment, the time interval could be an hour, 24 hours, 7 days, etc. One or more likelihoods for a given content could be evaluated simultaneously when selecting content to preload, remove, swap, etc. Managing content based on shorter time intervals likelihoods may increase the value metrics but may also result in more content swapping which may increase communication network costs or reduced battery life for portable or mobile devices. In another embodiment, list price minus licensing costs weighted by user likelihood to or consume over a period of time is an indication of expected profit over a period of time for that user or user device. In another embodiment the ad revenue may be added or the communication network costs may be subtracted.

In another embodiment, the value metric is normalized or scaled by the duration of the content consumption. For an embodiment, all other parameters being comparable, a $0.50 profit for a 5 min. video may be more desirable than a $3 profit for a 2 hour movie or a $5 profit for a game that a user may play for 20 hours.

In another embodiment, the value metric is normalized by the content size. This may be used in addition to storage cost (which could be proportional to content size) or alternatively to storage costs. For an embodiment, all other parameters being comparable a 1 GB game may be preferred over a 10 GB game. In another embodiment, the content size normalization is relative to the available storage size. For an embodiment, the value metric difference between a 10 GB game in a 1 GB is more significant for a device with 16 GB of free storage than a device with 512 GB of free storage.

In another embodiment the content provider or content broker pays a storage owner/manager for access to a subset/partition of storage available to a user. In this case it may be advantageous to compare the value metric relative to the storage cost prior to preloading/moving/deleting. This is especially the case if the content provider is paying per storage utilized. This may not be the case if this content provider has paid for a fixed amount of storage that is currently idling.

In another embodiment, the user likelihood to consume one or more content is updated based on user history. The history could be based on prior sequences of content consumptions. In another embodiment, the user likelihood to consume a content is based on other users history (for example test groups described earlier). In another embodiment, the user likelihood to consume a content is updated based on the other content preloaded on the device (for example in some cases a first content may increase the likelihood a second content may be consumed, in other cases a first content may decrease the likelihood a second content may be consumed).

In another embodiment, one of more of the value metric parameters included in the value metric may change over time. This may result in a change of the value metric or may result in a change in the relative value of a content currently preloaded or to be preloaded on a target storage. Examples of parameters that may change over time our list price, specials, promotions, rebates, user likelihood to consume, etc. or any other parameters. For an embodiment, the user likelihood to consume a particular content may change between the early morning, morning, lunch break, afternoon, evening, etc. In another embodiment, one or more of the value metric parameters included in the value metric may change with the user location or user device location, etc. In another embodiment, one or more of the value parameters included in the value metric may change with the user leisure mode. For example the user may be at work, at a coffee shop having coffee, in a park walking, at an airport, or on vacation, etc. For an embodiment, the ad revenue, the communication network cost, or likelihood to consume may change with user leisure mode.

In another embodiment the list of value metric parameters included in the value metric may change over time. This may result in a change of the value metric or may result in a change in the relative value of individual content currently preloaded or to be preloaded/deleted on a target storage element. In another embodiment a relationship or weight between value metric parameters included in the value metric function may change over time. This may result in a change of the value metric or may result in a change in the relative value of individual content currently preloaded or to be preloaded/deleted on a target device associated to a user.

Value Metrics Associated to a POI

In another embodiment, the content distribution system includes a POI with a POI device. The POI device could be owned by the POI, or a content provider, or a CP Broker, POI service provider, etc. The POI device could be an access point, or a gateway, or a router, or a set top box, etc. The POI device may include storage. The storage associated to the POI device may be located within the POI device or attached to the POI device, for example wired (for example Ethernet) or wirelessly (for example WiFi).

Value metrics associated to a POI are those that include one or more of value metric parameters, value metric parameter relationships, value metric parameter weights, value metric functions of models that are intended to benefit a POI, or from the point of view or perspective of a POI, etc.

In this case the content preloaded onto the storage elements associated with the POI device may be of interest to a group of users within the coverage area of the POI (the group of users could be current or future or past users). For an embodiment, the user likelihood to consume parameter may be exchanged for an expected number of users to consume value metric parameter. For an embodiment, the communication network costs of preloading content onto the storage associated with the POI device may be shared by several users. In another embodiment, the expected number of users to consume value parameter is modified based on a plurality of user (for example number of users, plurality of user profile, plurality of user history, plurality of likelihood to consume for a user, plurality of subscription plans of a user, etc.) within the coverage area of the POI (currently or at a later time). In another embodiment, the expected number of users to consume parameter is modified based on the historical population of users frequenting this POI versus time. In another embodiment, the value metric or value metric parameters are adapted more frequently for a POI. This may be advantageous because parameter values will likely be more dynamic for a group of users that a single user on a single user device. Moreover, the communication network cost of frequent content changes may be amortized over more users.

In at least one embodiment, the POI business owner/manager modifies the value metric parameters or value metric relationships or weights included in the value metric function or model. In another embodiment the POI business owner/manager modifies the content value metric functions to increase the POI business value metrics. For an embodiment a POI that is currently full (for example a coffee shop with no available tables) modifies the value metric function to reduce the value of content that takes a long time to consume or discontinue specials or increase price, etc. For an embodiment, a POI that is almost empty increases the likelihood that current patrons remain at the POI by reducing price of content, offering content specials, biasing the value metric functions to increase the quantity of sticky content that takes longer to consume (for example streaming shows or movies), etc.

In at least one embodiment, the presentation at the user device of content preloaded at storage elements associated to a POI device may be customized to the user device or the user of the user device. For example the POI content may include sports and business news content. In at least one embodiment a user associated to a user device with interest in business news may have a different menu of preloaded content than a user with interest in sports. In another embodiment the presentation of content may include price, specials, etc. that may be customized to one of more of the users or user devices at the POI.

In at least one embodiment one or more parameters associated with a content consumed (could include ads), one or more users or one or more user devices located within the coverage area of POI access network 112 in FIG. 1 are shared with a POI business owner/manager. In at least one embodiment these parameters may be used to enhance POI business value metrics. These business value metrics may be inventory quantity or mix of product offered at the POI, specials, etc.

In at least one embodiment one or more parameters associated with a content consumed, or one or more users or one or more user devices located within the coverage area of POI access network 112 are shared with a content provider (or a POI service provider). This may be used by content provider to refine value metric parameters or value parameters weights/relationships or value parameters included in a value metric for subsequent value metric evaluation for deleting existing content or preloading of new content, etc. In another embodiment the content provider may use this information for refining business rules associated to a content.

In at least one embodiment one or more parameters associated with a content consumed, one or more users or one or more user devices located within the coverage area of POI access network 112 are shared with the content broker. This may be used by content broker to refine value parameters quantities or value parameters weights or value parameters included in value metric functions for subsequent value metric computation for deleting existing content or preloading of new content, etc. In another embodiment this information may be used by content broker to assist content provider.

Value Metric for Multiple Communication Networks

In at least one embodiment a communication network cost (or some other parameter) could be a significant component of a value metric associated to preloading content onto storage or from storage to user devices. This cost to the value metric may be paid by one or more of a user, communication network provider, content provider, content broker, POI owner, etc. This could be more pronounced if the likelihood of consumption is low (for example the communication network cost could be wasted with very large probability) or if the communication cost per byte is high, for example over a cellular or cellular roaming access network. In at least one embodiment more than one communication network may be involved. In at least one embodiment a first communication network assists in preloading a first portion of the content from a source onto a storage element. In at least one embodiment a second communication network assists in preloading a second portion of the content from a source onto a storage element. In at least one embodiment the first portion is significantly larger than the second portion. In at least one embodiment the second portion is a security element that when merged or combined with the first portion enables consumption of the content at a user device. In at least one embodiment the first portion is significantly larger than the second portion and is preloaded onto the storage element over a less costly communication network. In at least one embodiment the first portion is significantly larger than the second portion and is preloaded onto the storage element over a faster communication network. In at least one embodiment a second communication network assists in preloading the content from a first storage element to a second storage element associated to a user device. The second storage element may be located within the enclosure of the user device. In at least one embodiment the communication network cost for assisting in preloading the content from a content source to a storage element associated with a user device is paid by a first party (for example content provider) and the cost of preloading from the storage element to a user device presentation element (for example UI) is paid by a second party (for example user of user device). In another embodiment one or more of the cost of the communication networks described above are included in one or more of value metrics associated to a user, a user device, a content provider, content broker, POI, etc.

In another embodiment a storage element device has access to a modem that could assist in preloading content that could connect to multiple communication networks of the same type (for example WiFi), but may have a different cost structure (for example home WiFi vs. airport pre-pay WiFi). In another embodiment the storage element has access to a multimode modem (for example a multiband 2G/3G) with different cost structure (for example home vs. roaming). In another embodiment the storage element has multiple modems (for example cellular, WiFi, etc.) with different cost structure (for example home vs. roaming).

In another embodiment, a storage element may choose to preloaded content over 2 communication networks each with a cost structure that may change over time or location. It may be advantageous to update the communication network cost parameter as the storage element enters/exits the 2 communication networks. A content of large size may not have a desirable value metric for preloading over a first network, but may be selected for preloading on a second network.

In another embodiment a user device has a modem that could assist in presenting content that could connect to multiple communication networks of the same type (for example WiFi), each with an associated cost structure (for example home WiFi vs. airport pre-pay WiFi). In another embodiment the user device has a multimode modem (for example a multiband 2G/3G) each with a specified value metric cost structure (for example home vs. roaming). In another embodiment the user device has a multiple modem (for example cellular, WiFi, etc.) with multiple cost structure (for example home vs. roaming).

In another embodiment, a user device may have access to preloaded content from associated storage over 2 communication networks with different cost structure at different times or different locations. It may be advantageous to update the communication network cost parameter as the user device enters/exits each of the communication networks. A large size content that may not have a desirable value metric for consuming over a first network may be desirable for consuming on a second network.

A Storage Element Associated to Two or More User Devices

In another embodiment, the content distribution system includes a storage element associated with two or more user devices or two or more users. The storage element could be associated with an access point, or a gateway, or a router, or a set top box, etc. that is communicating with two or more user devices or two or more users. The storage element may be located within or attached to the devices, for example wired (for example Ethernet) or wireless (for example WiFi).

Value metrics for preloading (or deleting or moving) content at a storage element associated with two or more user devices or users may include one or more of value metric parameters, value metric parameter relationships, value metric parameter weights, value metric functions of models that are based on one or more of the user devices or one or more users.

The value metrics may be based on the perspective (or benefit) the storage element (owner/manager), or the one or more users or from the point of view or perspective of service provider, etc.

In this case the content preloaded onto the storage elements may be of interest to a group of users within the communication network neighborhood of the storage (the group of users could be current or future or past users). For an embodiment, the user likelihood to consume parameter may be exchanged for an expected number of users to consume value metric parameter. For an embodiment, the communication network costs of preloading content onto the storage element may be shared by several user devices or users. In another embodiment, the expected number of users to consume value parameter is modified based on a plurality of users (for example number of users, plurality of user profile, plurality of user history, plurality of likelihood to consume for a user, plurality of subscription plans of a user, etc.) within the communication network coverage area of the storage element (currently or at a later time). In another embodiment, the expected number of users to consume parameter is modified based on the historical population of users frequenting the storage communication network footprint versus time. In another embodiment, the value metric or value metric parameters are adapted more frequently for a storage associated to multiple users or user devices. This may be advantageous because parameter values will likely be more dynamic for a group of users that a single user on a single user device. Moreover, the communication network cost of frequent content changes may be amortized over more users.

In at least one embodiment, the storage owner/manager modifies the value metric parameters or value metric relationships or weights included in the value metric function or model.

In at least one embodiment, the presentation at the user device of content preloaded at storage elements associated to a plurality of user devices or users may be customized to the user device or the user of the user device. For example the preloaded content may include sports and business news content. In at least one embodiment a user associated to a user device with interest in business news may have a different menu of preloaded content than a user with interest in sports. In another embodiment the presentation of content may include price, specials, etc. that may be customized to one of more of the users or user devices associated with the storage.

In at least one embodiment one or more parameters associated with a content consumed (could include ads), one or more users or one or more user devices located within the coverage area of storage element communication network are shared with a storage owner/manager.

In at least one embodiment one or more parameters associated with a content consumed, or one or more users or one or more user devices located within the coverage area of the storage element are shared with a service provider or a content provider or a content broker. This may be used by a service provider or a content provider or a content broker to refine value metric parameters or value parameters weights/relationships/models/functions or value parameters included in a value metric for subsequent value metric evaluation for deleting or moving existing content or preloading of new content, etc. In another embodiment the a service provider or a content provider or a content broker may use this information for refining business rules associated to a content.

In at least one embodiment one or more parameters associated with a content consumed, one or more users or one or more user devices located within the coverage area of a storage element are shared with the content broker. This may be used by content broker to refine value parameters quantities or value parameters weights or value parameters included in value metric functions for subsequent value metric computation for deleting existing content or preloading of new content, etc. In another embodiment this information may be used by content broker to assist content provider.

Two or More Storage Elements Associated to a User Device

In another embodiment, a user device may have access to 2 or more storage elements. In a further embodiment the first storage element is located within the user device, and a second storage element is communications network hop away. For an embodiment, a mobile user device may have local storage and access to a secondary storage at the home Gateway when at home. The secondary storage at the Gateway may be larger, with more available storage, lower cost per gigabyte of storage, and likely a fast connection when in coverage area of gateway. In at least one embodiment a value metric of a content may be computed for each of the two storage elements associated to a user device. Based on the value metrics, the content may be stored at neither of the storage devices, one of the storage devices or both storage elements. In one example based on a value metric evaluation, a content may not have a desirable value metric for preloading to the mobile user device local storage, but may have a desirable value metric for preloading onto the Gateway. In another embodiment the value metric is re-evaluated over time and the content may be moved between the two storage elements, copied from one storage element to the other storage element, or deleted from one or both storage elements.

In further embodiment, a user device has access to 3 or more storage elements and a value metric for a content is evaluated for a subset (including the full set) of the 3 or more available storage elements. In another embodiment extensions of principles described for the two storage case are applied.

Two Storage Elements Associated to a User

In another embodiment, a user may have access to content available at 2 storage elements, for example a smartphone storage and a set-top-box storage (for example to display onto a HD TV), or for example a tablet storage and a home Gateway storage (for example to stream from the Gateway onto the tablet), etc. For example, a mobile user device may have local storage and access to a secondary storage at a home reservoir (for example home gateway or set top box) when at home. The secondary storage at the home reservoir may be larger, with more available storage, lower cost per gigabyte of storage, and likely a fast connection when in coverage area of gateway. In at least one embodiment a value metric of a content may be computed for each of the two storage elements associated to a user. Based on the value metrics, the content may be stored at neither of the storage devices, one of the storage devices or both storage elements. In one example based on a value metric evaluation, a content may not have a desirable value metric for preloading to the mobile user device local storage, but may have a desirable value metric for preloading onto the home reservoir. In another embodiment the value metric is re-evaluated over time and the content may be moved between the two storage elements, copied from one storage element to the other storage element, or deleted from one or both storage elements. As the user changes state (location, leisure mode, time of day, etc.) the value metric associated with each of the storage elements may change.

In further embodiment, a user has access to 3 or more storage elements and a value metric for a content is evaluated for a subset (including the full set) of the 3 or more available storage elements. In another embodiment extensions of principles described for the two storage case are applied.

A User Associated to a Plurality of User Devices

In another embodiment, a user operates one or more of a plurality user devices associated to the user. The one or more user devices operated by the user may change over the time of the day or over locations or vs. leisure modes, etc. In this case it may be advantageous for a content provider (or content broker, etc.) to assign value metric parameter associated to value metrics to a subset of the devices associated to the user. User profile inputs or user history of content consumption at each device may be used (vs. time/location/leisure mode/etc.). User interaction with a device at a given time may be also used. A content may be preloaded onto the storage of one, or a subset or all of the plurality of user devices. Different content may be preloaded onto each of the devices or related content. Content may be swapped/moved between the storage of the plurality of user devices. A value metric for a content preloaded onto a plurality of devices associated to a user may be evaluated independently for each device or jointly for the set of devices. A content may be preloaded onto one device associated to a user, but maybe not the other based on value metrics.

Value Metrics Associated to a Content Broker

Value metric parameters, parameter values, weights, relationships, functions, models, state machines, etc., associated to a content broker may vary depending on the content broker embodiment. It is to be understood while several embodiments for value metric associated with a content broker are described, this is not an exhaustive list. Alternative value metrics associated to a content broker may be easily derived based on the embodiments below.

In at least one embodiment, the content broker is compensated by one or more content providers for assistance in the content distribution system. The assistance may include obtaining value metric information, assistance in classifying storage elements for preloading, assistance in selecting valuable content to be preloaded, assistance in preloading valuable content.

In at least one embodiment, the content broker is compensated by a content provider or user based on the number of content units preloaded. In at least one embodiment, the content broker is compensated based on the preloaded content presentation duration. In at least one embodiment, the content broker is compensated based on the preloaded content consumption duration.

In at least one embodiment, the content broker assists a content provider in selecting a content to be preloaded to a storage element. For this embodiment the content broker may receive compensation based on a fraction of a value metric, a percentage of a value metric, a fee, a preloaded content consumption, a user interaction with a preloaded content, etc. for providing this service. In at least one embodiment the value metric is a value metric designed to benefit a content provider. For an embodiment a content broker may assist a content provider in selecting content to be preloaded as summarized in FIG. 19 based on a value metric and receive a fraction of the value metrics generated.

In at least one embodiment, the content broker assists a content provider in preloading a content to a storage element. For this embodiment the content broker may receive a compensation based on a fraction of a value metric, a percentage of a value metric, a fee, a preloaded content consumption, a user interaction with a preloaded content, etc. for providing this service. In at least one embodiment the value metric is a value metric designed to benefit a content provider. For an embodiment a content broker may assist a content provider in preloading content summarized in FIG. 19 based on a value metric and receive a fraction of the value metrics generated.

In at least one embodiment, the content broker assists a content provider in preloading a content to a storage element by obtaining value metric information. For this embodiment the content broker may receive a compensation based on a fraction of a value metric, a percentage of a value metric, a fee, a preloaded content consumption, a user interaction with a preloaded content, etc. for providing this service. In at least one embodiment the value metric is a value metric designed to benefit a content provider. For an embodiment, a content broker may assist a content provider in preloading content summarized in FIG. 19 by obtaining value metric information about the storage, the user devices, the users, the likelihood to consume, etc., for evaluating a value metric and receive a fraction of the value metrics generated.

In at least one embodiment, the content broker assists a content provider in deleting a preloaded content from a storage element by obtaining value metric information. For this embodiment the content broker may receive a compensation based on a fraction of a value metric improvement from deleting the content, a percentage of a value metric, a fee, a preloaded content consumption, a user interaction with a preloaded content, etc. for providing this service. In at least one embodiment the value metric is a value metric designed to benefit a content provider. For an embodiment, a content broker may is a content provider in deleting preloading content summarized in FIG. 21 by obtaining value metric information about the storage, the user devices, the users, the likelihood to consume, etc., for evaluating a value metric and receive a fraction of the value metrics improvements generated.

In at least one embodiment, the content broker assists a content provider in moving a preloaded content from a storage element by obtaining value metric information. For this embodiment the content broker may receive a compensation based on a fraction of a value metric improvement from moving the content, a percentage of a value metric, a fee, a preloaded content consumption, a user interaction with a preloaded content, etc. for providing this service. In at least one embodiment the value metric is a value metric designed to benefit a content provider. For an embodiment, a content broker may assist a content provider in moving preloading content summarized in FIG. 22 by obtaining value metric information about the first and second storage, communication network, the user devices, the users, the likelihood to consume, etc., for evaluating a value metric for a source and destination storage and receive a fraction of the value metrics improvements generated.

In at least one embodiment, a content broker obtains value metric information from a plurality of storage elements, one or more content providers, content associated with the one or more content providers and one or more of a population of users devices, a population of users, communication networks. Based on this information the content broker may evaluate value metrics for preloading content that benefits the content broker.

For an embodiment, a content broker may identify a storage element associated to a user device and user and obtain value metric information of the storage (for example available storage, storage cost, etc.), of the user device (for example hardware and software available, etc.), of the user (for example preference, history, state, etc.). Based on these parameters the content broker may search the content databases of the one or more content providers and select a list of content for preloading onto the storage element. The content broker value metric may take into account specials or rebates from one or more of the content providers for preloading content. The content broker value metric may take into account ad supported or sponsored the content. The content broker value metric may take into account a communication network cost for preloading or consuming the content. The content broker value metric may not take into account a communication network cost for preloading or consuming the content if the user is responsible for communication network cost or if the communication network usage is free. The content broker value metric may take into account storage element cost. The content broker value metric may not take into account a storage element cost if the user is responsible for storage element cost or if the storage element usage is free. The content broker value metric may take into account a user likelihood to consume a content. The user likelihood to consume a content may be based on the interactions (for example consumption, presentation, selection, etc.) of other users with the content. The user likelihood to consume a content may change over time. The user likelihood to consume a content may change based on user state parameters. The content broker value metric information may change over time. For an embodiment, the content broker value metric information may change over time based on changes of content provider offerings, specials, etc. or changes in the user state, or changes in the connectivity between the storage elements in the user devices, etc.

In at least one embodiment, a content broker obtains value metric information from a plurality of storage elements and one or more of a population of users devices, a population of users, communication networks associated with the plurality of storage elements. Based on this information the content broker may evaluate value metrics for preloading content. In an embodiment, based on this information the content broker may classify a subgroup of storage within the plurality of storage associated to a subgroup of one or more user devices, users, communication networks and offer to one or more Content providers. In at least one embodiment classifying may comprise one of more of identifying, segmenting, selecting, clustering, ranking, characterizing. For an embodiment, the classified subgroup or preloading opportunity could be a population satisfying the following {flash storage up to 1 GB, flash storage on a portable device, associated user age group between 20-40 yrs, associate user is soccer fan, communication network cost free 12 hrs/day}. In at least one embodiment the content broker could offer a preloading opportunity to one or more content providers. In at least one embodiment the content providers may bid for the preloading opportunity. In at least one embodiment the content broker accepts the bid if its above a threshold. In at least one embodiment the content broker accepts the largest bid from the one or more content providers. In at least one embodiment the threshold is based on a value metric that benefits the content broker. In at least one embodiment the content broker may set a minimum value for the preloading opportunity. In at least one embodiment the content broker may set a minimum value based on a value metric that benefits the content broker. In at least one embodiment a storage element may be classified into two or more preloading opportunities. In at least one embodiment a storage element may be classified into two or more preloading opportunities simultaneously. For example a storage element may have 2 GB of available storage and 1 GB could be assigned to a first preloading opportunity (for example {flash storage up to 1 GB, flash storage on a portable device, associated user age group between 20-40 yrs, associate user is soccer fan, communication network cost free 12 hrs/day}) and the 1 GB could be assigned to a second preloading opportunity (for example {flash storage up to 1 GB, flash storage on a portable device, associate user likes comedy shows after 8 pm, communication network cost free between 6 pm-8 am}). In at least one embodiment a storage element available storage may be classified into one of a plurality of preloading opportunities. In at least one embodiment the available storage is offered to more than one preloading opportunity population for bidding. In at least one embodiment a preloading opportunity is assigned based on a value metric of a content broker or content provider or a bid from a content provider. For example a storage element with 1 GB of available storage could be offered as {flash storage up to 1 GB, flash storage on a portable device, associated user age group between 20-40 yrs, associate user is soccer fan, communication network cost free 12 hrs/day} or {flash storage up to 1 GB, flash storage on a portable device, associate user likes comedy shows after 8 pm, communication network cost free between 6 pm-8 am}. In at least one embodiment the content broker could obtain the value metric for each of these preloading opportunities. In at least one embodiment the content broker could offer both of these content opportunities to one or more content providers. In at least one embodiment the content broker assigns the content opportunity to the content provider or content with most favorable value metric or the most favorable bid.

In at least one embodiment, a content provider may select an offer for a preloading opportunity. In at least one embodiment, a content provider may select value metric information requirements (or restrictions, or criteria, or recommendations, etc.) that may be used by a content broker for selecting preloading opportunities. In at least one embodiment, a content broker offers preloading opportunities by allowing a content provider to specify desirable properties of the preloading opportunities. In at least one embodiment, a content broker offers preloading opportunities to a content provider assisted by a UI. In at least one embodiment, the content provider may provide restrictions to one or more of user parameters, user device parameters, communication network parameters, associated to the storage element for inclusion in the preloading opportunity offer. In at least one embodiment, a content broker may offer content preloading opportunities through a website or a UI where the content provider may select one or more users parameters (for example demographics, state, history, etc.) associated with the storage element. In at least one embodiment, a content broker may offer content preloading opportunities through a website or a UI where the content provider may select one or more user device parameters (for example HW or SW requirement, display capabilities, etc.) associated with the storage element. In at least one embodiment, a content broker may offer content preloading opportunities through a website or a UI where the content provider may select one or more communication network parameters (for example performance, availability, cost, etc.) associated with the communication network. In at least one embodiment, a content broker obtains value metric information for selecting preloading opportunities prior to the content provider selections. In at least one embodiment, a content broker searches for preloading opportunities based on content provider responses to preloading opportunity offers.

For an embodiment, a content broker identifies a storage element associated to a user device and a user and obtains value metric information of the storage (for example available storage, storage cost, etc.), of the user device (for example hardware and software available, etc.), and of the user (for example preference, history, state, etc.). For a further embodiment, the content broker offers the storage element to one or more content providers for bidding. For a further embodiment, based on the received bids from one or more content providers and the value metric information, the content broker searches the content reservoirs of the one or more content providers and selects a list (or alternatively a queue or rank) of content for each of the one or more content providers for preloading onto the storage element.

For a further embodiment, based on the parameters the content broker searches the content reservoirs of the one or more content providers and selects a list (or alternatively a queue or rank) of content for each of the one or more content providers for preloading onto the storage element and requests a bid.

Value Metrics Jointly Associated to a Plurality of Entities

In addition to value metrics associated to, based on, from the perspective of or favoring a user, a set of users, a POI, a content provider, a content broker, etc., (of which several embodiments have been described above), value metrics could be derived by combining desirable value metrics or value metric parameters into new or joint or multi-valued or vectored value metrics that could benefit two or more user or network entities in the content distribution system simultaneously. For an embodiment, a value metric includes two components. The first component of the value metric vector may be evaluated by a content broker from the perspective of a content provider and the second component of the value metric includes a vector that could be evaluated by the user device from the perspective of a user of the user device. In at least one embodiment, a Content A may be preloaded when VM(Content_A)={VM_1,VM_2} wherein the first component of the value metric VM_1>Threshold1 and the second component of the value metric VM_2>Threshold2. In another embodiment a list of content is generated based on VM_1>(VM_1 of median of content of content provider), that is content that is in the top 50% of value metric based on content provider information. Furthermore a list of content is generated based on VM_2>(VM_2 of 10 percentile or user), that is the content that is in the top 10% from the user perspective. In another embodiment only the content that satisfies both criteria above (top 50% from content provider point of view and top 10% from the user point of view) is preloaded. In at least one embodiment content that satisfies VM_1>Threshold1 is preloaded to a user device, but content that satisfies VM_2<Threshold2 is deleted by the user device. In another embodiment content that satisfies VM_1>Threshold1 is preloaded to a user device, but content that satisfies Threshold2<VM_2<Threshold3 is moved as directed by the user device to a second storage element associated to the user.

Many other embodiments or extensions of example above are possible. In other embodiments any other relationship between VM_1 and VM_2 may be used. The value metric vector may have more than two elements or components. In at least one embodiment a value metric includes an element associated to a content provider, a content broker and a user. In another embodiment a value metric includes an element associated to a content provider, a first user and a second user, both associated to the same storage element (for example husband and wife sharing a set top box). For an embodiment, a target preloaded content list may include all content such that VM(content)={VM1, VM2, VM3}, where VM1 is associated to content provider and VM2 and VM3 are associated to two users of a storage element and VM1>Threshold_A and (VM2+VM3)>Threshold_B. That is the combined value metric for both users should be larger than a threshold. In another embodiment with vectored value metrics, the vector elements are combined into a single joint or combined value for preloading content selections. In at least one embodiment the individual value metric elements are added. In another embodiment a norm of the value metric vector is evaluated (for example norm 1, norm 2, norm infinity, etc.).

Alternatively different entities could evaluate value metrics independently and content could be preloaded (or deleted or moved, etc.) based on each of the value metrics in a sequential or serial or parallel fashion. In at least one embodiment a content broker obtains or computes one or more of the value metric information, parameters, vector elements, etc. from more than one entity and combines or jointly processes the value metric information. In at least one embodiment a content broker obtains a value metric from one entity and shares with a second entity for combines or joint value metric evaluation. In at least one embodiment a content broker obtains a value metric parameter or a value metric for a content (or value metric for a list of content) from a user and shares the value metric/s with a content provider. In at least one embodiment a network entity (for example content broker or content provider or service provider or Cloud server) selects a first content for preloading based on a the network entity value metric and preloads (for example pushes) the content to a storage element while a processor associated with the storage element selects a second content for preloading based on a user value metric and preloads (for example pulls) the second content.

Notification of Preloaded Content

An embodiment includes assisting in presentation of information related to the content to a user device associated with the storage element. For an embodiment, the information is based on communication network parameters between the user device and the storage element, For an embodiment, the presented information is based on user device parameters. The user device parameters can include hardware and/or software capabilities of the user device. For another embodiment, the presented information includes content parameters of the content, such as, for example, cost, format, and/or size of the content.

An embodiment includes notifying a user associated with the storage element that the content has been preloaded.

For an embodiment, information presented at a user device is based on parameters of a user associated with the user device. The user parameters can include user profile, user preferences, user history, user consumption history, user demographics, user state leisure state, user location, user analytics, user real or virtual network, etc. For an embodiment, the presented information is based on parameters of a service provider, content provider, content broker, ad broker, ad provider, etc. In at least one embodiment the presented information is based on value metric information. In at least one embodiment preloaded content information includes value metric information. In at least one embodiment content is sorted based on value metric information, one or more value metric parameters. In at least one embodiment content presentation is sorted based value metric from a user point of view or a content provider point of view or a content broker point of view.

Figure 29:
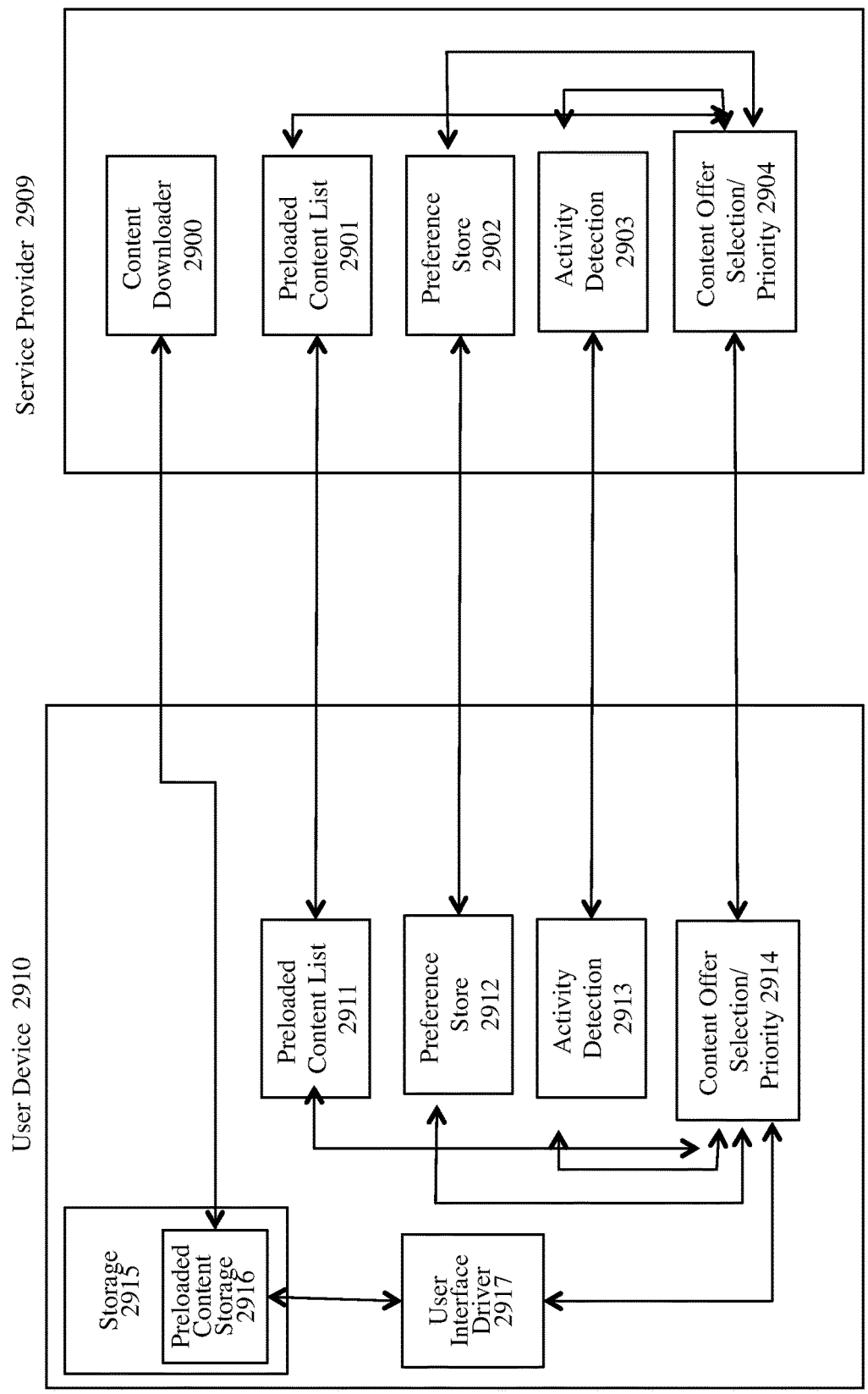
FIG. 29 shows a user device and a service provider to assist in notifying of preloaded content according to an embodiment.

FIG. 29 shows a user device 2910 and a service provider 2909 to assist in notifying of preloaded content according to an embodiment. User device 2910 includes storage 2915 comprising preloaded content storage 2916, a preloaded content list 2911, a preference store 2912, a activity detection 2913, a content offer selection/priority 2914 and user interface driver 2917. User device 2910 may include additional functions or less functions then included in the example embodiment in FIG. 29. Service provider 2909 includes a content downloader 4000, a preloaded content lists 2901, a preference store 2902, a activity detection 2903, a content offer selection/priority 2904. Service provider 2909 may include additional functions or less functions then included in the example embodiment in FIG. 29. In FIG. 29 several functionalities are included in the user device 2910 and the service provider 2909. For each function, the functionality may be present only at user device 2910 or only or service provider 2909 or may operate jointly or maybe replicated at user device 2910 and service provider 2909. For an embodiment, preloaded content list on the user device 2910 may be managed by preloaded content list 2911 or may be managed by preloaded content lists 2901 or may be managed jointly. The preloaded content list 2911 and preloaded content list 2901 functions may exchange information to keep the lists up to date. In at least one embodiment, information associated with content preloaded into preloaded content storage 2916 is presented to one of more users associated with user device 2910 or one or more users associated with storage 2915. Targeted information of preloaded content that is selected/prioritized/ranked correctly may result in increased value to the system. In at least one embodiment, preloaded content list 2911 monitors the content available at preloaded content storage 2916. For an embodiment, preloaded content list 2911 may include name, ID, value parameters such us type, format, size, duration, price, cost, communication network or storage cost, etc. In at least one embodiment, preference store 2912 may include value parameters associated to one or more users associated user device 2910. For an embodiment, value parameters may include a user profile, a user preference, a user history, a user analytics, etc. In at least one embodiment, activity detection 2913 may include the state of the user device 2910 or one or more users associated with user device 2910. The state of the user device 2910 may include powered down, hibernated, sleep mode, active, stationary, moving, location, etc. The state of a user associated to use the device 2910 may include working, shopping, watching TV at night, eating dinner, etc. In at least one embodiment based on information from one or more of preloaded content list 2911 or preloaded content list 2901, preference store 2912 or preference store 2902, activity detection 2913 or activity detection 2903, the function content offer selection/priority 2914 may select a subset of the content items preloaded content storage 2916 to present information to a user of user device 2910. The selected subset of content items to present information of, may be prioritized (or ranked or presented in different formats, etc.) to encourage consumption of more valuable content. In at least one embodiment the priority is based on value metric. In at least one embodiment the information of the selected subset of content items includes a variable cost from one or more of storage cost, communication network cost, content cost, etc. In an embodiment the information of the selected subset of content items includes communication network parameters (speed, latency, QOS, etc.) or storage element parameters. In another embodiment the selection/priority is performed by content offer selection/priority 2904 or shared between content offer selection/priority 2914 in content offer selection/priority 2904.

Figure 30:
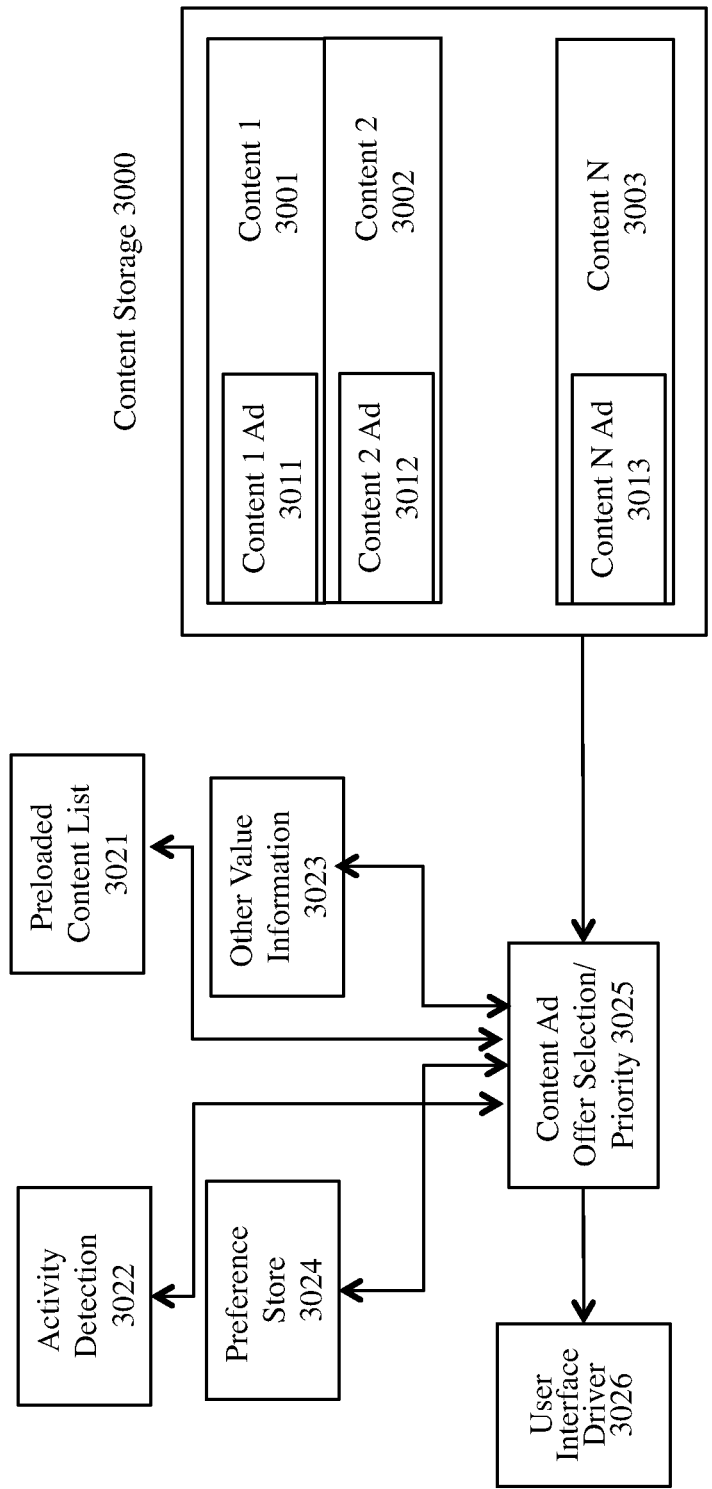
FIG. 30 shows a content storage and content ad offer selection/priority to assist in presenting ads associated with preloaded content according to an embodiment.

FIG. 30 shows a content storage 3000 and content ad offer selection/priority 3025 to assist in presenting ads associated with preloaded content according to an embodiment. Content storage 3000 comprises a plurality of content, including content 1 3001, content 2 3002 and content N 3003. Each content element may have an associated ad to help promote or encourage the consumption of the content. For an embodiment, content 1, 3001 may be associated to content 1 ad, 3011. The function content ad offer selection/priority 3025 may select a subset of content ads to be presented at a user device assisted by user interface driver 3026. The selected subset of content ads to be presented may be prioritized (or ranked, or formatted, etc.). The selection of the subset or the priority may be based on a value metric. The selection of the subset of the priority may be based on one or more of preloaded content list 3021, activity detection 3022, preference store 3024, etc. Preloaded content list 3021, activity detection 3022, preference store 3024 functionality may be included on a device associated to a user (for example a user device or associated storage element) or may be included on a device associated to the network (for example a server associated to a content provider, content broker, service provider, etc.) or the functionality may be shared or jointly processed between one or more devices associated to a user and one or more devices associated to a network.

Access Control

Figure 31:
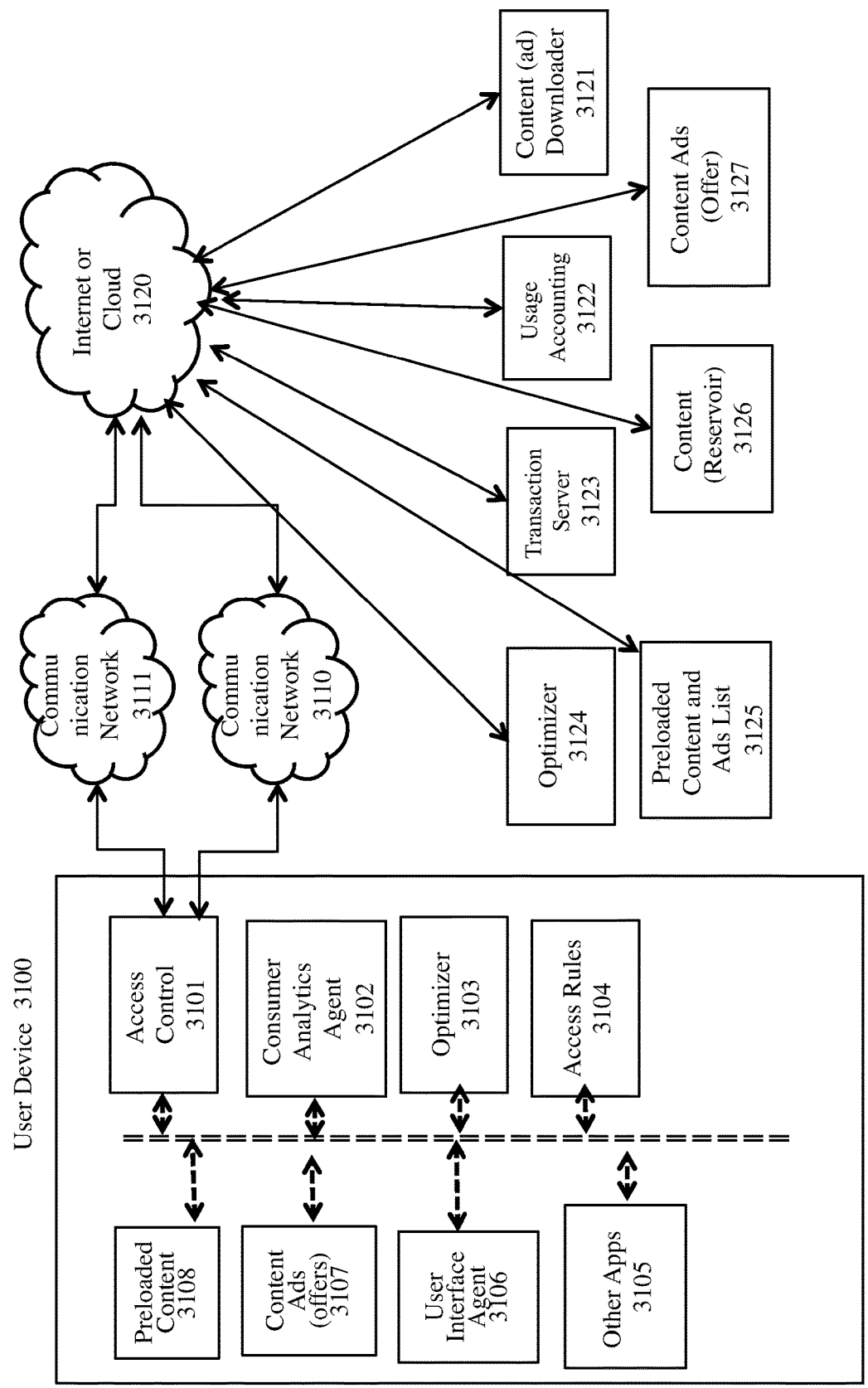
FIG. 31 shows a user device coupled to a content distribution system over two communication networks according to an embodiment.

FIG. 31 shows a user device 3100 coupled to a content distribution system over two communication networks according to an embodiment. While two communication networks 3111, 3110 are shown, it is to be understood that any number of two or more communication networks can be utilized for the described embodiments. In an embodiment, user device 3100 includes one or more of the following functionalities: access control 3101, consumer analytics agent 3102, optimizer 3103, access rules 3104, preloaded content 3108, content ads (or offers) 3107, user interface agent 3106, or other apps 3105. In an embodiment access control 3101 monitors or maintains the status of the communication networks 3111 or 3110, wherein status includes one or more of connectivity, coverage, performance, cost, usage vs. communication network service plan, etc. In an embodiment access control 3101 determines if one or more of the communication network 3111 or communication network 3110 may be utilized. In an embodiment access control 3101 selects one of the communication networks 3111 or 3110 for content distribution system data usage. In an embodiment access control 3101 is included in user device 3100 to offload computational complexity from other entities of the content distribution system. In an embodiment access control 3101 is included in user device 3100 to offload computational complexity from other entities of the content distribution system, such as one or more of content distribution servers, network entities, communication network entities, cloud entities, etc. In an embodiment access control 3101 is included in user device 3100 to improve the privacy to user device 3100 or a user of user device 3100. In an embodiment access control 3101 is included in user device 3100 to improve the privacy to user device 3100 or a user of user device 3100 by reducing the amount of information about the user device 3100 or a user of the user device 3100 with a network entity. In an embodiment access control 3101 is included in user device 3100 to reduce communication overhead of sharing information available at user device 3100 used for selecting a communication network 3111 or 3110 with a network entity. In an embodiment, access control 3101 denies data usage of one or more functions of the content distribution system over one or more communication networks. In an embodiment, consumer analytics agent 3102 monitors or maintains parameters associated with one or more users of the user device 3100 (for example preferences, usage history or predictions, demographics, etc.), parameters associated with the user device 3100 (for example type, HW/SW, etc.). In an embodiment, access rules 3104 comprises one or more of maintain or enforce content preloading rules (for example examining content type or content restrictions), maintain or enforce rules associated to the content consumption, maintain or enforce rules associated to the content ads, or maintain or enforce rules associated with the communication network 3111 or communication network 3110. In an embodiment, preloaded content 3108 is the content preloaded by the content distribution system available at a storage element coupled to the user device 3100. In an embodiment, content ads 3107 includes ads associated to the preloaded content 3108 preloaded by the content distribution system available at a storage element coupled to the user device 3100. In an embodiment content ads 3107 are utilized to entice a user to consume preloaded content 3108. In an embodiment, user interface 3106 is used for one or more of presenting content or content ads or content lists at a UI. In an embodiment the UI facilitates consumption of preloaded content. In an embodiment, other apps 3105 are included at user device 3100. In an embodiment other apps 3105 support the content distribution system, and include one or more of content compressors, decompressors, encryption, decryption, transcoding, etc.

In an embodiment, user device 3100 is connected over communication network 3111 or 3110 to network entity functionality. While the previously described one or more content provider servers are not shown, it is to be understood that that at least some of the embodiments of the one or more content distribution servers include at least a portion of the network entity functionality shown. In an embodiment, the network entity functionality comprises one or more of content (ad) downloader 3121, usage accounting 3122, transaction server 3123, optimizer 3124, preloaded content and ads list 3125, content (reservoir) 3126 or content ads (offers) 3127. In an embodiment one or more of the network entity functionality is performed by a service provider. In an embodiment a service provider is responsible for content downloading. In an embodiment one or more of the network entity functionality is performed by a content provider. In an embodiment a content provider is responsible for maintaining or managing content 3126 or content ads 3127. In an embodiment one or more of the network entity functionality is performed by a content broker. In an embodiment a content broker is responsible for maintaining or managing preloaded content and ads list 3125. In an embodiment a content broker is responsible for optimizer 3124. In an embodiment the network entity functionality is split or shared between two or more of content provider, content broker, service provider or cloud service. In an embodiment content (ad) downloader 3121 assists in downloading content or content ads selected by optimizer 3124 for preloading onto preloaded content 3108 or content ads 3107 of user device 3100. In an embodiment, usage accounting 3122 monitors (wherein monitors may be exchanged for updating or maintaining or billing) one or more of a communication network usage by one or more content distribution functionalities. In an embodiment, usage accounting 3122 monitors communication network data usage of content (ad) downloader 3121 over communication network 3111 or 3110. In an embodiment, usage accounting 3122 monitors communication network data usage by optimizer 3124.

In an embodiment, usage accounting 3122 is performed or assisted by user device 3100. In an embodiment usage accounting 3122 is performed by a content provider or content broker or service provider or cloud service. In an embodiment, usage accounting 3122 is assisted or classified or accounted by a user credential or a user device credential. In an embodiment, usage accounting 3122 is performed on a user device 3100 by identifying data flows associated with a content distribution system. In an embodiment, usage accounting 3122 is performed on a user device 3100 by identifying applications associated with a content distribution system. In an embodiment, usage accounting 3122 is performed on a user device 3100 by identifying network end points associated with a content distribution system. In an embodiment, usage accounting 3122 is performed at the communication network (for example, communication networks 3110, 3111) (for example WWAN) by identifying a data flow associated with a content distribution system and a client credential or user device 3100 credential or user credential. In an embodiment, usage accounting 3122 is performed at the communication network (for example WWAN) by identifying an application associated with a content distribution system and a client credential or user device 3100 credential or user credential. In an embodiment, usage accounting 3122 is performed at the communication network (for example WWAN) by identifying a network end point associated with a content distribution system and a client credential user device 3100 credential or user credential. In an embodiment, usage accounting 3122 is performed at a content distribution system network entity by identifying a device or user or client credential associated with data flows.

In an embodiment transaction server 3123 assists a user to consume a preloaded content item in preloaded content 3108. In an embodiment, transaction server 3123 includes one or more of receiving a request for consumption of a preloaded content item in preloaded content 3108, requesting or receiving an authorization for consumption, requesting or receiving a payment for consumption from user device 3100, requesting or receiving a security certificate, delivering a security key, requesting or receiving a confirmation of payment requesting or receiving an authentication element. In an embodiment content 3126 is a plurality of content (wherein plurality of content is, for example, a reservoir) available for preloading. In an embodiment content ads (wherein content ads, are for example, offers) 3127 comprise a plurality of content ads that may be preloaded onto storage elements associated with user devices (including user device 3100). In an embodiment content ads 3127 encourage (wherein encourage may be substituted for entice or promote) consumption of preloaded content. In an embodiment preloaded content and ads list 3125 includes list of preloaded content or preloaded ads available at storage elements associated with one or more user devices 3100.

In an embodiment optimizer 3124 selects content or content ads from content 3126 or content ads 3127 for preloading onto user device 3100 over one or more communication networks 3110, 3111. In an embodiment optimizer 3124, selects content for preloading onto user device 3100 from content 3126 based on consumer analytics 3102. In an embodiment optimizer 3124, selects content for preloading onto user device 3100 from content 3126 based on a value metric associated with one or more of a user of user device 3100 parameters, user device 3100 parameters, communication network 3111 or 3110 parameters. In an embodiment optimizer 3124 selects content for preloading onto user device 3100 from content 3126 based on content available on preloaded content 3108. In an embodiment optimizer 3124 selects content ads for preloading onto user device 3100 from content ads 3127 based on content available on preloaded content 3108. In an embodiment optimizer 3124 selects content ads for preloading onto user device 3100 from content ads 3127 based on content ads available on preloaded content ads 3107. In an embodiment optimizer 3124 selects content for preloading onto user device 3100 from content 3126 based on preloaded content and ads list 3125. In an embodiment optimizer 3124 selects content for preloading onto user device 3100 from content 3126 based on access rules 3104. In an embodiment, optimizer 3124 prioritizes presentation of information associated to preloaded content 3108. In an embodiment, optimizer 3124 prioritizing presentation of information associated to preloaded content 3108 includes one or more of ranking, sorting, highlighting, formatting, notifying, placement, discovery of preloaded content element information to facilitate a selection of a preloaded content element by a user of user device 3100. In an embodiment, optimizer 3124 prioritizing presentation of information associated to preloaded content 3108 includes updating or adapting or modifying the one or more of ranking, sorting, highlighting, formatting, notifying, placement, discovery of preloaded content information to facilitate a selection of a preloaded content ad element by a user of user device 3100. In an embodiment, optimizer 3124 prioritizing presentation of information associated to preloaded content 3108 includes updating or adapting or modifying the one or more of ranking, sorting, highlighting, formatting, notifying, placement, discovery of preloaded content element information to facilitate a selection of a preloaded content element by a user of user device 3100 based on changes in value metric information (for example changes in parameters associated with a user, user device, or communication networks, etc.).

In an embodiment, optimizer 3124 prioritizing presentation of information associated to preloaded content 3108 includes presentation of information associated to preloaded content ads 3107. In an embodiment, optimizer 3124 prioritizing presentation of information associated to preloaded content 3108 includes presentation of preloaded content ads 3107. In an embodiment, optimizer 3124 prioritizing presentation of information associated to preloaded content 3108 includes one or more of ranking, sorting, highlighting, formatting, notifying, placement, discovery of preloaded content ad element information to facilitate a selection of a preloaded content ad element by a user of user device 3100. In an embodiment, optimizer 3124 prioritizing presentation of information associated to preloaded content 3108 includes updating or adapting or modifying the one or more of ranking, sorting, highlighting, formatting, notifying, placement, discovery of preloaded content ad element information to facilitate a selection of a preloaded content ad element by a user of user device 3100. In an embodiment, optimizer 3124 prioritizing presentation of information associated to preloaded content 3108 includes updating or adapting or modifying the one or more of ranking, sorting, highlighting, formatting, notifying, placement, discovery of preloaded content ad element information to facilitate a selection of a preloaded content ad element by a user of user device 3100 based on changes in value metric information (for example changes in parameters associated with a user, user device, communication networks, etc.).

In an embodiment optimizer 3103 selects content or content ads from content 3126 or content ads 3127 for preloading onto user device 3100 over one or more communication networks 3110, 3111. In an embodiment optimizer 3103, selects content for preloading onto user device 3100 from content 3126 based on consumer analytics 3102. In an embodiment optimizer 3103, selects content for preloading onto user device 3100 from content 3126 based on a value metric associated with one or more of a user of user device 3100 parameters, user device 3100 parameters, communication network 3111 or 3110 parameters. In an embodiment optimizer 3103 selects content for preloading onto user device 3100 from content 3126 based on content available on preloaded content 3108. In an embodiment optimizer 3103 selects content ads for preloading onto user device 3100 from content ads 3127 based on content available on preloaded content 3108. In an embodiment optimizer 3103 selects content ads for preloading onto user device 3100 from content ads 3127 based on content ads available on preloaded content ads 3107. In an embodiment optimizer 3103 selects content for preloading onto user device 3100 from content 3126 based on preloaded content and ads list 3125. In an embodiment optimizer 3103 selects content for preloading onto user device 3100 from content 3126 based on access rules 3104. In an embodiment, optimizer 3103 prioritizes presentation of information associated to preloaded content 3108. In an embodiment, optimizer 3103 prioritizing presentation of information associated to preloaded content 3108 includes one or more of ranking, sorting, highlighting, formatting, notifying, placement, discovery of preloaded content element information to facilitate a selection of a preloaded content element by a user of user device 3100. In an embodiment, optimizer 3103 prioritizing presentation of information associated to preloaded content 3108 includes presentation of information associated to preloaded content ads 3107. In an embodiment, optimizer 3103 prioritizing presentation of information associated to preloaded content 3108 includes presentation of preloaded content ads 3107. In an embodiment, optimizer 3103 prioritizing presentation of information associated to preloaded content 3108 includes one or more of ranking, sorting, highlighting, formatting, notifying, placement, discovery of preloaded content ad element information to facilitate a selection of a preloaded content ad element by a user of user device 3100.

In an embodiment, optimizer 3124 functionality described above may be performed at optimizer 3103. In an embodiment, optimizer 3124 and optimizer 3103 functionality described above is shared or performed jointly between optimizer 3124 and optimizer 3103.

In an embodiment, one or more of content (ad) downloader 3121, usage accounting 3122, transaction server 3123, optimizer 3124, preloaded content and ads list 3125, content 3126, content ads 3127 communication or session data exchanges with user device 3100 over the one or more communication networks 3111 or 3110 are over a secure link. In an embodiment, one or more of content (ad) downloader 3121, usage accounting 3122, transaction server 3123, optimizer 3124, preloaded content and ads list 3125, content 3126, content ads 3127 communication or session data exchanges with user device 3100 over the one or more communication networks 3111 or 3110 are over a secure link based on a user device 3100 credential. In an embodiment, one or more of content (ad) downloader 3121, usage accounting 3122, transaction server 3123, optimizer 3124, preloaded content and ads list 3125, content 3126, content ads 3127 communication or session data exchanges with user device 3100 over the one or more communication networks 3111 or 3110 are over a secure link based on a user device 3100 credential associated with a data flow. In an embodiment, one or more of content (ad) downloader 3121, usage accounting 3122, transaction server 3123, optimizer 3124, preloaded content and ads list 3125, content 3126, content ads 3127 communication or session data exchanges with user device 3100 over the one or more communication networks 3111 or 3110 are over a secure link based on a user device 3100 user credential. In an embodiment, one or more of content (ad) downloader 3121, usage accounting 3122, transaction server 3123, optimizer 3124, preloaded content and ads list 3125, content 3126, content ads 3127 communication or session data exchanges with user device 3100 over the one or more communication networks 3111 or 3110 are over a secure link based on a user device 3100 client credential.

In an embodiment communication network 3111 is a WWAN (wireless wide area network). In and embodiment the WWAN communication network is one or more of a cellular, 2G, 3G, 4G, WiMax, etc. access network. In an embodiment communication network 3110 is a LAN or PAN. In an embodiment the LAN or PAN communication network 3110 is one or more of Ethernet, WLAN, WiFi, Bluetooth, etc. In an embodiment, LAN or PAN communication network 3110 is a home WiFi or POI WiFi or work WiFi. In an embodiment LAN or PAN communication network and is further connected to the content distribution system network entities over a broadband communication network. In an embodiment the broadband communication network is one of more of xDSL, Cable Modem, T1/E1, Fiber, etc.

In an embodiment WWAN communication network 3111 data usage cost parameter is higher than LAN or PAN communication network 3110 data usage cost parameter. In an embodiment, access control 3101 controls one or more content distribution functionality data usage based on network type or network capacity or network changes or network cost. In an embodiment, a subset of content distribution functionality communication network usage is restricted to a subset of the available communication networks 3110, 3111. In an embodiment preloading content with data size above a threshold is permitted over a LAN or PAN communication network 3110 and are not permitted over a WWAN communication network 3111. In an embodiment, preloading content ads (or offers) with data size below a threshold is permitted over WWAN communication network 3111. In an embodiment, preloading content ads (or offers) with value metric exceeding a threshold is permitted over WWAN communication network 3111. In an embodiment data session usage exchanges between a user device 3100 and one or more of usage accounting 3122, optimizer 3124, preloaded content or ads list 3125 are permitted over WWAN communication network 3111. In an embodiment, transaction server 3123 data session usage exchanges with a user device 3100 are permitted or prioritized over other transactions to facilitate preloaded content purchase or consumption. In an embodiment, access control 3101 specifically prevents or specifically allows each content distribution system communication session functionality over one or more communication network 3110, 3111 based on network type, capacity or cost. In an embodiment content distribution system control information data usage (consumption transactions, usage accounting, user account info, user preferences, authentication, authorization, billing) is allowed over all available communication networks 3110, 3111. In an embodiment content distribution system content preloading is allowed over a subset of available communication networks 3110, 3111. In an embodiment the subset of communication networks 3110, 3111 for preloading are free (or free per use—for example a flat monthly fee without a cost per usage) communication networks 3110, 3111.

Figure 32:
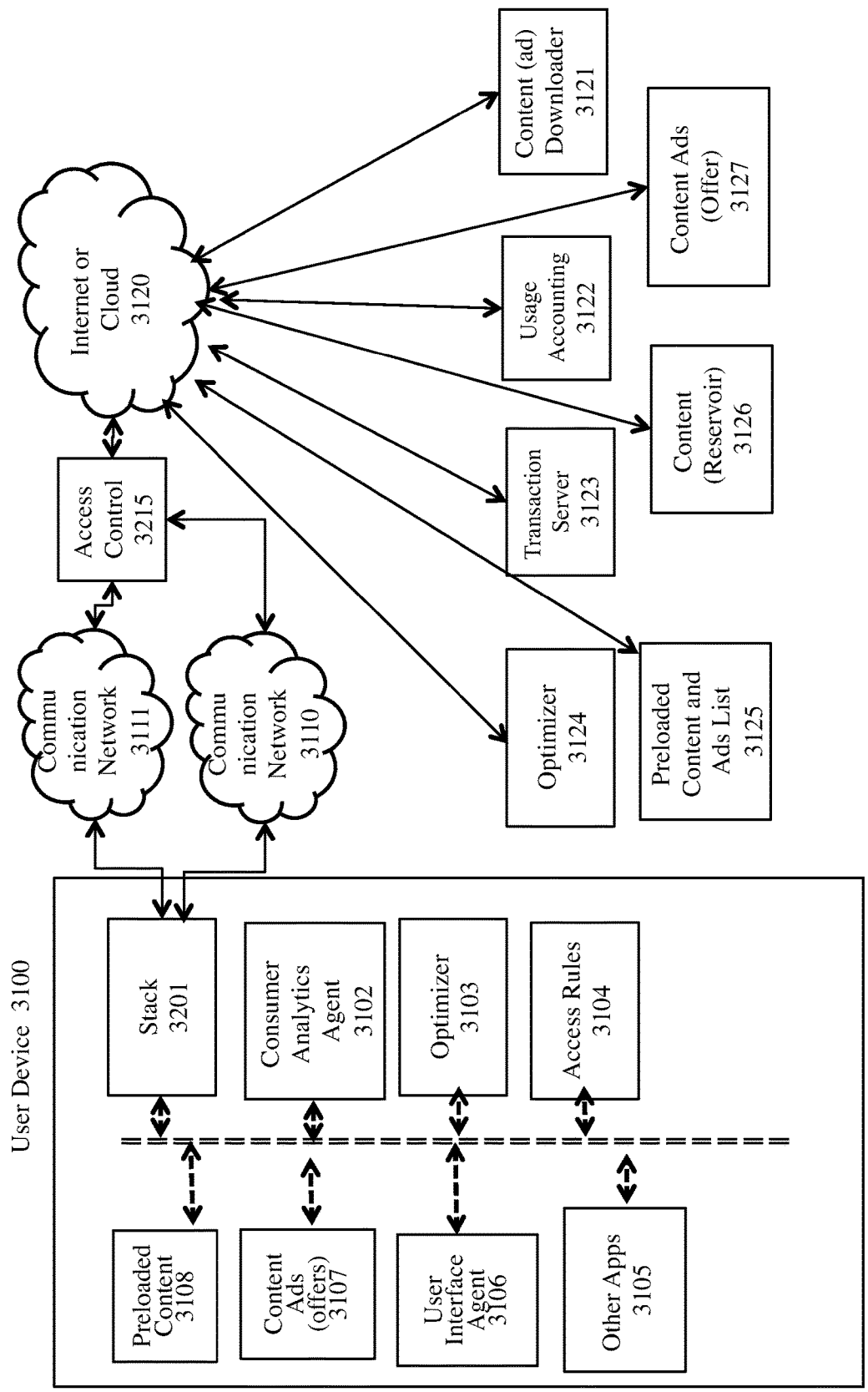
FIG. 32 shows a user device coupled to a content distribution system over two communication networks according to an embodiment.

FIG. 32 shows a user device 3100 coupled to a content distribution system over two communication networks according to an embodiment. In an embodiment, the user device 3100 comprises stack 3201. In an embodiment stack 3201 exchanges data with a content distribution system over one or more communication networks 3111 or 3110 without selecting or restricting data usage over the one or more communication networks 3111 or 3110.

In the embodiment of FIG. 32, access control 3215 is in-line with the content distribution system data exchanges, but is not included within user device 3100 functionality.

In an embodiment, access control 3215 functionality is included at a network entity. In an embodiment access control 3215 is included in a network entity to offload computational complexity from a user device 3100. In an embodiment access control 3215 is included in a network entity to offload computational complexity from other entities of the content distribution system. In an embodiment access control 3215 is included in a network entity in-line with the content distribution system data transmission to offload computational complexity from a plurality of entities of the content distribution system. In an embodiment access control 3215 is included in a network entity to improve the privacy or security of information available at one or more network entities from a user device 3100 or a user of user device 3100. In an embodiment access control 3215 is included in a network entity to reduce communication overhead of sharing information available at one or more network entities used for selecting a communication network 3111 or 3110, with user device 3100.

In an embodiment, access control 3215 functionality is included at one or more of content broker, content provider, service provider, cloud service. In an embodiment access control 3215 is included in a content broker or cloud service to offload computational complexity from one of more of a user device 3100, content provider or service provider. In an embodiment access control 3215 is included in a content broker or cloud service to improve the privacy or security of information related to user device 3100 or a user associated with user device 3100. In an embodiment access control 3215 is included in a content broker or cloud service to improve the privacy or security of information related to user device 3100 or a user associated with user device 3100 by not sharing sensitive information with a plurality of content providers or service providers.

In an embodiment, access control 3215 includes one or more of the functionality in embodiments described for access control 3101.

Figure 33:
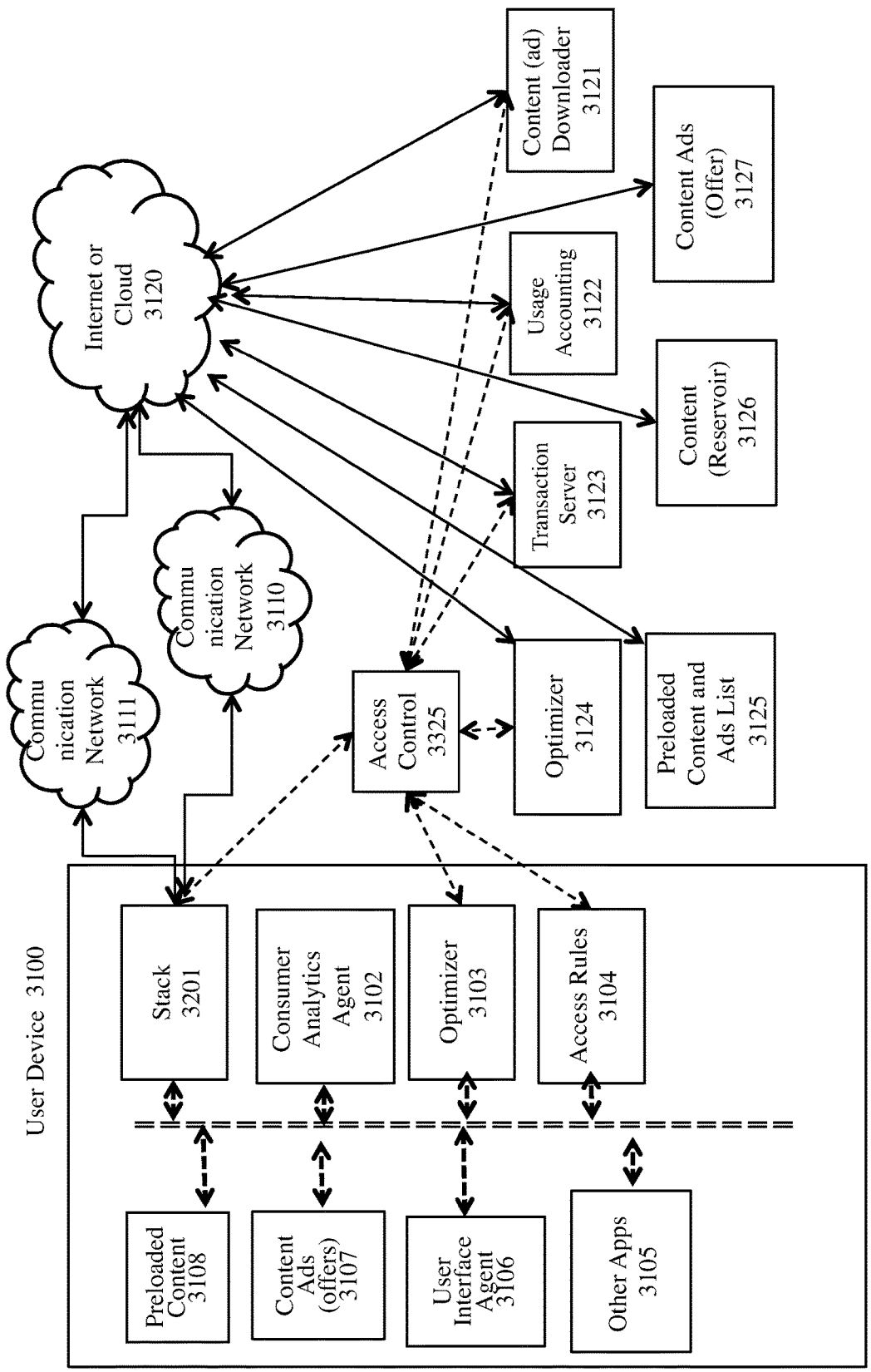
FIG. 33 shows a user device coupled to a content distribution system over two communication networks according to an embodiment.

FIG. 33 shows a user device 3100 coupled to a content distribution system over two communication networks according to an embodiment. In an embodiment, the user device 3100 comprises stack 3201. In an embodiment stack 3201 exchanges data with a content distribution system over one or more communication networks 3111 or 3110 without selecting or restricting data usage over the one or more communication networks 3111 or 3110.

In the embodiment of FIG. 33, access control 3325 is off-line with the content distribution system data exchanges. In an embodiment access control 3325 obtains information associated with the content distribution system from one or more user entities or network entities to select usage of communication network 3111 or 3110 for content distribution system data exchanges. In an embodiment access control 3325 grants or allows or recommends or restricts content distribution system data usage between one or more user entities and one or more network entities to select usage of communication network 3111 or 3110 for content distribution system data exchanges. In an embodiment access control 3325 grants or allows or recommends or restricts content distribution system data usage by one or more user entities to select usage of communication network 3111 or 3110 for content distribution system data exchanges. In an embodiment access control 3325 grants or allows or recommends or restricts content distribution system data usage by one or more network entities to select usage of communication network 3111 or 3110 for content distribution system data exchanges.

In an embodiment, access control 3325 enables secure data exchanges between or more content distribution system user entities (for example user device 3100 stack 3201) and one or more content distribution system network entities (for example content (ad) downloader or transaction server 3123). In an embodiment, access control 3325 enables secure data exchanges between or more content distribution system user entities (for example user device 3100 stack 3201) and one or more content distribution system network entities (for example content (ad) downloader or transaction server 3123) since access control 3325 does not need to identify one or more content distribution data exchanges. In an embodiment, access control 3325 enables secure data exchanges between or more content distribution system user entities (for example user device 3100 stack 3201) and one or more content distribution system network entities (for example content (ad) downloader or transaction server 3123) since access control 3325 does not need to perform deep packet inspection (DPI) or identify flows of one or more content distribution data exchanges. In an embodiment access control 3325 is off-line with content distribution system data exchanges to offload computational complexity from other entities of the content distribution system (for example by avoiding data flow identification, DPI, etc.). In an embodiment access control 3325 is off-line with the content distribution system data transmission to offload computational complexity from a plurality of entities of the content distribution system. In an embodiment access control 3325 is off-line to improve the privacy or security of information available at one or more network entities from a user device 3100 or a user of user device 3100. In an embodiment access control 3325 is off-line to reduce communication overhead of sharing information available at one or more network entities used for selecting a communication network 3111 or 3110, with user device 3100.

In an embodiment at least part of access control 3325 functionality is included in user device 3100. In an embodiment, at least part of access control 3325 functionality is included at a network entity. In an embodiment, access control 3325 functionality is included at one or more of content broker, content provider, service provider, cloud service. In an embodiment, access control 3325 includes one or more of the functionality in embodiments described for access control 3101. In an embodiment, access control 3325 obtains information associated to communication network 3111 or 3110 status. In an embodiment, access control 3325 obtains information associated to communication network 3111 or 3110 status comprising one or more of communication network availability, coverage, performance, cost, etc. In an embodiment, access control 3325 obtains information associated to communication network 3111 or 3110 status from stack 3201. In an embodiment, access control 3325 obtains information associated to access rules 3104. In an embodiment, access control 3325 obtains information associated to access rules from a network entity. In an embodiment, access control 3325 obtains information from optimizer 3103 or optimizer 3124. In an embodiment, access control 3325 obtains information from optimizer 3103 or optimizer 3124 comprising one or more of classified, prioritized, ranked or sorted content queues or content ad queues for preloading onto user device 3100. In an embodiment access control 3325 grants or restricts access to communication networks 3111 or 3110 to one or more of content (ad) downloader 3121, optimizer 3124, transaction server 3123, usage accounting 3122, preloaded content and content ads list 3125. In an embodiment access control 3325 grants or restricts access to communication networks 3111 or 3110 based on one or more of user parameters, user device 3100 parameters, communication network parameters 3111 or 3110, content parameters, network entity parameters, network entity sponsoring services, network entity sponsoring services associated to a user or user device account. In an embodiment access control 3325 grants or restricts access to communication networks 3111 or 3110 based on value metric.

Service Plans

An embodiment includes obtaining, by the service provider, a permission before preloading the at least a portion of the content, and compensating, by the service provider, an entity with financial ownership of the storage element.

Another embodiment includes receiving, by the service provider, a permission before preloading the at least a portion of the content, and receiving compensation, from a user of the content, for consumption of the content preloaded on the storage element or the service of preloading content to the storage element.

In an embodiment a user device is a mobile device and is capable of connecting to a wireless wide area communication network (for example cellular, 2G, 3G, 4G, etc.) and a local area communication network (for example a home WiFi, POI WiFi, or Bluetooth, etc.).

In an embodiment a network entity preloading management service (for example a cloud preloading service by a content broker or content provider, etc.) determines a refreshed user preference information, wherein refreshed user preference information includes obtaining user preference information and updating the user preference information. In an embodiment, the updating may performed periodically (for example at a predetermined time intervals) or may be performed by a polling function from the management service (for example when HW or SW resources of the management service are available) or may be performed based on interrupts generated by an triggering event (for example a user device being powered up, a user logging into the user device, the user device entering the coverage area of a communication network, etc.). In an embodiment user preference information comprises user parameters (for example desired content type, demographics, location, users' device type, likelihoods, association with other users, etc.).

In an embodiment the preloading management service determines refreshed content preloading priority information, wherein refreshed content preloading priority information includes obtaining content preloading priority information and updating the content preloading priority information. In an embodiment the content preloading priority information includes one or more of content parameters (for example type, format, etc.), content business rules (for example metadata for inserting ads, number of views, limited consumption period, etc.), information associated with a content provider managing the content (for example bidding or offer parameters between preloading management service and content provider, etc.). In an embodiment the refreshed user preference information or the refreshed content preloading priority information are user do create a preloading refresh list of content (wherein the list may comprise a queue or a sort or a rank or a group, etc.). In an embodiment the refresh list is generated. In an embodiment the refresh list is updated. In an embodiment the refresh list is updated based on refreshed user information or refreshed content priority information until the refreshed list of content is preloaded. In an embodiment the refreshed list of content comprises preloaded content to be added to other content available at a storage device. In an embodiment the refreshed list of content comprises preloaded content to be deleted from content available at a storage device. In an embodiment, the refreshed user preference information or refreshed content priority information is used for a user device content discovery priority function (for example a device agent or app, or content information presentation function, etc.) for defining an aspect of how content is to be prioritized in on-device content usage/purchase offers.

In an embodiment an intermediate storage element (for example a storage reservoir at a home gateway, set top box, POI storage, etc.) is connected to a local area communication network (WLAN, LAN, PAN, etc.) and wide area communication network (for example a broadband DSL, Cable Modem, fiber to the home, T1/E1, backhaul, etc.). In an embodiment the intermediate storage element trickle charges valuable user content as determined by the network entity preloading management service. In an embodiment, valuable content includes one or more of content likely to be consumed or purchased by one or more users or high profit margin, or low cost.

In an embodiment the intermediate storage element is configured to receive refreshed prioritization of device preloaded content from the network entity preloading service that determines lists of content to remove and lists of content to add.

In an embodiment the intermediate storage element preloads (or deletes) content onto one or more user devices based on refreshed prioritization content. In an embodiment the intermediate storage element refreshes (for example preloads or deletes) content onto the one or more storage associated to user devices (for example the storage coupled to the user device) when the one or more user devices are connected to a shared local area communication network.

In an embodiment user preference information is collected from the mobile user device and sent to a networking entity service (for example a cloud service) while the mobile device is connected to a wide area communication network. In an embodiment the mobile user device is not connected to the local area communication network but is connected to the mobile network when the user preference information is obtained and sent to the network entity (for example cloud cache management service)

In an embodiment a networking entity service determines the refreshed content preloading priority (for example ranks or sorts the list or queue of content). In an embodiment the networking entity starts the trickle charge process for refreshing the intermediate storage element before the device connects to the local area communication network. In an embodiment a portion of the refreshed preloaded content is available when the mobile user device connects to the local area communication network. In an embodiment the portion of the refreshed preloaded content or discovery priorities are available for fast presentation or consumption at the mobile user device. In an embodiment the local area communication network has higher performance than the wide area communication network couple to the intermediate storage element and enables presentation or consumption or preloading onto mobile device couple storage of one of more of the preloaded content. In an embodiment the content consumption from the intermediate storage element or preloading from the intermediate storage element onto storage closer or coupled to the user device is not limited by intermediate storage reservoir wide area communication network performance (for example bandwidth).

In an embodiment a user device is a mobile device and is capable of connecting to a wireless wide area communication network (for example cellular, 2G, 3G, 4G, etc.) and a local area communication network (for example a home WiFi, POI WiFi, or Bluetooth, etc.).

In an embodiment a network entity preloading management service (for example a cloud preloading management service) determines an initial preload content list comprising content to be preloaded onto storage associated (for example near or coupled or attached or included) to the mobile device. In an embodiment the preloading management service assists (for example initiates or causes or pushes) content on the preload content list to be preloaded onto storage associated the device.

In an embodiment the network entity preloading management system determines a user device discovery content offer priority list. In an embodiment the offer priority list may include one or more of a value metric based sorting or ranking or a user preference based sorting or ranking. In an embodiment the offer priority is based on constraints on one or more of one or more users, the user device, the content parameters, business rules on the content. In an embodiment the priority list highlights on the mobile device (for example on UI) offers to consume. In an embodiment the priority list highlights preloaded content for consumption or use or purchase that is determined to be high priority content. In an embodiment high priority content is based on a value metric associated to one or more of a content provider, content broker, or user. In an embodiment the high priority content is a subset of the available preloaded content on the device and is the content determined by one or more of user preferences, expected consumption statistics, expected economic return or content consumption/advertising incentives. In an embodiment an initial on-device discovery content offer priority list is sent to the to the user device for presentation (for example display on UI) of offers to a user. In an embodiment the preloaded content presentation (for example location, font, format, order of presentation of content list on UI) is in accordance with priority list.

In an embodiment, the network entity preloading management service collects additional user preference information (for example periodically, or based on events triggers) from the user device. In an embodiment the user preference information is obtained while connected to the wide area communication network and is used to determine refreshed or updated high priority content. In an embodiment the refreshed priority content is a subset of the available preloaded content on the user device. In an embodiment the refreshed priority content is determined by a refresh of one or more of user preferences, expected consumption statistics, expected economic return or content consumption/advertising incentives.

In an embodiment, the network entity communicates refreshed user device discovery UI content offer priority list to the device to re-arrange the priority of UI display offers to user in accordance with priority list.

Security

In at least one embodiment, a preloaded content is stored at a storage element in a protected format. In at least one embodiment, a preloaded content comprises a portion of a content. In at least one embodiment, a preloaded content is protected to prevent a user from consuming the content. In at least one embodiment, a preloaded content is protected to prevent a user from sharing the content. In at least one embodiment, a protected preloaded content may be consumed or shared following an approval or authorization. In at least one embodiment the approval or authorization is obtained from a network entity (for example content provider, content broker, etc.). In at least one embodiment the preloaded content is encrypted. In at least one embodiment the preloaded content comprises a digital watermark. In at least one embodiment, the preloaded content comprises a signature associated to a storage element or a user device or a user. In at least one embodiment, the preloaded content signature may be used to identify an unauthorized copy of the content. In at least one embodiment, the user entity requires a certificate from a network entity prior to consumption of the content. In at least one embodiment, a first portion of the content is preloaded in a second portion of the content is preloaded or downloaded after the approval or authorization or payment. In at least one embodiment, the second portion is a small portion of the preloaded content data usage. In at least one embodiment, the storage manager or content manager at a network entity or user entity manages security functionality. In at least one embodiment, a device agent at a user entity authenticates and authorizes the user entity to consume a content. In at least one embodiment, a network entity monitors user entity security agents to ensure they have not been tampered.

Variable Pricing

For at least some embodiments, a cost for consuming the content is based on a value metric cost parameter associated with the storage element or a communication network.

In at least one embodiment, the cost to the user (or price offered by service provider) or consumer for a preloaded content could include storage or communication network costs. In at least one embodiment the cost or price of a content offered to a user or consumer will vary depending on the storage element or communication network resources utilized.

Carrying content from a content source to a user device for presentation may utilize one or more communication networks. Each of these one or more communication networks may incur a cost for carrying the content. Moreover, a communication network may be busy or idle at a given time and the cost of carrying the content may depend on how busy the communication network is. In another embodiment carrying content from a content source to a user device may have more than one choice of communication networks to reach the user device. In at least one embodiment, the cost or price or value, etc. of the content comprises a cost associated with one or more communication networks utilized for carrying the content from a content source to a user device for consumption.

Figure 24:
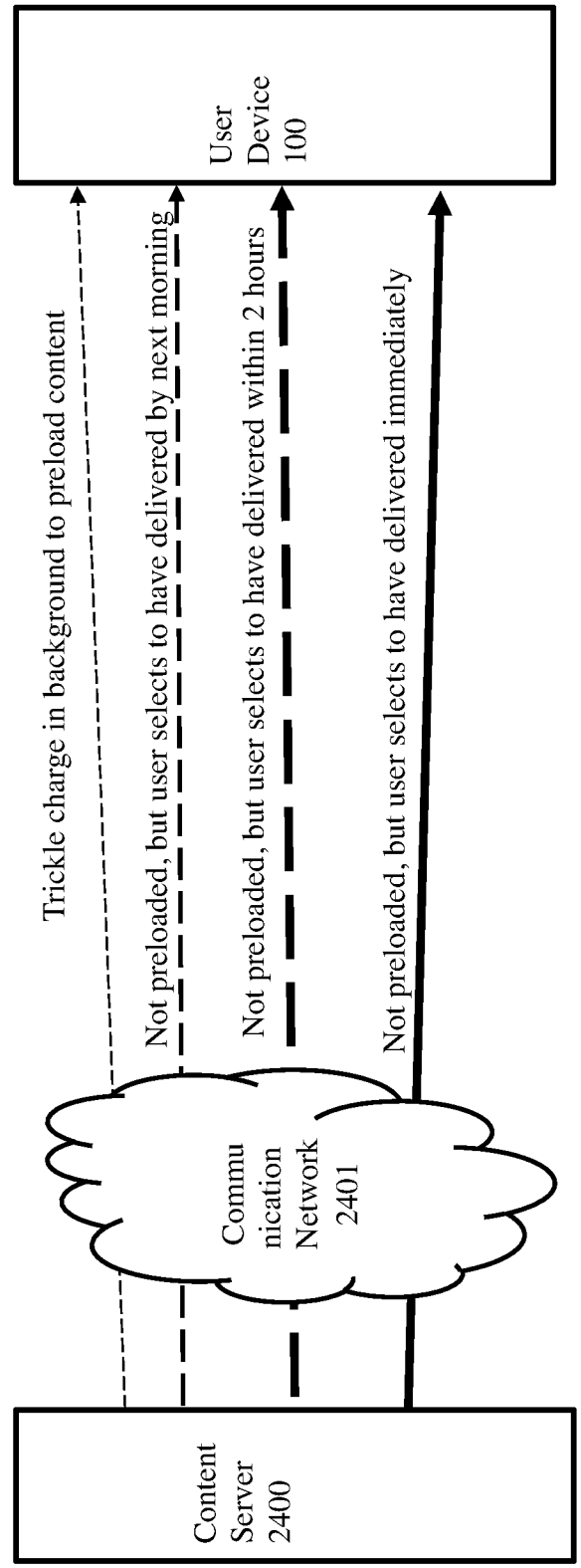
FIG. 24 illustrates 4 different options to utilize a given communication network that may result in variable cost of content presented to a user device according to an embodiment.

FIG. 24 illustrates 4 different options to utilize a given communication network that may result on variable cost (wherein cost may be substituted for price, value, etc.) of content presented to a user device according to an embodiment. In this embodiment a content may be carried from content server 2400 to user device 100 over the same communication network over different timelines or delay, etc. For an embodiment, the topmost option preloads the content in the background without a time limit restriction. This may result in efficient use of the communication network (for example utilizing the communication network during off peak hours). For an embodiment, the second option, does not preload the content, but the user selects to have the content delivered by the next morning. This option, may allow the communication network to preload the content in a more efficient way, for example utilizing bandwidth during intervals of lower utilization. This option may also allow the content to be preloaded with a lower class of QoS (for example best effort). For an embodiment, the 3rd option does not preload the content but the user selects to have the content delivered within 2 hours. This option has a shorter time line for content loading but still allows the communication network to load the content even if the speed of the connection is fluctuating, or lower rate than required for a real-time content presentation. For an embodiment, the 4th option the content is delivered immediately. This option will be the most stressful on the communication network. In at least one embodiment the price offered to a user for consuming a content is associated with communication network utilization options.

Figure 25:
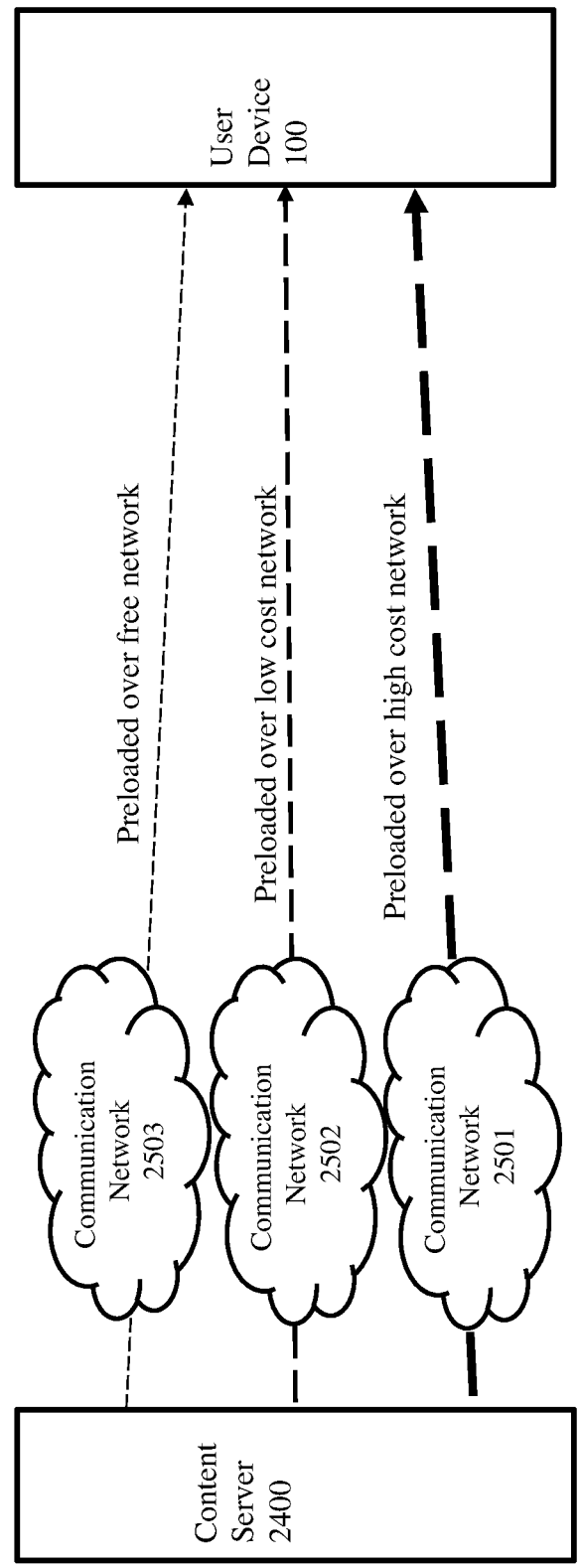
FIG. 25 illustrates 3 different options to preload the content from a content server to a user device over three different communication networks according to an embodiment.

FIG. 25 illustrates 3 different options to preload the content from a content server 2400 to a user device 100 over three different communication networks according to an embodiment. For an embodiment, communication network 2503 may be a free network (for example home WiFi). For an embodiment, communication network 2502 may be a low-cost network, such as a wired broadband connection to a home. For an embodiment, communication network 2501 may be a high cost network, such as a home or roaming cellular network. In at least one embodiment, the cost or price or value, etc. of the content comprises a cost associated with communication network utilized for carrying the content from a content source to a user device for consumption.

Carrying content from a content source to a user device for presentation may utilize one or more storage elements. Each of these one or more storage elements may incur a cost for storing the content. Moreover, a storage element may be empty or full at a given time and the cost of storing the content may depend on the free or available storage in the storage element. In another embodiment carrying content from a content source to a user device may have more than one choice of storage elements to reach the user device.

Figure 26:
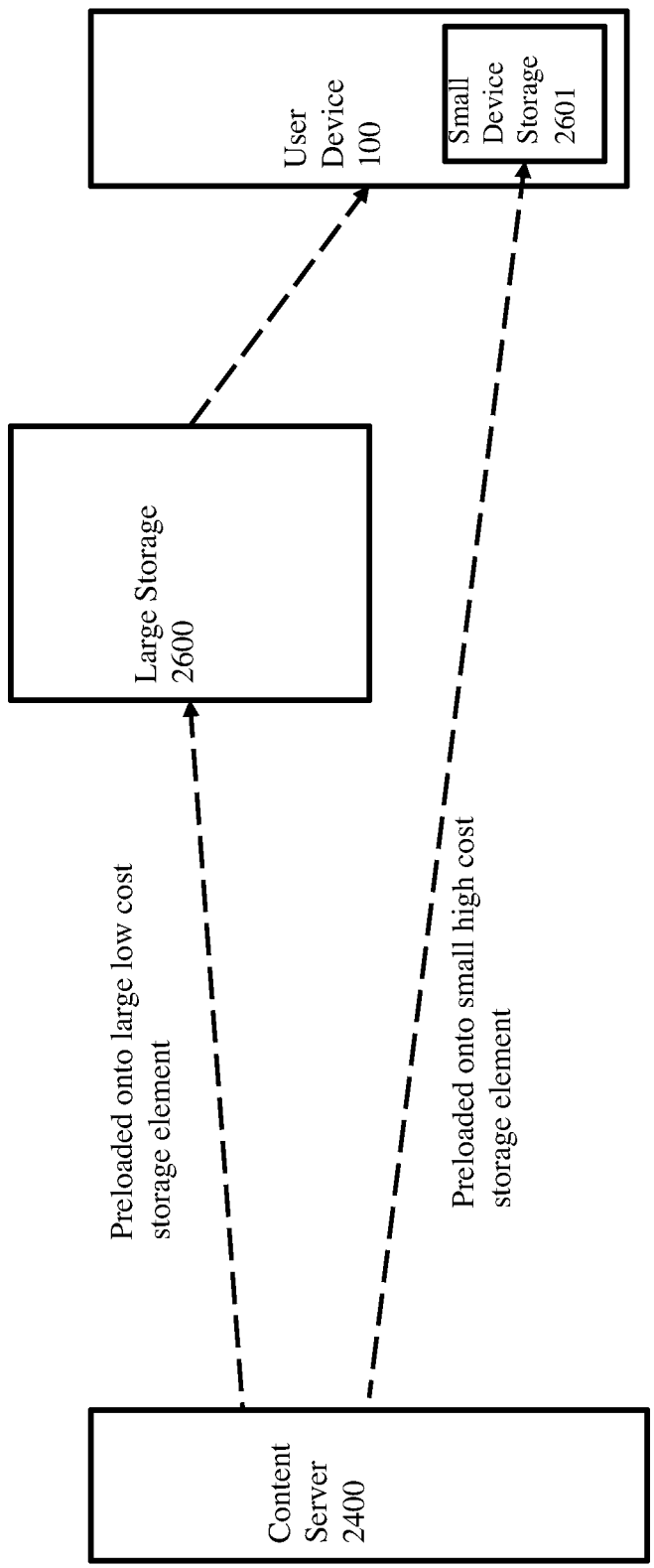
FIG. 26 shows a Content Server and a user device associated with a large storage and a small storage according to an embodiment.

FIG. 26 shows a Content Server 2400 and a user device 100 associated with a large storage 2600 and a small storage 2601 according to an embodiment. For this embodiment the small storage 2601 is included in user device 100, so that if user device 100 is portable or mobile, the contents of storage 2601 will be available as the user device 100 is moving. For this embodiment, the large storage 2600 is not included within user device 100 and may be associated with user device 100, over a communication network. The large storage 2600, may be a home gateway reservoir or a set top box or a POI access point storage, etc. for this embodiment a desirable content to be presented at user device 100 may be preloaded onto large storage 2600 or small device storage 2601. Typically large storage 2600 will have more available storage and have a lower cost (or opportunity cost) per gigabyte. Typically small device storage 2601 will have less available storage and have a higher cost (or opportunity cost) per gigabyte. Therefore, in an embodiment the cost for consuming a preloaded content stored in large storage 2600 may be lower than the cost for consuming a preloaded content stored in small device storage 2601

FIG. 27 is a table that includes a variable price of content preloaded offered to a user according to an embodiment. In this example, the user is interacting with a smartphone attempting to consume preloaded content associated with the smartphone. The smartphone is associated with storage within the smartphone, storage at home gateway, and storage at a home set top box (listed under column "storage location"). In this example the smartphone is currently not in the coverage area of the home gateway or home set top box communication networks (shown as "N/A" entries in the table). Therefore movie Q and movie R are currently not available (listed as "N/A" under column "view now"). In this example movie P is available now in 2 formats over an expensive communication network (for example cellular or roaming). The cost for consuming movie P will be lower if the user waits to go home before viewing, since the movie can be preloaded over a lower cost communication network (for example home broadband access) or stored on a lower cost storage element. The cost for consuming movie P maybe even lower if the user is willing to wait an additional day prior to consumption. In this case, the service provider may schedule a broadcast or multicast of the content for preloading (which may allow for sharing of communication network cost of preloading across multiple users), or preload content over a very low priority (for example lowest QoS, best effort, etc.) data connection.

In another embodiment, the content may be offered at variable price based on one or more communication networks utilized to carry the content or based on the time, or the timeline, or the delay, or the stress on one or more of the communication networks utilized to carry the content, or based on one or more storage elements utilized to store the content prior to presentation. In another embodiment, in addition the variable price may include content parameters (for example, HD versus SD format), or user device parameters (for example display size), or user parameters (for example service plan), or content provider parameters (for example price, specials), etc.

For an embodiment, a movie content provider may preload a first set of movies over a wired broadband access network to a home gateway storage element or reservoir, and may preload a second set of movies over a cellular access network onto a mobile user device local storage element, and may preload a 3rd set of movies over a WiFi network onto a second mobile user device storage element. Each of these 3 sets of movies may incur different cost of the communication network, or the storage element, or the movie format, etc. These cost parameters may be used to offer each set at a variable price.

In at least one embodiment, the variable price associated to the content may affect the way the content elements are presented to a user. The variable price may be used to identify, select, cluster, rank, sort, classify, tier, etc. the content elements. Variable pricing may influence searching, browsing, etc. of the content located at the storage element. Variable pricing may influence notifications, displays, banners, pop-ups, etc. assisting in content consumption.

In at least one embodiment, if a user shows interest to consume a content with a given variable price, a notification may be presented to the user for the same content available at a lower price, by utilizing more cost-effective storage elements or communication network to store and transport the content to the user.

In at least one embodiment, if a user shows interest to consume a content with a given variable price, a notification may be presented to the user for a comparable content available at a lower price (for example a movie preloaded at the home gateway when user is at home), by utilizing more cost-effective storage elements or communication network to store and transport the content to the user.

In at least one embodiment, if a user shows interest to consume a content with a given variable price, a notification may be presented to the user for the same contenting a more desirable format for a comparable price, by utilizing more cost-effective storage elements or communication network to store and transport the content to the user.

In at least one embodiment, if a user shows interest to consume a content with a given variable price, a notification may be presented to the user for the same content for a lower price by delaying access to the content to a later time (for example reduced stress on communication network performance) or a later location (for example wait until the user gets home from work), by utilizing more cost-effective storage elements or communication network to store and transport the content to the user.

In at least one embodiment, variable pricing content may be used in value metric preloading selection. In another embodiment, value pricing parameters may be obtained or estimated or computed, etc., from pretest market or pretest groups.

In another embodiment, variable pricing of content may include sponsor services, promotions, coupons, etc. In another embodiment, information associated with consumption of content with variable pricing is collected, processed, etc. In another embodiment, information associated with consumption of content with variable pricing is shared with one or more entities (for example content providers, content broker, POI managers, etc.).

Presenting Preloaded Ads on User Device

In at least one embodiment, a content preloaded onto a storage element is or includes an advertisement (ad).

It is to be understood that one or more of the embodiments described for distribution, preloading, managing, classifying of content can additional or alternatively be utilized for distribution, preloading, managing, classifying of ads. That is content and ads can be interchangeably used for the described embodiments. In one embodiment the content comprises and ad.

A service provider of ads may be called an ad service provider. A service provider of content could be a content provider or a content broker, or include functionalities of both. Similarly an Ad Service provider could be an ad provider or an ad broker, or include functionalities of both.

For an embodiment, the content includes an advertisement, and this embodiment further includes selecting the advertisement, and assisting in presentation of the advertisement at a user device. For an embodiment, the selecting of advertisement includes selecting from preloaded advertisements. For another embodiment, the selecting is based on one or more of user devices, a content being presented, a parameter of a user consuming the content.

There are many embodiments where presenting preloaded ads may be advantageous. In at least one embodiment, a preloaded ad may be presented while video streaming is filling up a user device cache without waiting for the ad to download. In at least one embodiment, a preloaded ad may be presented when the user device is off-line (for example not in the coverage area of an ad provider communication network). In at least one embodiment a preloaded ad may be presented while other ads are being preloaded or downloaded in the background. In at least one embodiment, a preloaded ad may be presented while other ads targeted to a user are waiting for a more convenient or cost-effective or more valuable communication network to be available (for example WiFi). In at least one embodiment presenting preloaded ads benefits a user by reducing/delaying/avoiding usage of valuable communication network bandwidth resources (for example cellular data plan). In at least one embodiment, presenting of a preloaded ad may be more easily controlled (for example by reducing fast forwarding) that if the ad was embedded in the content. In at least one embodiment, preloading ads on storage elements associated with the user device may improve the privacy of a user, for example by reducing the amount of information associated with the user sent to the network for selecting an ad to be presented to the user.

Preloading Ads and Preloaded Ads

Typically the population of available ads is very large, and therefore selecting ads to be preloaded based on value metrics may be beneficial. Preloading selected ads may enable presenting ads that are better targeted to an end consumer. Preloading selected ads may enable presenting ads that are more dynamic than if fixed to associated content. Preloading selected ads may provide better control of the presentation to an end consumer. Preloading selected ads may enable presentation of higher quality ads, which otherwise may consume valuable communication network resources or may otherwise stall when streamed or may otherwise take too long to be presented, which may frustrate an end consumer.

The selection of the ads may be performed by one or more of the network side entities, for example an ad provider, ad service provider, ad broker, or devices associated with a user or user appliances, for example a storage element, a user device, etc. Selection of ads by the network entities may have the benefit of offloading hardware resources (for example processor, battery, etc.) of devices associated to a user. Selection of ads by the devices associated to the user may improve privacy, for example by reducing the amount of information associated to a user or user device with the network. Selection of ads by the storage element may reduce network chatter, for example when the storage element is at a POI assisting several user devices or the selection is based on the aggregate of parameters associated with several user devices.

In at least one embodiment, the value metrics for selecting ads to be preloaded are based on value metric parameters associated with the ads. Examples of value metric parameters associated with the ads may include: size, type, required throughput, format, ad revenue/cost/profit per presentation, ad revenue/cost/profit per click, click rate, communication network requirements, user device hardware or software requirements, business rules, associations with content (for example may or may not be allowed to be presented with specific content), etc. or any other ad parameter for helping ad selection.

In at least one embodiment, the value metrics for selecting ads to be preloaded are based on value metric parameters associated with one or more users. Examples of value metric parameters associated with a user include: user demographics (for example age, sex, profession, marital status, etc.), user location (for example home, work, POI, location trace, past/current/future location, etc.), user history (for example prior content interactions, prior ad interactions, etc.), user context (for example talking, walking, driving, working, interacting with user device, etc.) user network (for example virtual or real-life, families, friends, colleagues, etc.), etc. or any other user parameters for helping ad selection.

In at least one embodiment, one or more value metric parameters associated with a user are abstracted, or parametrized, or clustered, modeled, or classified, etc. from more detailed user parameters for privacy. In at least one embodiment some parameters of the user may not be shared with network entities or devices, ad provider, ad service provider, ad broker, etc., for privacy reasons and instead the user may be assigned into a classification for ad preloading that could be used for value metric evaluation without revealing sensitive user parameters. For an embodiment, the age, sex, income, location, etc. user parameters may be remapped onto value metric parameters that could be exchanged with network entities or devices for value metric evaluation for ads without sharing sensitive user information. In another embodiment a portion of the value metrics or value metric parameters are computed locally (for example user device or storage element) and shared with the network entities.

In at least one embodiment, a value metric for selecting ads to be preloaded are based on value metric parameters associated with a user device. Examples of value metric parameters associated with the user device may include: type (for example smart phones, tablets, notebooks, PC, etc.), mobility, hardware capability (for example UI, display, processor, etc.), software capability (for example operating system, applications, content decoders, etc.), or any other user device parameters for helping ad selection.

In at least one embodiment, the value metrics for selecting ads to be preloaded are based on value metric parameters associated with an ad provider. Examples of value metric parameters associated with an ad provider may include: ad revenue, ad campaigns, ad relationships, ad programs, business rules or relationships between the ad provider and content providers, business rules or relationships between the ad provider and the user device or the user, etc.

In at least one embodiment, the value metrics for selecting ads to be preloaded are based on value metric parameters associated a the communication network from an ad server to a storage element or the storage element to a user device. Examples of value metric parameters associated with the communication network may include: communication network cost (for example cost per use, cost per time interval, unlimited use, cost over time, cost versus QoS, background/foreground cost, real-time versus background low bandwidth, etc.), communication network performance (for example speed, bandwidth, latency, jitter, packet error rate, busy status, etc.), communication network availability (for example past/current/future connectivity with a target user device for presenting the ad, etc.), etc. or any other communication network parameters for helping ad selection.

In at least one embodiment, the value metrics are used for selecting ads to be deleted from a first storage or moved to a second storage element.

In at least one embodiment, the value metrics for selecting ads to be preloaded are based on value metric parameters associated with a storage element for preloading the ads. Examples of value metric parameters associated with a storage element may include: size, available size, type, latency, throughput, access time, communication network capability, past/current/future connectivity with ad server or user device, etc. or any other storage element parameter for helping ad selection.

In at least one embodiment, an ad is preloaded as a separate entity (for example a separate file) and may be decoupled from other content. In at least one embodiment, the ad is assigned a tag. This tag may be used to address/index/name/point to the ad when exchanging information with a network entity, cloud server, client device, a storage element, a user device, a presentation of the ad, etc.

In at least one embodiment, a value metric of a previously preloaded ad is monitored periodically. In at least one embodiment, the value metric of a previously preloaded ad is reevaluated if a value metric parameter changes.

In at least one embodiment, a previously preloaded ad may be deleted from a storage element or moved to a different storage element based on value metrics.

In at least one embodiment, the value metrics for selecting ads to be preloaded are based on value metric parameters associated with 2 or more storage elements associated with a user device for preloading the ads. The 2 or more storage elements may be classified or assigned a tier based on the storage capabilities relative to an ad or a user device, etc. Ads associated with a user device may be distributed over the 2 or more storage elements based on value metrics.

In at least one embodiment, the value metrics for selecting ads to be preloaded are based on value metric parameters associated with 2 or more communication networks associated with a user device or storage element for preloading the ads. The 2 or more communication networks may be classified based on the communication network parameters relative to an ad or the user device, etc. The ads associated with the user device may be distributed over the 2 or more communication networks based on value metrics.

In at least one embodiment an ad provider is assisted by an ad broker. The ad broker may provide infrastructure such as software or hardware for the network entities or software or hardware for the user device or storage elements for assisting or enabling ad selection or ad preloading or ad deleting or ad moving or ad presentation at a user device. The ad broker may obtain value metric information from users, users devices, storage elements, communication networks, etc., for value metric based selection or preloading or deleting or moving or presentation of ads. The ad broker may obtain and share value metric information or process or classify value parameters from the users, user devices, storage elements, communication networks, etc., with the ad provider. The ad broker may assist the selection of the ads for preloading, or assist on the preloading to storage elements, or assist in the insertion or presentation of the ads at the user device.

In at least one embodiment an ad broker assists a plurality of ad providers in one or more of obtaining value metrics, value metric parameters, value metric parameter relationships, selecting ads based on value metrics, preloading selected ads, presenting ads to users or inserting ads in content presented to users. This ad broker service may increase the value of ads to one or more of the providers, or to the users, etc. This ad broker service may simplify the development, management and maintenance of this ad delivery system to one or more providers or to one or more users. For an embodiment, network or storage element or user device software or hardware may be shared across 2 or more providers. This may result in improved privacy to a user, as sensitive user information may be managed by a single entity (for example ad broker) instead of repeated over multiple providers. In at least one embodiment the ad broker receives compensation based on delivering information related to value metrics to the ad provider. In at least one embodiment the ad broker receives compensation based on selecting or preloading ads for the ad provider. In at least one embodiment the ad broker receives compensation based on interactions, or presentation, or consumptions of preloaded ads for the ad provider.

In at least one embodiment, a communication network provider sponsors/subsidizes an ad preloading service based on value metrics that offload data usage over the communication network or reduces congestion over the commutation network. In at least one embodiment, the user agrees to a service or provides compensation for an ad preloading service based on value metrics that may increase the relevance of the ads or the quality of the ads or reduce communication network cost or improve presentation of other content that would otherwise be degraded from real-time ad presentation.

In at least one embodiment the ad broker receives variable compensation (for example offers variable price to ad provider) based on value metric parameters associated with the users (for example user demographics, user location, user state, etc.), user devices, storage elements, etc., associated with the preloaded ads from the ad provider. For an embodiment the ad broker may receive variable compensation based on the user value metric parameter income, or age, or profession, or hobbies, etc. For an embodiment, the ad broker may receive variable compensation based on a storage element value metric parameter location: at home, at a store, in a hotel lobby, at a gas station, etc.

In at least one embodiment the value metric is proportional to likelihood of the ad being presented or viewed or clicked or consumed by a user. In at least one embodiment the value metric is proportional to a price or revenue or profit collected from the ad being viewed or clicked or consumed by a user.

In at least one embodiment, the value metric parameters or value metric parameter relationships used to obtain a value metric are selected from a user perspective or to favor the user. For an embodiment, selection and preloading of ads based on this value metric could result in increased user satisfaction, increased user clicks through, user compensation for consuming ads, reduce communication network cost, reduce storage element utilization, etc.

In at least one embodiment, the value metric parameters or value metric parameter relationships used to obtain a value metric are selected from an ad provider perspective or to favor the ad provider. For an embodiment, selection and preloading of ads based on this value metric could result in increased number of relevant ads presented to users, increased ad clicks through, increase purchase of product associated to ad, reduced costs, reduce storage element cost, etc.

In at least one embodiment, the value metric parameters or value metric parameter relationships used to obtain a value metric are selected from an ad broker perspective or to favor the ad broker. For an embodiment, selection and preloading of ads based on this value metric could result in increased revenue, increase revenue from one or more ad providers, profit, user satisfaction, number of ads presented to users, increased ad clicks through, reduced costs, increase revenue from content associated to ads, increased commission, increased customers/users, etc.

In at least one embodiment, the ad broker is selecting ads to be preloaded from a plurality of ad providers and value metrics are based on the plurality of ad providers. In at least one embodiment the ad providers are competing (for example by ad bidding, ad bonuses, etc. to the ad broker) on the ad broker assisted system for ad selection, ad preloading or ad presentation, insertion, etc. at user devices. In at least one embodiment, the value metric parameters or the value metric parameter relationships included in the value metric for selection and preloading are selected by the ad broker to benefit the broker. For an embodiment, the value metric may select ads based on ad provider bid pricing, ad revenue, ad profit, ad commissions, ad coupons, ad quotas, etc. to benefit the ad broker In at least one embodiment, an ad selected for preloading onto a storage element is based on content available on the storage element or associated storage elements. For an embodiment some ads may have business rules that prevent them or encourage them to be presented jointly with specific content. For an embodiment, the likelihood of an ad being successful presented/inserted may be correlated with a content being presented. Therefore evaluating relationships of an ad with content, or preloaded content on a storage element or associated storage may be beneficial.

Many business relationships or compensation methods between one or more of a user, a user device, a POI, a POI device, a communication network provider, a content provider, a content broker, an ad provider, an ad broker, etc. may be beneficial. In at least one embodiment, an owner/user of a storage element is compensated for storing preloaded ads. In at least one embodiment, the ad provider sponsors/subsidizes a communication network use. In at least one embodiment, the ad provider sponsors/subsidizes content or preloaded content. In at least one embodiment, the ad provider requests an ad broker for services/assistance on the ad preloading system. In at least one embodiment, a user is compensated for interacting with an ad.

In at least one embodiment, a user or a user device or storage element may need to agree/consent/subscribe to the ad preloading service. In at least one embodiment, a hardware or software element may be added/installed at a user device or storage element to enable the ad preloading service. In at least one embodiment, a user may input relevant information to assist the preloading service (for example information that influence value metrics, lists of users, user devices, storage elements, preferences, etc.).

Presenting Ads

Preloaded ads on storage elements associated with a user device may be presented to a user of the user device. Preloaded ads may be of higher quality (for example richer content) and may be presented almost immediately (reduced communication network delay) improving user satisfaction. Preloaded ads may be dynamically presented and targeted to a user, a user device, a user state, etc.

The preloaded ads may be presented in isolation (for example on a separate window or on a separate application, etc.) or may be presented by inserting within other content or preloaded content (for example embedded in a webpage, movie, etc.), etc. The presentation may be static or allow for user interaction (for example click, select, browse, etc.). In at least one embodiment, an ad is selected from the plurality of preloaded ads for presentation to a user of a user device. In at least one embodiment the selection is performed by a network entity. In at least one embodiment, the selection is performed by a device associated with a user (for example a user entity). In at least one embodiment, the preloaded ad selected for presentation is decoupled from a content presented at the user device. In at least one embodiment, the preloaded ad selected is correlated with a content presented at the user device. In at least one embodiment, preloaded ads may be presented to a user when the user device is fully off-line (for example not connected over a communication network to the ad provider or ad service provider) or partially off-line (for example connected to the ad service provider over a low quality or expensive communication network exchanging tags/pointers/acknowledgments).

In at least one embodiment, the ad selection for presenting is based on a value metric. The value metric may include one or more parameters related to the user, demographics of the user (for example age, sex, profession, income, hobbies, etc.), state of the user (for example working, driving, etc.), location of the user (for example at home, at work, at coffee shop X, at department store Y, at hospital building Z, etc.), time of day relative to the user (for example early morning, morning, lunch break, afternoon, evening, etc.), date relative to the user (for example weekend, weekday, special holiday, etc.). The value metric may include one or more parameters related to the user device (for example HW capabilities, SW capabilities, SW presently installed in the device, etc.). For an embodiment, the value metric may include parameters related to a device entity processor, for example decoding capability for presenting a compressed ad, or display resolution for presenting an ad, etc. The value metric may include one or more parameters related to storage elements (for example available size, cost, mobility, access speed, etc.). The value metrics may include one or more parameters related to a communication network between the ad source and the ad destination for presentation of the ad (for example bandwidth/speed, QoS, connectivity/availability status, cost, etc.).

In at least one embodiment a SW required for presenting an ad may be preloaded. The preloading of this SW required for ad presentation may be based on a value metric. The value metric for the preloading of the SW required for ad presentation may comprise value metric information related to the ad and vice versa, the value metrics for the preloading of the ad requiring a SW for presentation may comprise value metric information related to the SW. The value metrics for the ad and the SW required for presentation could be evaluated jointly.

The value metric may include information about the past (for example user ad or content consumption history or location history/trace) or may include information about the present (for example a user current location, a current list of preloaded ads or content, a current list of storage elements available to a user device, etc.) or may include information about the future (for example predicting future location based on location trace or location history, for example predicting future location based on a calendar/schedule, etc.).

In at least one embodiment the ad selection may include deleting ads based on a value metric or moving ads based on value metric from a first storage element to a second storage element. For an embodiment, a rich content ad for a newly released movie may be moved from a smartphone to a home gateway on Monday morning if a user associated with the user device typically watches movies Friday/Sat night, and moved back to the smartphone of Thursday night. For an embodiment, the ad may be removed when the movie is no longer playing in theaters.

In at least one embodiment, the ad selection is based on a value metric comprising user parameters with sensitive user information (for example age, income, location, etc.). In an embodiment, the user may not authorize user parameters containing sensitive user information to be shared outside the user device. For this embodiment, it may be preferred to perform ad selection at the user device or a user entity associated with the user. In at least one embodiment, ads may not be preloaded, and the ad selection based on value metric parameters containing sensitive user information may download selected ads dynamically.

In at least one embodiment, content present on storage elements associated with the user device is pre-scanned/preprocessed to facilitate the presentation of ads during the content consumption. For an embodiment, keywords in the content are searched and correlated with ad content. In at least one embodiment, the preloaded content pre-scanning is performed during user device idle time. In at least one embodiment, the preloaded content pre-scanning is scheduled for more efficient use of processor resources.

In at least one embodiment, preloaded ads are inserted into content to be consumed, wherein the content includes information or business rules to help insert the preloaded ads. In at least one embodiment, the content includes information or business rules to prevent/restrict insertion of specific preloaded ads (for example parental control).

In at least one embodiment, a content includes default ads, and business rules that allow for exchanging of the default ads for a more desirable preloaded ad.

In at least one embodiment, preloaded ads that are presented at a user device may be reviewed or revisited, etc. at a later time by a user.

In at least one embodiment, presented ads are monitored or accounted or billed based on user interaction with the presented ads. In at least one embodiment, a user is compensated for interacting with presented ads.

In at least one embodiment, an ad is tagged for identification, and the tag information is shared with a network entity (for example ad provider, ad broker, ad service provider, etc.) to reduce communication network chatter.

Figure 28:
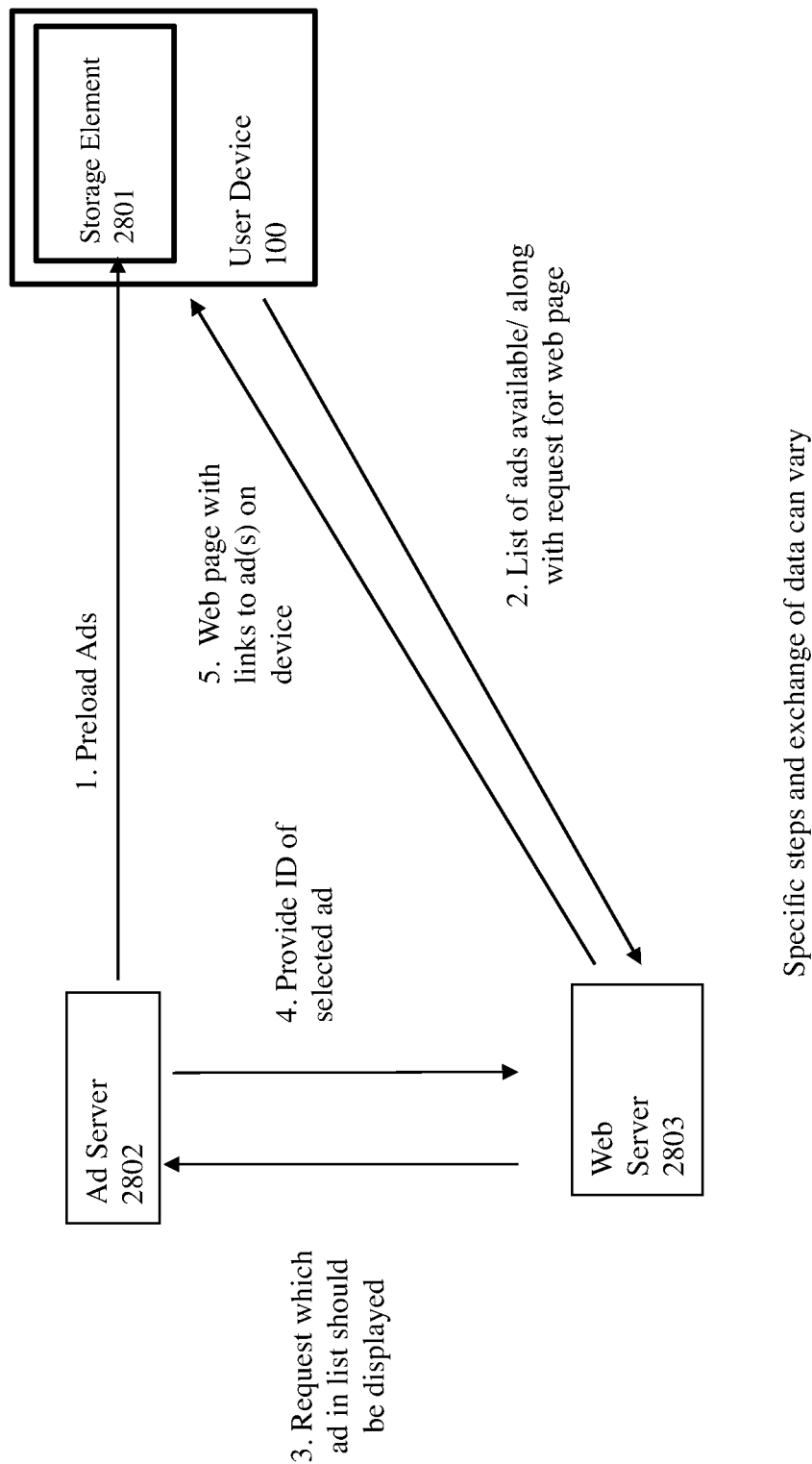
FIG. 28 shows an example for displaying a preloaded ad in a webpage according to an embodiment.

FIG. 28 shows an example for displaying a preloaded ad in a webpage according to an embodiment. FIG. 28 includes a user device 100, which includes a storage element 2801 (for example the storage element 2801 maybe internal to user device 100 or external to user device 100), ad server 2802 which may be the source of ads or may assist in preloading ads or may assist in selecting ads to be presented; Web server 2803 may be a source of web content or may assist on merging Web content with ads. In the embodiment of FIG. 28, the first step is preloading ads from ad server 2802 onto storage element 2801, the second step is a request from user device 100 Web server 2803 for a webpage which includes a list of ads available to the user device, the 3rd step is a request from Web server 2803 to ad server for a selection of an ad within the list of available ads to be displayed, the 4th step is a providing from ad server 2802 to web server 2803 an ID/tag for the selected ad, the 5th step is providing from web server 2803 to user device 100 a webpage with a link/ID/tag for the selected ad to be presented with the webpage.

In at least one embodiment the Web server 2803 could be an app server, or a game server, or a movie server, or a music server, etc. In at least one embodiment the server could comprise a utility running on the user device 100. In at least one embodiment the ad server 2802 and the Web server 2803 may be co-located or may be the same server.

In related embodiments one or more of the 5 steps may be bypassed or combined or executed in a different order. For an embodiment steps 3 and 4 may not be necessary or may be performed within Web server 2803. In another embodiment additional steps may be added, for example a value metric parameter may be exchanged between the user device 100 and the ad server 2802 to help selection of valuable preloaded ads. In another embodiment the ad server 2802 may delete/move previously preloaded ads.

Although specific embodiments have been described and illustrated, the described embodiments are not to be limited to the specific forms or arrangements of parts so described and illustrated. The embodiments are limited only by the appended claims.

INCORPORATION BY REFERENCE

This document incorporates by reference for all purposes the following U.S. patent applications: application Ser. No. 13/789,220 filed Mar. 7, 2013, entitled CONTENT DISTRIBUTION BASED ON A VALUE METRIC; Application No. 61/609,271, filed Mar. 10, 2012, entitled CONTENT DISTRIBUTION BASED ON A VALUE METRIC.

What is claimed:

1. A content distribution system, comprising:
at least one network content server coupled to each of a wireless end-user device and a home content reservoir that is external to the wireless end-user device, the wireless end-user device and home content reservoir both registered to be associated with a same user, wherein the at least one network content server is connectable through a first communication network to the home content reservoir, wherein the at least one network content server is connectable through multiple wireless network types to the wireless end-user device, and wherein the home content reservoir is also connected to a local network;
the at least one network content server comprising at least one processor configured to:
generate a content queue, comprising a plurality of different user-selectable content for the user, based on parameters of a plurality of available content, and based on storage capabilities of the home content reservoir, the content queue including first content available to the wireless end-user device from a network content reservoir associated with the at least one network content server and second content available to the wireless end-user device from the home content reservoir;
assist preloading of the second content to the home content reservoir associated with the user through the first communication network prior to any request from the wireless end-user device to consume the second content;
upon receipt of a request to stream selected content from the second content to the wireless end-user device, authorize streaming of the selected content from the second content from the home content reservoir through the local network to the wireless end-user device; and
upon receipt of a request to stream selected content from the first content directly to the wireless end-user device, stream the selected content from the first content from the network content reservoir associated with the at least one network content server to the wireless end-user device with a media quality dependent on a wireless communication network over which the selected content from the first content is being streamed from the network content reservoir to the wireless end-user device.

2. The content distribution system of claim 1, wherein the media quality dependent on the wireless communication network is dependent on a cost metric of the wireless communication network.

3. The content distribution system of claim 1, further comprising the at least one network content server configured to compile analytics for the user, and wherein generating the content queue for the user is additionally based on the compiled analytics.

4. The content distribution system of claim 1, wherein authorize streaming of the selected content from the second content from the home content reservoir comprises, when the wireless end-user device is not connected directly to the local network, instruct the home content reservoir to stream the selected content from the second content to the wireless end-user device with a media quality dependent on a wireless communication network over which the selected content from the second content is being streamed from the home content reservoir to the wireless end-user device.

5. The content distribution system of claim 1, further comprising the at least one network content server generating different content queues for two or more users associated with the user.

6. The content distribution system of claim 1, further comprising the at least one network content server assisting in deleting of at least a portion of the second content from the home content reservoir.

7. The content distribution system of claim 1, further comprising the at least one network content server assisting in and/or authorizing downloading of selected content from the home content reservoir through the local network to local storage on the wireless end-user device.

8. The content distribution system of claim 1, further comprising the at least one network content server transferring information related to the content queue to the wireless end-user device for display to a user.

9. The content distribution system of claim 1, further comprising the at least one network content server obtaining information associated with a value metric for at least one content item from the plurality of available content based on prior preloading of the at least one content item, and evaluating user interaction with the preloaded at least one content item, wherein generating the content queue for the wireless end-user device is further based on the value metric.

10. The content distribution system of claim 1, wherein the content queue comprises an advertisement, and further comprising the at least one network content server configured to:
select the advertisement; and
assist in presentation of the advertisement to the wireless end-user device.

11. The content distribution system of claim 1, further comprising the network content reservoir associated with the at least one network content server.

* * * * *